US012003952B2

(12) United States Patent
Lyren et al.

(10) Patent No.: US 12,003,952 B2
(45) Date of Patent: Jun. 4, 2024

(54) COMPUTER PERFORMANCE OF EXECUTING BINAURAL SOUND

(71) Applicants: Philip Scott Lyren, Rincon, PR (US); Glen A. Norris, Lakewood, OH (US)

(72) Inventors: Philip Scott Lyren, Rincon, PR (US); Glen A. Norris, Lakewood, OH (US)

( * ) Notice: Subject to any disclaimer, the term of this patent is extended or adjusted under 35 U.S.C. 154(b) by 0 days.

(21) Appl. No.: 18/133,019

(22) Filed: Apr. 11, 2023

(65) Prior Publication Data

US 2023/0254658 A1 Aug. 10, 2023

Related U.S. Application Data

(63) Continuation of application No. 17/383,477, filed on Jul. 23, 2021, now Pat. No. 11,632,645, which is a continuation of application No. 16/938,937, filed on Jul. 25, 2020, now Pat. No. 11,076,255, which is a continuation of application No. 16/558,084, filed on Aug. 31, 2019, now Pat. No. 10,652,688, which is a continuation of application No. 16/276,597, filed on Feb. 14, 2019, now Pat. No. 10,728,685, which is a continuation of application No. 15/442,799, filed on Feb. 27, 2017, now Pat. No. 10,433,094.

(51) Int. Cl.
*H04S 7/00* (2006.01)

(52) U.S. Cl.
CPC .......... *H04S 7/303* (2013.01); *H04S 2400/11* (2013.01); *H04S 2420/01* (2013.01)

(58) Field of Classification Search
None
See application file for complete search history.

(56) References Cited

U.S. PATENT DOCUMENTS 9,544,706 B1 * 1/2017 Hirst .......................... H04S 7/00
2015/0373477 A1 * 12/2015 Norris ............... H04M 3/53366 381/303

* cited by examiner

*Primary Examiner* — Kenny H Truong

(57) ABSTRACT

A method improves performance of a computer that provides binaural sound to a listener. A memory stores coordinate locations that follow a path of how the head of the listener moves. This path is retrieved in anticipation of subsequent head movements of the listener to improve computer performance of executing binaural sound.

20 Claims, 13 Drawing Sheets

600

| time | Head path: Head location (x,y,z) | Head path: Head orientation (α,β,γ) | Source path: source location (x,y,z) | HRTF path: Resultant HRTF (r,θ,ϕ) path for caching |
|---|---|---|---|---|
| Fig 7A - Head changes orientation (rotates right), fixed source (5m in front of head) | | | | |
| t0 | (0,0,0) | (0,0,0) | (0,0,5) | (5,0°,0°) |
| t1 | (0,0,0) | (20°,0,0) | (0,0,5) | (5,-20°,0°) |
| t2 | (0,0,0) | (40°,0,0) | (0,0,5) | (5,-40°,0°) |
| t3 | (0,0,0) | (60°,0,0) | (0,0,5) | (5,-60°,0°) |
| Fig 7B - Head changes location (moves 3m forward), fixed source (5m in front of head) | | | | |
| t0 | (0,0,0) | (0,0,0) | (0,0,5) | (5,0°,0°) |
| t1 | (0,0,1) | (0,0,0) | (0,0,5) | (4,0°,0°) |
| t2 | (0,0,2) | (0,0,0) | (0,0,5) | (3,0°,0°) |
| t3 | (0,0,3) | (0,0,0) | (0,0,5) | (2,0°,0°) |
| Fig 7C - Head changes both location and orientation (combined motion of 7A, 7B) | | | | |
| t0 | (0,0,0) | (0,0,0) | (0,0,5) | (5,0°,0°) |
| t1 | (0,0,1) | (20°,0,0) | (0,0,5) | (4,-20°,0°) |
| t2 | (0,0,2) | (40°,0,0) | (0,0,5) | (3,-40°,0°) |
| t3 | (0,0,3) | (60°,0,0) | (0,0,5) | (2,-60°,0°) |
| Fig 7D - Head is fixed, source changes location (moves to the right of the listener) | | | | |
| t0 | (0,0,0) | (0,0,0) | (0,0,5) | (5.0,0°,0°) |
| t1 | (0,0,0) | (0,0,0) | (1,0,5) | (5.1,11.3°,0°) |
| t2 | (0,0,0) | (0,0,0) | (2,0,5) | (5.4,21.8°,0°) |
| t3 | (0,0,0) | (0,0,0) | (3,0,5) | (5.8,31.0°,0°) |
| Fig 7E - Head changes location (moves 3m forward), source changes location (moves right) | | | | |
| t0 | (0,0,0) | (0,0,0) | (0,0,5) | (5,0°,0°) |
| t1 | (0,0,1) | (0,0,0) | (1,0,5) | (4.1,14.0°,0°) |
| t2 | (0,0,2) | (0,0,0) | (2,0,5) | (3.6,33.7°,0°) |
| t3 | (0,0,3) | (0,0,0) | (3,0,5) | (3.6,56.3°,0°) |
| Fig 7F - Head and source move per 7E. Head changes orientation per 7A | | | | |
| t0 | (0,0,0) | (0,0,0) | (0,0,5) | (5.0,0°,0°) |
| t1 | (0,0,1) | (20°,0,0) | (1,0,5) | (4.1,-6°,0°) |
| t2 | (0,0,2) | (40°,0,0) | (2,0,5) | (3.6,-6°,0°) |
| t3 | (0,0,3) | (60°,0,0) | (3,0,5) | (3.6,-3°,0°) |

Figure 6

1000A

Telephone Calls

| Description | Sound Localization Information |
|---|---|
| Location: Office | SLP22- SLP24; Path 43 |
| Location: Bedroom | SLP3; Volume-7; RIR6 |
| Location: Car | SLP7 [restricted SLPs] |
| Keyword: “No” | Path22 |
| Keyword: “Yes” | Path23 |

Figure 10A

1000B

Battle X

| Description | Sound Localization Information |
|---|---|
| Startup Sequence | [HRTF7, HRTF8, HRTF9, HRTF22] |
| Level 1 | SLP2 - SLP10; Path 3; Path4 RIR7; RIR24 |
| Time: 7 min and 40 sec | Sound file (BombDrop); SLP90 with HRTF77 |
| Level 2 | SLP112 - SLP120; Path 13; RIR17; BRIR5 |
| Mission Complete | Path123 |
| Ending Sequence | [HRTF22, HRTF9, HRTF8, HRTF7] |

Figure 10B

COMPUTER PERFORMANCE OF EXECUTING BINAURAL SOUND

BACKGROUND

Three-dimensional (3D) sound localization offers people a wealth of new technological avenues to not merely communicate with each other but also to communicate more efficiently with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

A method that improves performance of a computer that provides binaural sound to a listener. A memory stores coordinate locations that follow a path of how the head of the listener moves. This path is retrieved in anticipation of subsequent head movements of the listener.

Other example embodiments are discussed herein.

BRIEF DESCRIPTION OF THE DRAWINGS

FIG. 6 shows a table that includes example data for head paths, virtual sound source paths, and HRTF paths in accordance with an example embodiment.

FIG. 10A is a table for telephone calls in accordance with an example embodiment.

FIG. 10B is a table for a fictitious VR game called "Battle X" in accordance with an example embodiment.

DETAILED DESCRIPTION

Figure 1:
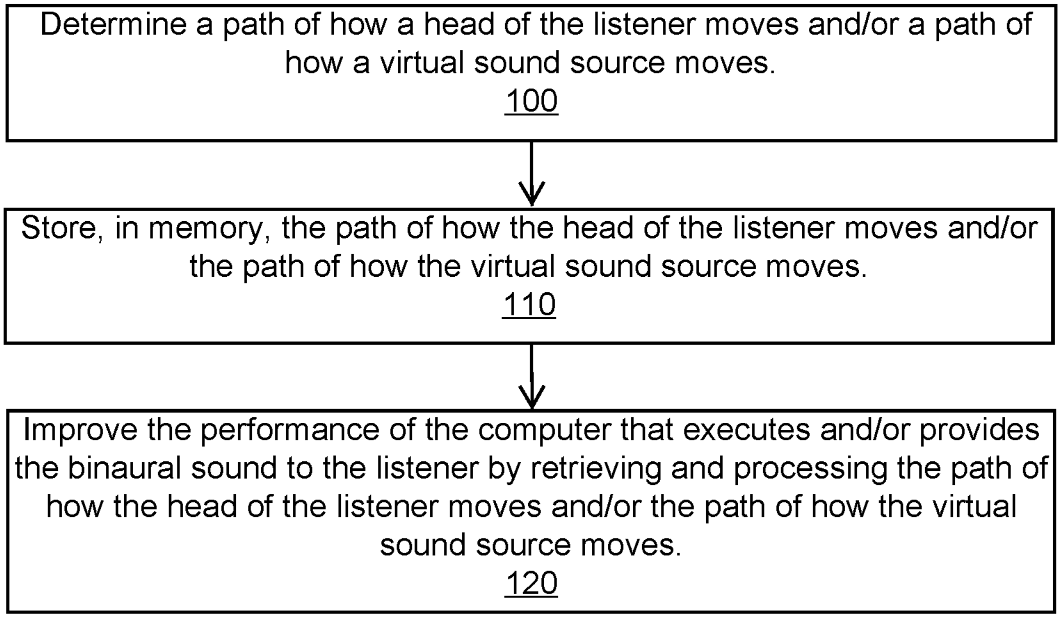
FIG. 1 is a method that improves performance of a computer that executes binaural sound to a listener in accordance with an example embodiment.

Example embodiments include methods and apparatus that improve performance of a computer that executes binaural sound to a listener.

Convolution of binaural sound is process-intensive and consumes a great deal of computing resources when sound simultaneously localizes to multiple SLPs, and/or when sound localization points move or change such as when one or more virtual sound sources move relative to the head of the user. Example embodiments improve computer performance and help to solve these problems.

Prefetching, preprocessing, and caching data present particular problems for electronic devices that execute binaural sound. One of these problems is determining what data should be prefetched, preprocessed, and cached. Consider an example in which the computer prefetches data for use in convolving binaural sound, but this data is not subsequently requested for convolution. In this instance, prefetching did not expedite convolution since the data was not needed or the wrong data was prefetched. Hence, prefetching and caching the correct data is an important factor for improving the performance of the computer executing binaural sound.

Another one of these problems is determining when this data should be prefetched, preprocessed, and cached. Consider an example in which the computer prefetches the correct data for use in convolving binaural sound, but this data is retrieved too early. The data resides in cache memory too long and consumes valuable cache memory space that could be used to expedite execution of other processes. Consider another example in which the computer prefetches the correct data for use in convolving binaural sound, but this data is retrieved too late. A cache miss results in execution delay of the binaural sound. Hence, prefetching and caching the data at a correct time is an important factor for improving the performance of the computer executing binaural sound.

Another one of these problems is determining what data should be prefetched, preprocessed, and cached for a particular software application. Consider an example in which two different software applications execute and provide binaural sound to listeners. Data prefetched for one software application results in a cache hit, while the same data prefetched for another software application results in a cache miss. Hence, consideration of a particular software application for which to prefetch the data is an important factor for improving the performance of the computer executing binaural sound.

Example embodiments provide technical solutions in methods and apparatus that solve these problems and many others. These solutions improve performance of a computer that executes and provides binaural sound to listeners.

Example embodiments determine a path of how sound moves in acoustic auditory space or three-dimensional (3D) space and/or how a head of a listener moves in this space. Example embodiments processes the path to improve performance of a computer and/or electronic device that provides binaural sound to the listener. As discussed more fully herein, paths can be described or defined in different ways, such as using different coordinate systems (e.g., spherical coordinates, polar coordinates, or Cartesian coordinates), different frames of reference (e.g., a frame of reference of the listener or a frame of reference of another person or object), different origins (e.g., an origin of a listener or an origin of an object), different environments (e.g., a virtual reality (VR) environment, an augmented reality (AR) environment, or a real environment), and different nomenclature (e.g., sound localization points (SLPs), virtual sound sources, virtual sound source paths, head related transfer functions (HRTFs), HRTF paths, paths of SLPs, et al.

By way of example, example embodiments discuss virtual sound sources and positions of virtual sound sources (e.g. a position of a zombie in a VR game, a location of a friend during a telepresence phone call, a perceived location in the physical environment of a talking gnome of a AR application, or a position in another world space). For instance, a position of a virtual sound source that is localized to a listener as binaural sound in acoustic auditory space can be expressed as a SLP with respect to that listener. A position of a virtual sound source that is or is not providing sound can be described relative to a listener or relative to a location in space (such as the environment of the listener). Further, this description can include coordinates of a physical or virtual environment. Locations of virtual sound sources and SLPs can also be described in different reference frames and with respect to virtual and real objects and locations (such as a real or virtual object in a room or environment, a defined origin, a sensor, an electronic device, a stationary object, a moving object, a point in a moving reference frame such as a car, a part of the body different than the head, a global positioning system (GPS) location, an Internet of Things (IoT) location, etc.). Discussing locations of virtual sound sources and SLPs with respect to the head of the listener or relative to a location in space provides convenient nomenclature and reference frames for illustrative purposes; though example embodiments can be applied to other reference frames. For example, it can be convenient to discuss locations of virtual sound sources using a Cartesian coordinate system (with an origin defined as a head of the listener, or defined as another point in space). It can be convenient to discuss SLPs using a spherical coordinate system with the head of the listener facing forward at the origin. Example embodiments, however, can use other coordinate systems.

Example embodiments are directed to different types of SLPs and virtual sound sources (e.g., fixed SLPs, moving SLPs, fixed virtual sound sources, and moving virtual sound sources). By way of example, consider a distinction between two example types of sound localization points (SLPs) of two example virtual sound sources being convolved to binaural sound to a listener when the head of the listener moves. A first example virtual sound source is convolved to remain at a first SLP having a fixed position with respect to the ears of the listener (or another point on the head such as the center of the head). A second example virtual sound source is convolved to a SLP that changes coordinates in order for the virtual sound source to be perceived as remaining fixed with respect to the environment or space of the listener. The first example SLP type that is fixed with respect to the ears of a listener is different than the second SLP type that is adjusted so that the listener hears the virtual sound source as fixed to a position in space or in the environment.

For the first example SLP type (e.g., a SLP that is fixed with respect to the ears of the listener), the SLP of the virtual sound source remains at a fixed position with respect to the ears of the listener and therefore with respect to both the location and orientation of the head of the listener even as the head moves. The SLP moves and tracks or follows the movements and orientation of the head. As the head of the listener moves, the SLP simultaneously moves to coincide with the movements and orientation of the head. If the listener rotates his or her head left and right then the SLP swings left and right. For example, the SLP is expressed in spherical coordinates measured from between the ears or a center of the head of the listener. The head is oriented in the spherical coordinate space such that the polar axis of the spherical coordinate space runs longitudinally through the head and points up from the top of the head, and such that the face points in the direction of 0° azimuth. The SLP maintains a constant distance (r), azimuth angle (θ), and elevation angle (ϕ) from center of the head of the listener while the head of the listener moves around. In other words, the SLP remains at a fixed or constant position with respect to the center of the head (and the face) of the listener even as the head of the listener moves.

Consider an example of the first type of SLP in which binaural sound localizes from a SLP fixed with respect to the ears of the listener, the SLP being at (1.2 m, 20°, 10°) relative to the ears of the listener. The listener hears the binaural sound emanate from or originate from this SLP. The listener then moves his or her head or even moves around (e.g., rotates his body or walks). From the point-of-view of the listener, the binaural sound continues to emanate from or originate from the SLP at (1.2 m, 20°, 10°) with respect to the head of the listener. Thus, from the hearing point-of-view of the listener, the sound continues to localize to this SLP regardless of the movements of the head and/or body of the listener.

For the second example SLP type (e.g., one that renders a virtual sound source as fixed with respect to a location in space), the SLP of the virtual sound source is adjusted so that the listener perceives that the virtual sound source does not move in the environment. The listener perceives the origination of the sound as remaining at a fixed location in space even as the head and/or body of the listener moves in the space. The virtual sound source does not track or follow the movements of the head. Instead, as the head of the listener moves, the virtual sound source is convolved to different or changing SLPs so as to remain perceived as originating from a constant or fixed location in space (such as a location in empty space or occupied space). For instance, in spherical coordinates, the distance (r), azimuth angle (θ), and/or elevation angle (ϕ) from the head of the listener to the SLP changes in response to the head of the listener changing location or moving around with respect to the location of the virtual sound source. For example, movements of the listener are monitored and measured, and the measurements are used to calculate adjustments to the coordinates of the SLP in order to compensate for the movements of the listener.

Consider another example of the second SLP type in which binaural sound is rendered to a SLP that is fixed with respect to a location in space. Here, the head of the listener is at an origin location (0, 0, 0), and the SLP is located at (1.2 m, 20°, 10°) with respect to this origin location. If the listener does not move his or her head, then the listener will hear the sound emanate from or originate from this SLP. If the listener moves his or her head, then these SLP coordinates are adjusted so as to render binaural sound that continues to emanate from the matching location in space as perceived by the listener. The listener can move close to this virtual sound source, move farther away from this virtual sound source, move his or her head orientation with respect to the virtual sound source, etc. From the point-of-view of the listener, the binaural sound continues to emanate from or originate from the constant or matching location in space. Thus, the SLP is adjusted for a new position of the listener relative to the position of the virtual sound source in order that from the hearing point-of-view of the listener, the virtual sound source does not move in space regardless of the movements of the head and/or body of the listener.

In the case of this second example SLP type (e.g., a SLP that renders a virtual sound source as fixed in space), the coordinates of the SLP change when the head of the listener moves. Consider an example in which a standing listener localizes a virtual sound source fixed in space from a SLP having coordinates (1.2 m, 0°, 10°). If the listener rotates his or her head twenty-degrees counterclockwise or right-to-left (−20°), then the SLP coordinates would be adjusted to (1.2 m, 20°, 10°). If the listener then stepped one meter backward in the horizontal plane away from the SLP, then the SLP would be located at (2.19 m, 20°, 5.5°) with respect to the listener.

The distinction between a SLP fixed with respect to the ears of a listener and a SLP of a virtual sound source that is fixed with respect to a location in space is a factor in determining what sound localization information (SLI) to prefetch, preprocess, cache, and perform other actions discussed herein to improve computer performance. Further, this distinction can assist in defining paths of virtual sound sources, paths of head movements, and paths of SLPs. This distinction also assists in determining what HRTF pairs (or other sound localization information) to retrieve for binaural sound convolution. These HRTF pairs are also determined, saved, and/or processed in series or sequences or sets that form paths of HRTFs or HRTF paths.

An understanding of this distinction provides a basis for discussion of convolving sound to externally localize as binaural sound. When the SLP is fixed with respect to the ears of a listener, then convolution of sound is more straightforward and less process-intensive. For example, sound localization information (e.g., HRTFs, ITDs, and ILDs) remains constant when the SLP is fixed with respect to the ears of the listener. For instance, sound is filtered with a single pair of HRTFs so the sound localizes to the SLP or to the virtual sound source (e.g., when the virtual sound source is visible as a VR object, an AR object, or a real object).

When the SLP is not fixed with respect to the ears of the listener, then convolution of sound is considerably more complex and process-intensive. This situation occurs in three instances. First, this situation occurs when the head of the listener moves relative to a virtual sound source that is fixed with respect to a location in space. Second, this situation occurs when the head of the listener is fixed but the virtual sound source moves with respect to the head of the listener. Third, this situation occurs when both the head of the listener and the virtual sound source simultaneously move. In these situations, the sound is repeatedly convolved with new sound localization information. Processing the sound for these movements is complex and process-intensive. For example, processing sound for these movements can consume large amounts of central processing unit (CPU) time or process time and require large numbers of instruction cycles or fetch-decode-execute cycles of a computer or electronic device processing binaural sound.

As explained herein, example embodiments solve or mitigate these problems and provide methods and apparatus that improve computer performance in processing and providing binaural sound to listeners. Example embodiments include situations when the virtual sound source is fixed with respect to a location in space and the head of the listener moves and when the virtual sound source moves with respect to the listener who is either fixed or moving.

Binaural sound localization can move along one or more paths with respect to a fixed or moving head of a listener. By way of example, these paths can include a plurality of coordinates that are determined or defined by one or more of a head path (e.g., a path of how a head of a listener moves), a virtual sound source path, and a HRTF path.

Consider an example in which a head of a listener is located at an origin location (0, 0, 0), and a plurality of SLPs form a circle of 1.0 meter radius with a center at this origin location. Each SLP corresponds to a pair of HRTFs that have coordinates matching coordinate locations of a SLP. Sound is convolved with the HRTFs in turn so that a binaural sound localization travels around this circular path of SLPs that extend around the head of the listener. If the orientation of the head does not change then the circular path is an example of and can be used to derive a virtual sound source path around the head. Alternatively, if the virtual sound source is fixed at a location 1.0 meter from the head then the circular SLP path can be used to indicate that the head is rotating on the origin and to derive the head path that includes the rotation.

An initial orientation of a 3D object in a physical or virtual space can be defined by describing the initial orientation with respect to two axes of or in the frame of reference of the physical and/or virtual space. Alternatively, the initial orientation of the 3D object can be defined with respect to two axes in a common frame of reference and then describing the orientation of the common frame of reference with respect to the frame of reference of the physical or virtual space. In the case of a head of a listener, an initial orientation of the head in a physical or virtual space can be defined by describing both of, in what direction the "top" of the head is pointing with respect to a direction in the environment (e.g., "up", or toward/away from an object or point in the space), and in what direction the front of the head (the face) is pointing in the space (e.g., "forward", or north). Successive orientations of the head of a listener can be similarly described, or described relative to the first or successive orientations of the head of the listener (e.g., expressed by Euler angles or quaternions). Further, a listener often rotates his or her head in an axial plane to look left and right (a change in yaw) and/or to look up and down (a change in pitch), but less often rotates his or her head to the side in the frontal plane (a change in roll) as the head is fixed to the body at the neck. If roll rotation is constrained, not predicted, or predicted as unlikely, then successive relative orientations of the head are expressed more easily such as with pairs of angles that specify differences of yaw and pitch from the initial orientation. For ease of illustration, some examples herein do not include a change in head roll but discussions of example embodiments can be extended to include head roll.

For example, an initial head position of a listener in a physical or virtual space is established as vertical or upright or with the top of the head pointing up, thus establishing a head axis in the frame of reference of a world space such as the space of the listener. Also, the face is designated as pointing toward an origin heading or "forward" or toward a point or object in the world space, thus fixing an initial head orientation about the established vertical axis of the head. Continuing the example, head rotation or roll in the frontal plane is known to be or defined as constrained or unlikely. Thereafter an example embodiment defines successive head orientations with pairs of angles for head yaw and head pitch being differences in head yaw and head pitch from an initial or reference head orientation. Angle pairs of azimuth and elevation can also be used to describe successive head orientations. For example, azimuth and elevation angles specify a direction with respect to the forward-facing direction of an initial or reference head orientation. The direction specified by the azimuth and elevation angle pair is the forward-facing direction of the successive head orientation.

Consider an example embodiment executing on a computer system discussed herein in which stored paths (e.g., virtual sound source paths and/or HRTF paths) are not used to localize sound to head positions of a current head of a listener or predicted paths of head movements of a listener. Instead, the stored paths are used to localize virtual sound sources to virtual head positions or stored head paths of the listener or of a virtual listener, such as a 3D model of a head in the manner of a real-time or non-real-time simulation. For example, a 3D model of a head having acoustic and material and surface properties of a human head is animated to move along a retrieved or calculated head path, and sound is convolved to the head in accordance with the positions of the ears of the 3D model. The example embodiment captures and/or records the convolved sound and stores and/or transmits the convolved sound. The example embodiment analyzes the convolved sound such as in order to optimize ideal head paths and/or virtual sound source paths. The convolved sound is also analyzed to optimize HRTF models, and/or binaural room transfer function (BRTF) and/or room transfer function (RTF) models. The convolved sound is also analyzed in the interest of other objectives that improve the experience of future listeners and/or improve the performance of an electronic system in the provision of binaural sound or localization of a virtual sound source. An example embodiment prefetches HRTFs to expedite simulations or modeling that take place at a pace that is faster than real-time.

In additional to specifying head orientation of a listener in a physical or virtual space, the head path can include head locations in the space. Further examples of head paths are discussed.

Consider an example in which a head of a standing listener fixed at an origin location (0, 0, 0), is held upright on a z axis normal to the floor, and has an initial forward-facing direction (FFD) of North. While staying at the origin location the listener moves his or her head, the movement being a rotation of ninety degrees (90°) to his or her left, followed by a rotation of one hundred and eighty degrees (180°) right, and then another rotation ninety degrees (90°) left, back to the initial FFD. The head of the listener thus moved in a path defined in terms of orientation and a point in space (the origin). For this head path, the head rotates three times on a z axis (here, the longitudinal axis extending up through the top of the head), the roll and tilt/pitch of the head being negligible or 0°. This head path can be defined or described in terms of coordinates of his or her various successive facing directions (FDs), head orientations, or head positions that include orientation.

Consider one example of a description of a head path occurring at a single point in space. Since an "up" direction of the head (the z axis) and a "front" direction of the head (the face of the listener pointing North) are defined, the orientation coordinates of the points that make up the head path are expressed in pairs of angles for head yaw and head pitch. Analogously the pairs of angles can be azimuth and elevation angles respectively, relative to an initial facing direction of the head. For example, the head path of this listener is described with starting and ending angle pairs as follows:

Starting point (having "up" and FFD defined): (0°, 0°),

Path 1 (turning head left 90° away from FFD): (0°, 0°)-(−90°, 0°),

Path 2 (moving head right 180° to look East): (−90°, 0°)-(90°, 0°), and

Path 3 (rotating head left 90° back to FFD): (90°, 0°)-(0°, 0°).

Example embodiments correlate, transform, or transpose these paths (Path 1, Path 2, and Path 3) relative to virtual sound source locations into SLPs and/or SLI (such as HRTF pairs, ITDs, and/or ILDs) in order to improve performance of a computer or computer system that provides binaural sound to listeners. As discussed more fully herein, this correlation enables one or more example embodiments to determine what SLI to prefetch, preprocess, cache, and to execute other actions to improve computer performance.

For example, to alter convolution of a certain virtual sound source, an example embodiment transforms the coordinates of the head path relative to the virtual sound source to coordinates of HRTFs. These coordinates of the HRTFs (aka HRTF coordinates) are arranged in a sequential list according to an order of how or when they correlate or correspond to orientations of the head of the listener during the motion of the head along the head path. The sequential list of HRTFs are provided to a sound convolver (e.g., a processor or a digital signal processor (DSP)).

Consider an example in which a virtual sound source is fixed to a location in physical or virtual space, and so binaural sound of the virtual sound source is executed such that the binaural sound localizes from the fixed location in space. A head of a listener is located in a physical or virtual space or environment at an origin (0, 0°, 0°) in spherical coordinates and the head orientation has a forward-facing direction (FFD) of 0° azimuth and 0° elevation at the origin. The head remains upright on the polar axis at the origin, not tilting forward/backward or sideways, so that changes in head roll and head pitch are negligible or 0°. Sound convolves with a pair of HRTFs so the sound localizes to the virtual sound source that is stationary in the environment at a SLP (1.2 m, 30°, 0°) with respect to the FFD of the head of the listener. While sound localizes to this SLP, the head of the listener rotates forty-five (45°) counterclockwise or right-to-left away from the FFD and then rotates clockwise or left-to-right back to the initial orientation, the FFD. The head path includes head movements in two directions.

Path 1 (looking left away from the FFD): (0°, 0°)-(−45°, 0°), and

Path 2 (looking right back to origin): (−45°, 0°)-(0°, 0°).

Paths 1 and 2 define how the head of the listener moved with respect to the origin and the initial orientation of the head. These paths also help define the changing coordinates of the SLP with respect to the FDs of the listener that, in turn, assist in determining which HRTF pairs to retrieve to maintain the sound at the SLP. For example, when the listener has the FFD, then the SLP is located at (1.2 m, 30°, 0°), and HRTF pairs with these coordinates are retrieved to convolve the sound. When the listener looks left away from the initial orientation of the head to (−45°, 0°), then the SLP is located at (1.2 m, 75°, 0°) with respect to the FD of the listener. HRTF pairs with these coordinates are retrieved to convolve the sound so it remains fixed at the location in space.

In this situation, the virtual sound source remains fixed in space at the original position (1.2 m, 30°, 0°) with respect to the origin (0, 0°, 0°) and with respect to the initial orientation of the head of the listener regardless of where the head of the listener subsequently moves. Binaural sound continues to localize at the location of the virtual sound source with respect to the origin regardless of where the head of the listener moves. When the head of the listener rotates 45° to the left, the SLP is now located at (1.2 m, 75°, 0°) with respect to the current forward-looking direction of the listener. The location of the virtual sound source is still at (1.2 m, 30°, 0°) with respect to the origin and the initial FFD. The virtual sound source does not remain at a fixed location with respect to the head of the listener as the head moves. Instead, the virtual sound source remains at a fixed location in space and stays at the fixed location in space even as the head or body of the listener moves away from the fixed location or toward the fixed location in space.

Let's examine the situation in which the location of the virtual sound source is fixed with respect to the ears of the listener. Here, the SLP remains at a fixed location relative to the ears or face or center of the head of the listener even as the listener moves his or her head. The sound continues to be convolved or filtered with one pair of HRTFs while the head of the listener moves along Path 1 and Path 2, and the SLP moves with the head. From the point-of-view of the listener, the sound remains localized 1.2 m away from the head at an azimuth of 30° and an elevation of 0° from the current facing direction of the listener even as the FD changes. The virtual sound source follows or tracks the head and remains at a fixed location with respect to the ears of the listener.

These examples illustrate that different calculations and SLI are required depending on whether the virtual sound source is fixed with respect to the ears of the listener or fixed at a location in space. In order to provide a localization for a virtual sound source that is fixed in space, the sound is convolved with different HRTFs, ILDs, and/or ITDs as the head of the listener moves. Convolving the sound with these different HRTFs, ILDs, and/or ITDs is process-intensive and consumes substantial processing resources, especially when the sound convolves in real-time as the head of the listener moves. If the sound is not convolved quickly enough, then the listener may experience unnatural sound, such as jumpy sound, moving SLPs not fixed to the virtual sound sources, SLPs that lag while moving, or missing sound. This situation can also confuse a listener unable to determine where sound originates since a point of origin of the sound is not updated quickly enough or changes inaccurately. This is a significant concern in augmented reality (AR) and virtual reality (VR) since the usual intention is to coincide in real-time the external localization of virtual sound sources with the physical or virtual object/image associated with the virtual sound source.

As explained in detail herein, example embodiments solve these problems and other problems by mitigating or reducing the processing burden on electronic devices that provide binaural sound to the listener. The need to reduce processing burden can occur, for example, when the listener moves his or her head while sound is convolving to the SLPs of one or more virtual sound sources that are fixed in space (such as fixed at real physical objects, AR objects, and/or VR objects). This need can also occur when one or more virtual sound sources move along one or more paths in space while the head of the listener remains fixed or while the head of the listener moves.

FIG. 1 is a method that improves performance of a computer that executes binaural sound to a listener in accordance with an example embodiment.

Block 100 states determine a path of how a head of the listener moves and/or a path of how a virtual sound source moves.

Example embodiments determine these paths with one or more methods, such as tracking head movements of the listener, tracking paths of how virtual sound sources or SLPs moved with respect to the listener, tracking head movements of other listeners, tracking locations or movements of the listener (such as via global positioning system (GPS) locations or local sensors), estimating and/or predicting head movements of a listener or paths of how the head of the listener moves or will move at a time in the future, modeling head movement and/or paths of head movement based on movements of the listener and/or other listeners, displaying movement of an object on or through a display to a listener to cause a head and/or body of a listener to move in a direction with respect to the movement of the object, providing the listener with verbal and/or written or displayed instructions to cause a head and/or body of a listener to move in a direction based on the verbal and/or written instructions, providing the listener with a challenge or game in a software program to cause a head and/or body of a listener to move in a particular direction, and providing sound to a listener to cause a head and/or body of a listener to move in a direction with respect to the sound.

One example embodiment tracks how the head of the listener moves, moved, or will move while the listener listens to binaural sound that externally localizes to one or more SLPs, including SLPs of virtual sound sources fixed in space (e.g., SLPs of virtual sound sources fixed in a reference frame of the environment of the listener). For example, an example embodiment tracks head movements of a listener while the listener talks during a telephone call, while the listener listens to music or other binaural sound through headphones or earphones, or while the listener wears a HMD that executes a software program.

The paths are determined or defined according to different types of expressions or information, such as a mathematical equation, a formula, or a series or sequence of coordinate locations, SLPs, HRTFs, ITDs, and/or ILDs. These locations can be a single or a discrete location or multiple locations (e.g., multiple SLPs around a head of the listener).

Consider an example in which the path is a sequence of coordinates, HRTFs, ITDs, and/or ILDs that define where or how the head of a listener moves with respect to a fixed location in space or with respect to an origin location. When sound convolves according to the sequence, then the sound localizes to a fixed point in space even while the head of the listener moves and/or while the body of the listener moves.

In addition to locations, the path can also include other information, including sound localization information (SLI). For example, this information includes volume or loudness of sound at a particular SLP or a particular point in time. This information can also include timing information that defines how long a sound should remain at the particular SLP.

A head path can include changes in head orientation and/or changes in head position. Changes in head orientation include head rotation along one or more axes (X-axis, Y-axis, Z-axis or yaw, pitch, and roll, or other axes). Changes in head position include moving the head and/or the body (e.g., craning the head forward in space without moving the torso, taking one or more steps forward, taking one or more steps backward, taking one or more steps sideways, bending down, standing up, jumping, bicycling, falling, extending the neck, crossing town, etc.). Example embodiments are applied to head orientation and/or head position.

Consider an example in which the head path includes changes in head orientation and no changes in head position. A head tracking device or a positional head tracking (PHT) system (such as a compass, magnetometer, an accelerometer and/or a gyroscope) determine changes in head orientation over time of a user. An electronic device (such as a wearable electronic device, WED, or a handheld portable electronic device, HPED) stores the head orientation information in memory. The head orientation information is further processed before or after it is stored. For example, the HPED rotates the axes of the head path in order to express the orientations relative to a particular orientation (e.g., a first captured or starting orientation, an ending orientation, an average orientation, a compass heading, a VR-space orientation, or relative to another origin or reference orientation).

Consider an example in which a PHT system monitors both the head orientation and head position of the listener to determine a head path of the listener relative to a position and orientation determined by the PHT. For example, an automobile gaming system or in-car entertainment system includes a PHT system that monitors the position of or the changes in position and/or orientation of the head of the listener in the car such as the driver or a passenger in a driverless car. The PHT executes optical tracking (e.g., analysis of markers, infrared lights, images of the head or face of the listener, images from a camera facing outward from a moving head, sensors), or other form of PHT. The entertainment system saves the head path in memory. Before saving the head path or the coordinates of the positions and/or orientations in the head path, the entertainment system transforms the coordinates of the head path in order to express the head path relative to a particular location and/or orientation (e.g., relative to a first or starting position and orientation of a listener, the orientation of the entertainment console display or dashboard of the car, a virtual position, another head path, a last known position or attitude of the listener, a forward-facing direction, an origin, or another reference or origin of location and/or orientation).

Consider another method of determining a head path that includes both changes to the head orientation and the head position. An example embodiment derives a head path from HRTF coordinates sampled during the localization of a virtual sound source with a known trajectory (e.g., a stationary path in which the coordinates of the virtual sound source do not change, a linear path with a constant velocity, a complex trajectory, or path with varying velocity). An example embodiment executing a localization of a virtual sound source stores the consecutive, continuous, continual, or periodic HRTF coordinates that specify convolution of the sound of the virtual sound source to the SLP. At 10 millisecond (ms) intervals while the SLS localizes the virtual sound source as binaural sound to a listener, the SLS stores the coordinates of the HRTF pair convolving the sound of the virtual sound source to binaural sound that localizes at the SLP. At these times, the SLS also stores the position and orientation of the virtual sound source. The position and orientation of the virtual sound source are calculated from an equation of a motion path, sampled or retrieved from the SLS, or obtained in another way. Before, during, or after storing the coordinates of the HRTF pair and coordinates of the virtual sound source, the example embodiment further calculates coordinates of the head position and the head orientation relative to the coordinates of the virtual sound source. The SLS determines the coordinates of the HRTFs according to a function of the location and orientation of the head and the virtual sound source. The coordinates of the virtual sound source are known, and the coordinates of the HRTFs are known. The example embodiment then derives head position and head orientation coordinates from the coordinates of the HRTFs and the virtual sound source. The example embodiment stores the head location and the coordinates of the orientation to a head path.

The head path and its coordinates are stored as an expression relative to a virtual sound source that is fixed or stationary (e.g., the virtual sound source being localized at the time that the HRTF path was sampled or captured). The head path and its coordinates are stored in other ways as well. For example, an example embodiment rotates the axes of the head path and/or transforms the coordinates of discrete positions along the head path. The rotation and/or transformations express the head path relative to a particular location and/or orientation (e.g., relative to a virtual sound source, relative to a particular point or object in a virtual or physical space, relative to a last known location of a head, or other reference location and/or orientation origin).

For example, when the virtual sound source in the example above is known to remain stationary, each change in the HRTF pair used to localize the virtual sound source is known to be in compensation for a movement of the head of the listener (e.g., as measured by a head tracking system). The HRTF path includes the information of the motion of the head but the motion is expressed in a different reference frame and coordinate system (such as spherical coordinates). The example embodiment transforms the HRTF path to a head path. The head path is expressed in one or more convenient coordinate systems such as Cartesian, and translated relative to a useful or appropriate position in the new coordinate space, such as the origin. It follows that head coordinates for a point in time are derived from HRTF coordinates and the coordinates of the virtual sound source.

Consider an example where a performance enhancer of an example embodiment during ongoing use, determines that a certain string or sequence of HRTF pairs are frequently retrieved in a particular order. The frequency of requests for the sequence of HRTFs indicates repeated head paths and/or repeated virtual sound source paths. Whether the motion being repeated is the motion of the head, the motion of the virtual sound source, or a combination of the two motions, performance of the computer that executes the repeated localization is improved by storing for later retrieval the path describing or defining these motions (such as a HRTF path, virtual sound source path, path in coordinates, path expressed with a mathematical equation, or other type of path).

Consider an example in which the path is stored to include a series of coordinate locations and HRTFs having these coordinates such that sound convolved with the HRTFs localizes to the coordinate locations. The performance enhancer saves the HRTF coordinates as a HRTF path and stores the associated head path and virtual sound source path. Upon the next occurrence of the localization with matching HRTF pairs, the performance enhancer periodically, continually, or continuously samples and stores the HRTF coordinates (e.g., at intervals of five ms) and stores the sequence of HRTF coordinates as a HRTF path. At each five ms, the performance enhancer samples the HRTF coordinates and samples the location of the virtual sound source and coordinates of the head orientation from the SLS. The performance enhancer stores the locations and coordinates in a correlating or corresponding virtual sound source path. The performance enhancer simultaneously samples data of the head position and the head orientation from the head tracking system in order to compose a head path. If the performance enhancer is unable to retrieve data of the head movement, the performance enhancer derives the head position from the HRTF coordinates and the coordinates of the virtual sound source. If the performance enhancer is unable to retrieve the coordinates of the virtual sound source, the performance enhancer derives the coordinates of the virtual sound source from the HRTF coordinates and the data of the head movement.

Block 110 states store, in memory, the path of how the head of the listener moves and/or the path of how the virtual sound source moves.

Example embodiments store the path of how the head of the listener moves (e.g., head path) or virtual sound source path and other information discussed herein, such as timing, SLI, trigger event, volume, coordinate locations of SLPs, HRTFs, ILDs, ITDs, etc. Further, this information can be stored as one or more types, kinds, and/or formats of information. By way of example, an example embodiment stores the information as one or more of a table, an array, a set, a series, or a sequence. This information further includes one or more of coordinate locations (e.g., coordinate locations in spherical coordinates, Cartesian coordinates, or other coordinate system), sound localization points, impulse responses (e.g., head related impulse responses or HRIRs) or transfer functions (e.g., head related transfer functions or HRTFs), coordinates of or assigned to HRTFs, equations (e.g., geometric, algebraic, or arithmetic equations or sequences), points (e.g., a SLP located at $(r, \theta, \phi)$ in spherical coordinates), values or numbers (e.g., an azimuth value of 20°), ranges (e.g., an azimuth range of $0° \leq \theta \leq 45°$), timing indicating how long sound localizes to a SLP, volume/loudness for each SLP, trigger events indicating when to execute convolution, SLI, and other information discussed herein.

An example embodiment tracks and stores information that includes the head movements with respect to one or more fixed locations (e.g., a forward-looking direction of the listener or a SLP where sound emanates in empty space at a fixed location away from the head of the listener). This information further includes one or more of the following: a frequency of the occurrence of the head movements (e.g., how many times a particular head movement occurred over a period of time), a duration of time of the head movement, a duration of time the head remains at a particular orientation and/or position (e.g., a duration of time that the listener looks in a direction that is away from an initial forward-looking direction, or that the head remains fixed at the forward-looking direction), a speed of the head movement (e.g., how quickly the head of the listener rotates or moves from one orientation to another orientation), a length of time and/or frequency of the occurrence that the listener looks at or toward a SLP, and other information discussed herein.

Block 120 states improve the performance of the computer that executes and/or provides the binaural sound to the listener by retrieving and processing the path of how the head of the listener moves and/or the path of how the virtual sound source moves.

In order to improve performance of the computer, example embodiments include one or more of prefetching a head path, virtual sound source path, and/or HRTF path, or information about the head path, virtual sound source path, and/or HRTF path, caching the coordinates or information about the head path, virtual sound source path, and/or HRTF path, preprocessing the head path, virtual sound source path, and/or HRTF path or information about the head path, virtual sound source path, and/or HRTF path, and performing other actions discussed herein.

In order to improve performance of the computer, example embodiments anticipate, estimate, or predict how the head and/or body of the listener will move before or while the listener listens to binaural sound that externally localizes to one or more SLPs. Example embodiments also include anticipating, estimating, or predicting a path of how binaural sound will localize with respect to the listener. Knowing these movements in advance of the movements enables the computer to prefetch, cache, preprocess, or execute another action to expedite convolution of the binaural sound to the listener.

The following examples illustrate how example embodiments anticipate, estimate, or predict head and/or virtual sound source movement before such movements occur. Head and/or body movements of listeners often occur in a systematic or predictable sequence or path. For example, listeners from the United States typically move their head up and down to signify "yes" or an agreement and move their head left and right to signify "no" or disagreement. For instance, an intelligent personal assistant (IPA) asks a listener a question that will elicit a "yes" response or a "no" response. The IPA knows in advance that the listener will provide the response with the accompanying head movement. As another example, upon hearing an explosion or unexpected sound, listeners tend to turn their heads toward a source of the sound. For instance, a listener plays a software application that will localize gunfire sound to a left side of the listener. The software application predicts that the listener will rotate his or her head toward the sound of the gunfire 540 ms after the sound occurs. As another example, when a listener hears their name spoken they tend to orient their face toward the speaker. For instance, while a telephony software application executes a binaural conference call, the software application predicts that the listener will rotate his or her head toward the SLP of the voice of the person speaking (toward the SLP of a virtual sound source) during the telephone call.

Many other examples illustrate behaviors of listeners with respect to head or body motion relative to various sound sources and scenarious. Example embodiments capitalize on the behavior to improve performance of a computer that executes binaural sound to a listener.

Previous head movements also provide prediction or indication of future head movements. Listeners often tend to move their heads in repeated and predictable manners. For example, an example embodiment tracks and stores head movements of a user and associated information (such as what time the head movements occurred, where the user was located when the head movements occurred, what software and/or hardware the user was using when the head movements occurred, what time of day the head movements occurred, frequency of the head movement, etc.).

As one example, when a user receives a telephone call while sitting at the office, an example embodiment determines that ninety percent (90%) of the time the head of the user moves along one of three paths. As another example, each morning a user dons a head mounted display (HMD) and meditates in a musical VR environment. The head of the user moves along a matching or similar path at reoccurring times while music plays to the user. The paths or head movements in these examples provide a prediction of how the head of the user will move at a time in the future when the user engages in the matching or similar activity.

Example embodiments predict the changes in the execution of sound localization. An example embodiment predicts a certain path of movement of the head of a listener, predicts the path of motion of a virtual sound source, or predicts a sequence of HRTF coordinates. In response to the prediction, the example embodiment retrieves or calculates information about the predicted changes in the execution of the localization in order to improve the performance of the computer executing the localization.

Consider an example embodiment that includes a performance enhancer that identifies, stores, calculates, predicts, and retrieves three types of paths describing motions that may be predicted to repeat: head paths (e.g., paths along which a head of a user moves), virtual sound source paths (e.g. paths along which virtual sound sources move), and HRTF paths (e.g., sequences of HRTFs specifying convolution of sound to externally localize).

With regard to head paths, the performance enhancer monitors and captures the motion path of the head of the listener with respect to the environment of the listener in order to analyze the motion and detect repeated head motions. When the performance enhancer detects a repeated motion of the head, the performance enhancer stores the repeated head motion as a head path.

With regard to virtual sound source paths, the performance enhancer monitors and captures the motion paths of virtual sound sources in order to analyze the motion of the virtual sound sources and detect virtual sound source movements that repeat. When the performance enhancer detects a repeated virtual sound source trajectory, the performance enhancer stores the repeated motion as a virtual sound source path.

With regard to HRTF paths, the performance enhancer monitors and captures sequences of the coordinates associated with the HRTF pairs employed while convolving sound to a listener in order to analyze and detect patterns in the sequences of the coordinates. When the performance enhancer detects a repeated sequence, the performance enhancer stores the repeated sequence of coordinates as a HRTF path. A HRTF path describes the path of a SLP in the frame of reference of the head of the listener. For example, in this frame of reference the head of the listener is located at the origin, where a sound localizing at 0° elevation and 0° azimuth (i.e., the medial plane) is heard by the listener as directly in front of the face.

If the performance enhancer predicts that a SLP will localize to move along a certain stored HRTF path, the performance enhancer prefetches and preprocesses the HRTF path in order to cache the HRTF pairs for convolution. Caching the HRTF pairs improves the performance of the computer. Because coordinates of points in the HRTF path are already expressed in the coordinate space of HRTF pairs, the HRTF pairs are prefetched without delay of transformation from coordinates of the head path. For example, a point in the HRTF path is (2 m, 10°, 0°), and so the performance enhancer prefetches and/or caches the HRTF pair having $\theta=10°$ and $\varphi=0°$. Further, if the sound to be convolved is predicted or known, the prefetched HRTF pairs are used to convolve one or more known possible sounds to coordinates of the HRTF path before the sound is triggered, requested, or scheduled to play to the listener. The pre-convolved sound is stored in an output cache for playing or output at a later time.

The performance enhancer examines the movement of virtual sound sources in order to identify, capture, store, and retrieve repeating/predictable virtual sound source paths.

As one example, the performance enhancer obtains the virtual sound source path from the software application that provides the sound and/or the virtual sound source information, such as coordinates, trajectories, vectors, or path functions. For instance, a speaking user in a VR telephony space moves. The performance enhancer reads the coordinates from the VR client software to assemble the virtual sound source path of the voice. As another example, the performance enhancer reads and/or samples sound and/or data from a sound localization system (SLS) at intervals during external sound localization. For instance, the position and orientation of the virtual sound source is input to memory registers of the SLS in order to generate the HRTF, and the performance enhancer retrieves or reads the virtual sound source position coordinates from the memory registers of the SLS. As another example the performance enhancer derives coordinates of the virtual sound source path from HRTF coordinates captured during the execution of a localization.

An example performance enhancer predicts that a virtual sound source will move along a stored virtual sound source path during the localization of the sound to a listener. The performance enhancer retrieves or prefetches the virtual sound source path and transforms the virtual sound source path into a HRTF path of the virtual sound source. The performance enhancer preprocesses the HRTF path in order to cache the HRTF pairs for convolution and thus improves the performance of the computer.

Another example performance enhancer predicts one or more head paths and one or more virtual sound source paths for each virtual sound source and calculates HRTF paths of the virtual sound sources for each combination. The coordinate points of the multiple potential HRTF paths are referenced in order to cache or prefetch the HRTF pairs likely required for the convolution of the virtual sound sources on their eventual paths as adjusted for the eventual head movement. Further, when the performance enhancer predicts one or more potential known sounds of the virtual sound sources, pre-convolution is executed for each of the multiple potential HRTF paths of each of the multiple potential known sounds (e.g., sounds of one or more virtual sound sources).

An example embodiment captures, stores, and examines HRTF paths, head paths, and virtual sound source paths to discover paths or portions of paths that repeat with enough predictability to warrant executing an action to improve computer performance (such as prefetching, preprocessing, and/or caching). For example, the performance enhancer examines head paths and virtual sound source paths to identify, isolate, collect and store future repeating/predictable motions. The performance enhancer thereafter monitors head paths and virtual sound source paths in order to recognize a previously known, cataloged, or stored motion. Such recognition triggers fetching, preprocessing, and/or caching SLI to expedite convolution of the binaural sound when the sound localizes along and/or head traverses along the predicted path.

HRTF paths allow preprocessing of more than one binaural sound. Consider an example embodiment that localizes a prepared sound to the coordinates of a certain HRTF-1. A performance enhancer executing on the example embodiment queries the points of the saved HRTF paths for coordinates corresponding to or close to the coordinates of HRTF-1. The query returns fifty stored HRTF paths that include coordinates close to the coordinates of HRTF-1. The performance enhancer determines that the SLP at the coordinates of HRTF-1 will continue to move in one of two predicted paths, and the head of the listener will move in one of two predicted paths, resulting in four potential HRTF paths for the localization of the sound. The four potential paths have each occurred during earlier localizations are stored as HRTF paths and are present in the fifty HRTF paths that include the coordinates of HRTF-1. The example embodiment retrieves each of the four potential paths, convolves the sound according to the four paths, and stores the four convolved sounds. Later, the example embodiment receives an indication of which of the two potential paths will be executed by the SLS, and which of the two potential motions the head of the listener is performing. Based on the received indications, an example embodiment delivers to the output cache the corresponding one of the four pre-convolved stored sounds for output to the listener. Further, the example embodiment notifies the SLS that the convolution is complete for the particular SLP for the particular interval. Further, the example embodiment discards the three other pre-convolved sounds for the HRTF paths corresponding to the potential head and/or virtual sound source motions that did not occur.

Figure 2:
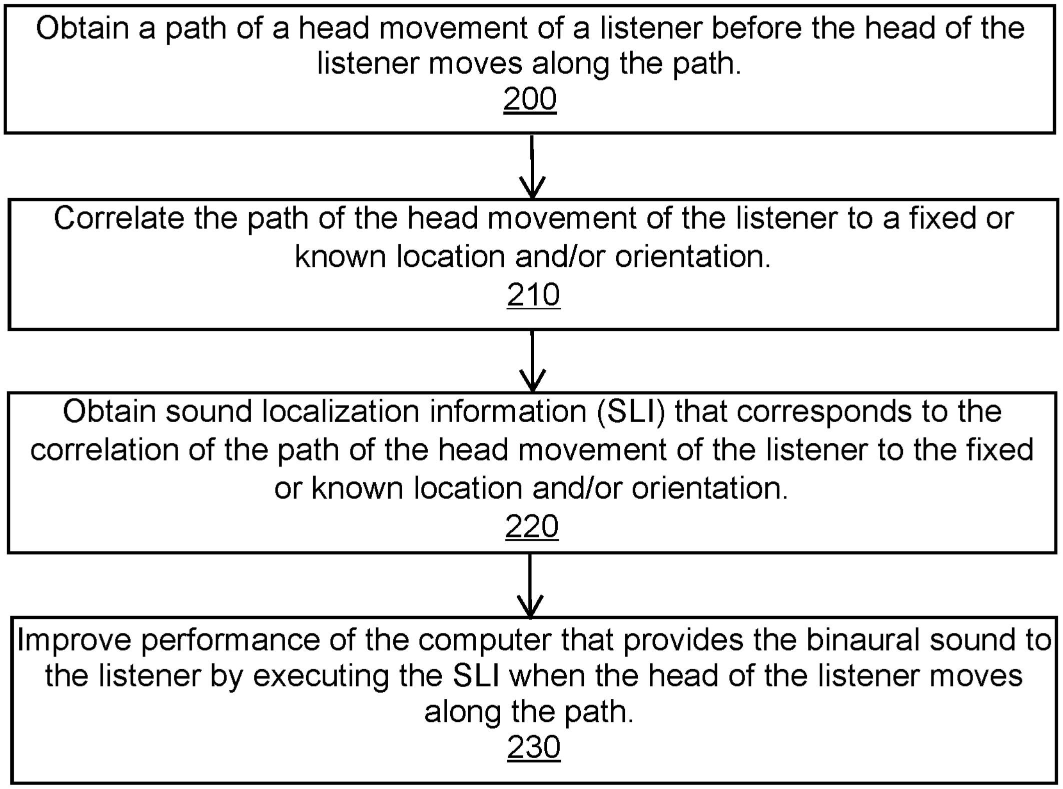
FIG. 2 is a method that improves performance of a computer that executes binaural sound to a listener in accordance with an example embodiment.

FIG. 2 is a method that improves performance of a computer that executes binaural sound to a listener in accordance with an example embodiment.

Block 200 states obtain a path of a head movement of a listener before the head of the listener moves along the path.

For example, an example embodiment retrieves the path from memory, receives the path from a transmission (e.g., over a wired or wireless network), calculates the path, and/or obtains the path in another way (e.g., from storage or an electronic device).

Block 210 states correlate the path of the head movement of the listener to a fixed or known location and/or orientation.

An example embodiment associates the path of the head movement with one or more fixed or known locations and/or orientations. The association provides a frame of reference or a reference point for the path of the head movement. Movement of the head is calculated or applied with respect to the fixed or known location and/or orientation, such as a virtual sound source that is fixed to a point in the environment, a SLP of the virtual sound source that is fixed to a point in the environment, a moving or changing SLP, an origin position, a GPS location, a forward-looking direction of a listener, a head position or orientation of a listener, or a location, orientation, or position of another object.

Consider an example in spherical coordinates in which a head of the listener is vertical or upright at an origin position of (0, 0, 0) and has a forward-looking direction when azimuth θ=0° and elevation ϕ=0°. The SLS predicts that the head of the listener will move at a future point in time along a path in which the head turns left forty-five degrees and right forty-five degrees. The SLS correlates the path with respect to the forward-looking direction and origin position as follows:

Path start: (0, 0, 0);

Head rotates left from (0, 0, 0) to (0, −45°, 0°); and

Head rotates right from (0, −45°, 0°) to (0, 0, 0).

Block 220 states obtain sound localization information (SLI) that corresponds to the correlation of the path of the head movement of the listener to the fixed or known location and/or orientation.

Once the head movements are known or predicted for a future point in time, an example embodiment determines and retrieves the SLI needed to convolve the sound in accordance with the head movements. As such, when the user thereafter does indeed move his or her head along the path of the head movement, then the SLI has already been prefetched, preprocessed, and cached.

For example, an example embodiment retrieves the SLI from memory, receives the SLI from a transmission (e.g., over a wired or wireless network), calculates the SLI, or obtains the SLI in another way and/or from another data source (e.g., from storage or an electronic device).

Block 230 states improve performance of the computer that provides the binaural sound to the listener by executing the SLI when the head of the listener moves along the path.

For example, an example embodiment prefetches the head path and/or corresponding SLI, caches the path and/or corresponding SLI, preprocesses the path and/or corresponding SLI, and/or executes and/or convolves the SLI according to the head path. At a future time when the user does indeed move his or her head along the path, the information to convolve the sound has already been prefetched, preprocessed, and/or cached, or other actions have been taken in accordance with an example embodiment. Correctly anticipating the head path of the user enables one or more example embodiments to improve convolution of binaural sound to the user.

A head path can include an array, sequence, or series of facing directions (FDs) or orientations of the head of the listener. A facing direction (FD) defines a direction that the head of the listener faces or looks with respect to a location, direction, or object in the space, such as to provide a head orientation and/or head position of the listener. FDs can be defined with respect to an established longitudinal vector or axis of the head at a head location in order to establish an up or down notion of the FD. FDs can be correlated to or associated with the head path to define the head movement of the listener. These FDs can be continuous or defined as a series of discrete directions. Further, each discrete FD can include an amount of time that indicates how long the head of the listener remains in a single FD.

For example, a head of a listener is located at a position in the environment where spherical coordinates in the world space are (0, 0°, 0°). If the head of the listener were to move a distance of one meter then the new location of the head in the environment would be at world spherical coordinates (1 m, A, B) where A and B are angles. The "up" direction intrinsic to this spherical coordinate space is defined as when ϕ, =+90°. The orient direction intrinsic to this world space is called "forward" and defined as the direction having θ=0° and ϕ=0°. The vertical axis of the head is oriented in the world space such that it is collinear and co-oriented with the world space polar axis so that the head is upright (e.g., the "top" of the head points "up"). The initial direction pointed to by the front (face) of the head (FFD) that is on the world space polar axis is "forward." Thus, the initial orientation of the head is upright and facing forward in the world space. In this example, head roll is restricted. Consequently, subsequent head orientations can be expressed by FDs in terms of a pair of angles (θ, ϕ) corresponding to head yaw and head pitch respectively. The body of the listener does not move, but the listener does rotate his or her head along a path from (0°, 0°) to (X°, Y°). An example embodiment divides this path into a series of equally spaced FDs, such as FDs spaced apart from each as one degree (1°), two degrees (2°), three degrees (3°), four degrees (4°), five degrees (5°), six degrees (6°), seven degrees (7°), eight degrees (8°), nine degrees (9°), or ten degrees (10°).

Consider an example in which a virtual sound source that is fixed with respect to a location in space that is external to the listener is convolved to a SLP where binaural sound is or will localize to the listener. The virtual sound source is located at spherical coordinates (1.2 m, −30°, 0°). The head of the listener is located at origin (0, 0, 0) with initial orientation such that an arrow extending out from the top of the head points to (1, 0°, 90°), and looking straight-ahead such that the forward gaze of the listener points to (1, 0°, 0°). With the head orientation in the spherical coordinate space established as such, the SLP of the virtual sound source fixed in space, and the location of the virtual sound source, both have spherical coordinates (1.2 m, −30°, 0°). As such, an example embodiment uses angle pairs of (θ, ϕ) to describe subsequent head orientations with respect to the origin (e.g., the FFD expressed as (0°, 0°). The head of the listener rotates to the right from the FFD to forty degrees (40°) azimuth and then rotates to the left forty degrees azimuth to be back to the initial FFD and head orientation in the space. An example embodiment correlates and models this movement as a series of discrete head orientations expressed as FDs. The FDs are evenly spaced apart by five degrees (5°) and span forty degrees (40°) of azimuth from 0° to 40°. Nine FDs indicate head orientations as follows:

FD1=(0°, 0°),
FD2=(5°, 0°),
FD3=(10°, 0°),
FD4=(15°, 0°),
FD5=(20°, 0°),
FD6=(25°, 0°),
FD7=(30°, 0°),
FD8=(35°, 0°), and
FD9=(40°, 0°).

Two series of FDs define the head movement along a first path of head movement to the right and a second path of head movement to the left as follows:

Path 1 (looking away from the origin to the right): [FD1, FD2, FD3, FD4, FD5, FD6, FD7, FD8, FD9], and Path 2 (looking back to the left and the origin): [FD9, FD8, FD7, FD6, FD5, FD4, FD3, FD2, FD1].

Each FD has a corresponding HRTF pair correlating to the coordinates of the SLP fixed at (1.2 m, −30°, 0°) so the sound remains localized to the SLP as the head of the listener moves. Coordinate locations for each HRTF pair of these FDs per the SLP of the virtual sound source fixed in space are as follows:

HRTF-1 for FD1=(1.2 m, −30°, 0°),
HRTF-2 for FD2=(1.2 m, −35°, 0°),
HRTF-3 for FD3=(1.2 m, 40°, 0°),
HRTF-4 for FD4=(1.2 m, 45°, 0°),
HRTF-5 for FD5=(1.2 m, −50°, 0°),
HRTF-6 for FD6=(1.2 m, −55°, 0°),
HRTF-7 for FD7=(1.2 m, −60°, 0°),
HRTF-8 for FD8=(1.2 m, −65°, 0°), and
HRTF-9 for FD9=(1.2 m, −70°, 0°).

The first head path and the second head path can be written in terms of their respective HRTF pairs or as HRTF paths as follows:

Path 1 (looking away from the origin to the right): [HRTF-1, HRTF-2, HRTF-3, HRTF-4, HRTF-5, HRTF-6, HRTF-7, HRTF-8, HRTF-9], and Path 2 (looking back to the left and the origin): [HRTF-9, HRTF-8, HRTF-7, HRTF-6, HRTF-5, HRTF-4, HRTF-3, HRTF-2, HRTF-1].

As the head of the listener moves, sound convolves with the HRTF pair that corresponds or correlates to the current FD of the listener. Convolution in this manner will maintain the sound at the SLP of the virtual sound source fixed in space with spherical coordinates (1.2 m, −30°, 0°). When the head of the listener is located at FD1, the sound convolves with HRTF-1 that has spherical coordinate location (1.2 m, −30°, 0°). When the head of the listener is located at FD2, the sound convolves with HRTF-2 that has spherical coordinate location (1.2 m, −35°, 0°). When the head of the listener is located at FD3, the sound convolves with HRTF-3 . . . etc. for each FD.

An example embodiment improves performance of a computer when the path of the head movement of the listener is known in advance of the head movement. For instance, in the example above, the sound localization system (SLS) obtains the first and second paths and retrieves the corresponding or correlating HRTF pairs for each FD. Each head path relative to the SLP (1.2 m, −30°, 0°) of the fixed virtual sound source has a sequence or series of HRTF pairs (HRTF path) that are prefetched, cached, and/or preprocessed before the head of the listener moves along the path.

Each FD further has a specified duration that the sound remains localized or held in the FD. The hold times for these FDs is as follows: [FD1=0.15 ms, FD2=0.1 ms, FD3=0.1 ms, FD4=0.1 ms, FD5=0.1 ms, FD6=0.1 ms, FD7=0.1 ms, FD8=0.1 ms, FD9=0.15 ms]. Thus, the sound plays at FD1 for 0.15 milliseconds, then plays at FD2 for 0.1 ms, then plays at FD3 for 0.1 ms, etc.

The HRTF path can include or be associated with other information, such as a trigger event or a time when to execute convolution of the sound along the path. For example, convolution of sound commences when a predetermined event occurs. Examples of these events include, but are not limited to, commence convolution of the sound: at a certain time of day (e.g., 2:15 p.m.), when a head of a listener moves in a predetermined direction (e.g., 135° Southeast), when a head of a listener moves to a predetermined orientation (e.g., head rotation to an azimuth angle of 20°), when a head of a listener rotates in the axial plane to change orientation by a certain angle Δθ (e.g., Δθ being a positive value for clockwise or left-to-right rotation, or Δθ being a negative value for counterclockwise or right-to-left rotation), when a listener moves to a predetermined location (e.g., when the listener arrives at a global positioning system (GPS) location), when an electronic device powers on (e.g., when a head mounted display (HMD) turns on or activates), when a software program activates (e.g., executes sound along the path when the listener clicks or activates a software program or application), when a listener issues an instruction or command (e.g., a listener states a verbal command to move sound along a path), when a software application or electronic device issues an instruction or a command to execute sound along the path, or another action or event occurs that executes or triggers convolution of the sound.

Consider an example in which a user dons an AR or VR portable electronic device (PED) that executes a software application. The sound localization system retrieves and analyzes head paths or head movements that the user previously made while wearing the PED and executing the software. Based on the analysis, the SLS predicts a number of potential or likely head paths that the head of the user will perform during execution of the software application. The SLS retrieves or prefetches these head paths, performs various preprocessing steps on the head paths, and moves the processed data into local memory, such as cache memory. By way of example, these steps include, but are not limited to, one or more of transforming a head path into a series or sequence of coordinate locations with respect to a SLP or virtual sound source or another location (such as an origin or head location of the user or another user), extracting SLI for coordinate locations along the path (e.g., extracting HRTF pairs, ITDs, ILDs, and other information to externally localize the sound), convolving sound with the SLI, convolving and/or filtering the sound with impulse responses (such as room impulse responses (RIRs) or binaural room impulse responses (BRIRs)), moving data and/or instructions to different memory locations (e.g., moving data from level 3 cache to level 1 cache), updating or calculating a likelihood or prediction of the user moving his or her head along a head path based on real-time information received from the executing software application, and other actions discussed herein.

HRTF paths include a record of a change in position between a head of the listener and a known location (e.g., a SLP, a physical object, a virtual object, a virtual sound source, an electronic tag or radio frequency identification (RFID) chip, an electronic device, a looking direction of the listener, or other known locations). An example embodiment analyzes HRTF paths and anticipates when a predicted HRTF path may occur or re-occur.

Consider an example in which binaural sound localizes along a path with respect to a fixed head of a listener. In order to make the virtual sound source localize or move on the path, the SLS sequentially, continuously or repeatedly convolves or filters the sound with a series or sequence of HRTFs, room impulse responses (RIRs), and/or other impulse responses or transfer functions that are particular or individualized to the listener, location, and or virtual sound source. The coordinates of these successive HRTFs over time define a HRTF path that is stored. The HRTF path includes the coordinate locations and additional or alternate information. For example, in addition to storing the coordinates or instead of storing the coordinates, the HRTF path includes ILDs for successive locations along the path, ITDs for successive locations along the path, HRTF file names with coordinates that correspond or correlate to successive locations along the path, convolution instructions or data for the path, other SLI (such as RIRs, BRIRs, volume, play duration, play times, etc.), and other information discussed herein.

A HRTF path can also include binaural sound that localizes at a SLP that is fixed with respect to a location in space while a head of the listener moves with respect to the location. In order to make the binaural sound appear to remain localized at the location in space while the head of the listener moves, the SLS sequentially, continuously or repeatedly convolves or filters the sound. The convolution is accomplished with a series or sequence of HRTFs, room impulse responses, or other impulse responses or transfer functions that are particular or individualized to the listener, location, and or virtual sound source. The coordinates of these successive HRTFs over time define a HRTF path that is stored as explained above when the virtual sound source moves along a path with respect to a fixed head of a listener.

A HRTF path can also include more complex paths, such as those occurring when both the head of the listener moves and the virtual sound source moves with respect to the moving head of the listener.

Consider an example in which a listener hears electronically generated binaural sound through headphones or earbuds and sees a virtual car with an AR or VR display. The virtual car drives from left to right in front of a listener. The SLP of the car moves relative to the head of the listener. An externally localizing sound of a moving car (a virtual sound source) moves from 0° azimuth to the right as a listener faces forward and the HRTF coordinates specifying localization of the car have successively increasing azimuth angles. The successive HRTF coordinates form a path of HRTF coordinates over time as the localization of the car sound executes to the listener. The HRTF path is saved in memory together with the identification of the SLP, the orientation of the listener relative to the environment, and other associated SLI.

Consider the example with the virtual car, wherein the head of the listener also moves. To localize the sound of the moving car to the moving head at a moment in time, the SLS considers the coordinates of the virtual car at the moment, and also the position of the head at the moment, and then calculates the HRTF coordinates. The HRTF path is saved in memory together with the identification of the localized virtual sound source (e.g., "car 1") and other associated SLI.

Prefetching occurs when a processor retrieves an instruction and/or data block from memory before the instruction and/or data block is needed. Prefetching instructions and/or data improves computer performance as reducing wait states or reducing memory access latency increases processing efficiency. For example, an example embodiment prefetches program instructions and/or data in program order (e.g., sequentially as executed) and/or with branch prediction (e.g., predicting a branch route of a digital circuit or a result of a calculation) with a hardware prefetcher or a software prefetcher.

Consider an example in which a software prefetcher executes prefetch instructions in program object-code to retrieve a sequence of HRTFs that correspond or correlate to a predicted head movement of a listener. When the listener subsequently moves his or her head along the path, the convolution data and/or instructions are already obtained from memory, preprocessed, and cached to improve or enhance convolution of binaural sound with the HRTFs.

Consider an example in which a software prefetcher executes prefetch instructions in program object-code to retrieve a sequence of HRTFs. The sequence of HRTFs convolve sound of a virtual sound source to localize along a path with respect to a head of a listener that rotates. While the head of the listener does not travel, the SLP of the virtual sound source travels in a path with respect to the head. In order to move the SLP as such, the sound of the virtual sound source is convolved along the HRTF path with different HRTFs, ILDs, and/or ITDs at sequential locations along the path. An example embodiment prefetches and caches the SLI, HRTF path and other data and instructions. Alternatively, if the sound is already available, the sound is convolved along the HRTF path before the sound plays to the user or before the user, program, or process requests the sound. For instance, such convolution along the HRTF path occurs a fraction of a second before the sound is played, a second before the sound is played, several seconds before the sound is played, a minute before the sound is played, several minutes before the sound is played, etc. Further, the convolved sound along the HRTF path is stored in memory for immediate retrieval and playback when requested. Since the sound is previously convolved along the HRTF path and stored in memory ready to play to the user, processing resources are not expended convolving the sound at the time that the sound is played. Thus more processing resources are afforded to other tasks at the time that the sound plays to the user.

Cache memory is random access memory (RAM) that a processor accesses much more quickly than other memory. By way of example, cache memory can be integrated with the processing chip or located on another chip.

Cache memory stores program instructions and data (such as SLI) that are or will specify convolution of binaural sound. For example, when a processor processes data (such as convolving binaural sound to one or more locations with respect to a listener), the processor first looks in the cache memory for the data. If the data is found in cache memory, then the processor has fast access to the data, and the fast access increases the overall execution speed of the software program. If the data is not found in cache memory, then the process executes a more time-consuming read of the data from an alternate memory location, such as larger memory, a cloud server, or a storage device.

SLI is stored across one or more levels of cache memory, such as level 1 (L1) cache, level 2 (L2) cache, and level 3 (L3) cache. These cache levels are stored together (e.g., integrated on a single chip) or stored across multiple chips with communicative bus architectures. For example, L1 cache is embedded with the processor chip (such as a digital signal processor or DSP). L2 cache can be located with the processor chip or located on a separate chip (e.g., a coprocessor) with a specialized or alternate bus (e.g., as opposed to the main system bus). L3 cache can be a shared cache memory location (e.g., shared between multiple cores with dedicated L1/L2 caches).

Specialized memory caches cache other data and/or instructions to improve computer performance of binaural sound. For example, a specialized memory cache includes a translation lookaside buffer (TLB) that records translations between virtual address and physical address. As another example, specialized memory caches are distributed across network locations (e.g., across multiple hosts or servers) to improve computer performance of binaural sound through enhanced scalability or preprocessing and/or processing away from the electronic device providing the binaural sound to the listener.

Consider an example in which a memory of an electronic device (such as a HPED or OHMD) includes L1, L2, and L3 cache integrated on a chip or die and main memory (DRAM). The main memory stores hundreds or thousands of HRTFs, paths, and other SLI discussed herein. The SLS predicts that a head of a listener will move along path 1 and then path 2 while a virtual sound source fixed with respect to a space is localized to the moving head. The SLS retrieves (from main memory) path 1 and path 2 and preprocesses these paths to correlate each path with a sequence of HRTFs. The SLS retrieves the corresponding HRTF files from main memory, extracts convolution data from the HRTF files, and moves the convolution data in the L1 and/or L2 cache memory. The convolution data is stored in cache in consecutive rows or other locations according to the sequence of head movements per the path. For instance, if the path requires convolution data per HRTF-1, HRTF-6, HRTF-3, HRTF-9, then the convolution data is stored for consecutive retrieval in the cache so the processor finds HRTF-1 first, then finds HRTF-6, etc. Caching the data in L1/L2 cache increases computer performance of binaural sound convolution. Sequencing the data in the cache also increases computer performance as the data is in the sequence or position that correlates with the path and head movement. When the user subsequently moves his or her head along the path, the processor has the convolution data already loaded into cache and executes a cache hit. The processor will also see or find the data already in the correct order (e.g., HRTF-1, HRTF-6, HRTF-3, HRTF-9 for this example). In this way, the processor does not traverse or read the entire cache to find out if the convolution data is present. Further, if the complete required convolution data is located in L1 cache, then the processor rapidly executes convolution of the sound despite rapid head movement and concurrent convolution of multiple virtual sound sources.

The SLI is stored in different types of cache mappings, such as direct-mapped cache (each memory block maps to exactly one cache location), fully-associative mapping (each memory block maps to any or multiple cache locations), and n-way associative mapping (each memory block maps to "N" locations in cache).

An example embodiment also executes a cache control instruction to improve computer performance by decreasing cache data or cache pollution data, reducing bandwidth, and decreasing latencies. For example, the processor executes an instruction stream that includes a code (e.g., a hint) that when executed evicts, discards, or prepares cache lines. For instance, sequential convolution data to maintain a SLP as fixed in space during head movement are cached in successive cache lines for sequential retrieval by the DSP during sound convolution.

In some instances, multiple copies of data or multiple alternative data is stored in local memory of a processor while waiting for execution instructions of the data. For example, the processor issues multiple parallel read operations of two or more paths that indicate directions in which the listener may turn his or her head. The data remains in local memory until data per one of the stored paths is requested.

Preprocessing includes parsing or extracting data and/or instructions from files. For example, the coordinates of a HRTF and/or SLP and other HRTF information are calculated or extracted from the HRTF data files. A unique set of HRTF information (including r, $\theta$, $\phi$) is determined for each unique HRTF. This data can be arranged according to one or more standard or proprietary file formats, such as AES69, Matlab, or OpenAL file format, and extracted from the file.

Preprocessing includes interpolating SLPs, HRTFs, or SLI to convolve binaural sound.

Consider an example in which a software program provides binaural sound to a listener. The software program determines that the binaural sound will or may localize to SLP-1 having spherical coordinates (4.5 m, 30°, 10°) with respect to a current location and forward looking direction of the user. The software program has access to many HRTFs for the listener but does not have the HRTFs with coordinates that correspond to the specific location at SLP-1. The software program retrieves several HRTFs with coordinates close to or near the location of SLP-1 and interpolates the HRTFs for SLP-1. By way of example, in order to interpolate the HRTFs for SLP-1, the software program executes one or more mathematical calculations that approximate the HRTFs for SLP-1. Such calculations can include determining a mean or average between two known SLPs, calculating a nearest neighbor, or executing another method to interpolate a HRTF based on known HRTFs.

Figure 3:
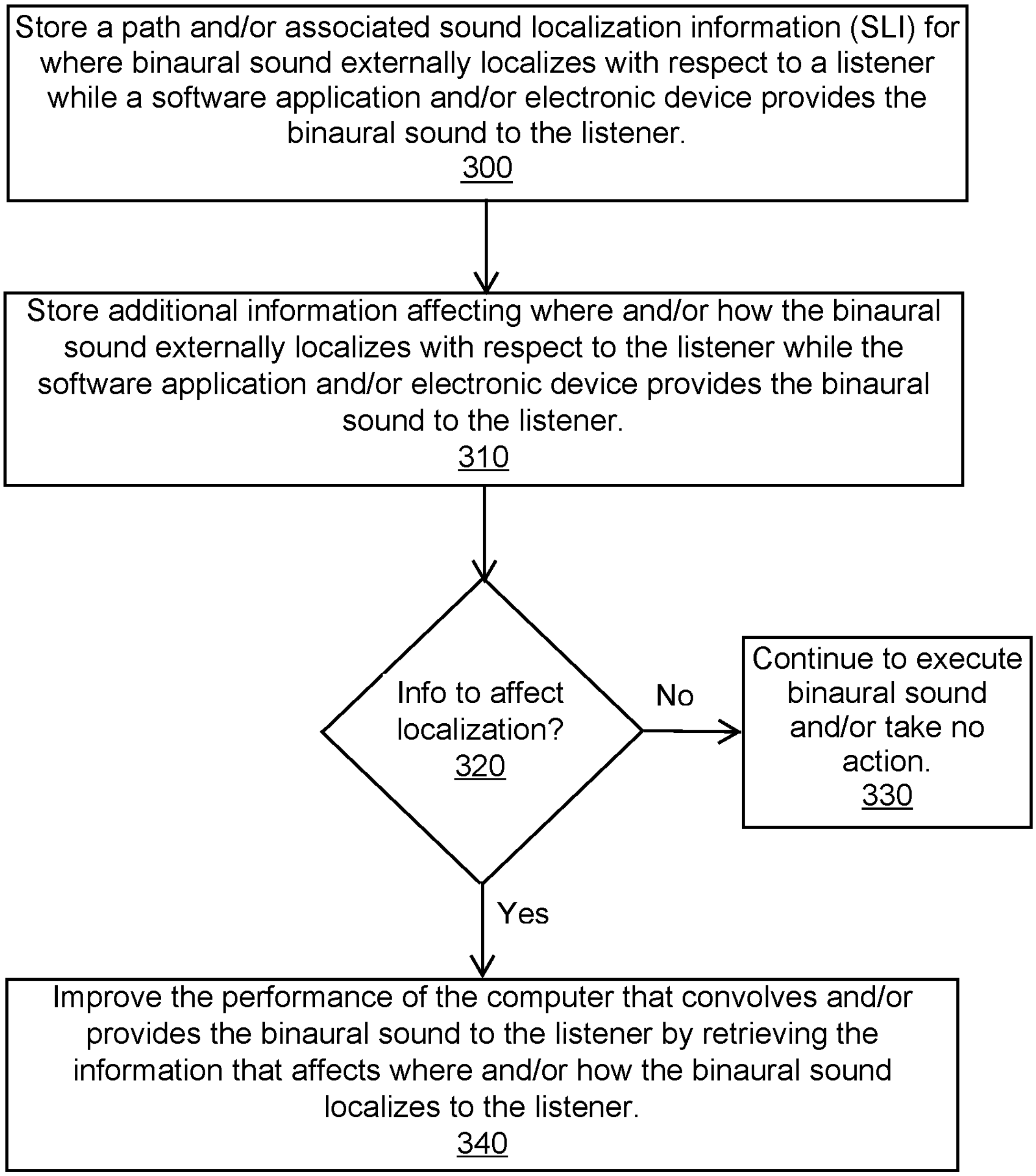
FIG. 3 is a method that improves performance of a computer that convolves binaural sound to a listener in accordance with an example embodiment.

FIG. 3 is a method that improves performance of a computer that convolves binaural sound to a listener in accordance with an example embodiment.

Block 300 states store a path and/or associated sound localization information (SLI) for where binaural sound externally localizes with respect to a listener while a software application and/or electronic device provides the binaural sound to the listener.

Example embodiments store or record where binaural sound externally localizes to a listener while the listener listens to the binaural sound with the software application and/or electronic device. This information is stored as a path, such as a head path, a HRTF path, a virtual sound source path, a series of coordinate locations, an equation describing or defining a path, a plurality of SLPs, a plurality of ITDs and ILDs, and/or other path. Other information is stored as well, including but not limited to one or more of information about the listener, information about the software application providing the binaural sound to the listener, information about the electronic device providing binaural sound to the listener, and SLI associated with the head movements, points, locations, coordinates, directions, etc. in the paths. The information provides a record or history of where and how binaural sound previously localized with respect to the head of the listener or other location and provides insight into where binaural sound will localize to the listener at a future time. Example embodiments gather, analyze, and store the information in order to improve accuracy of predictions for binaural sound localization.

With regard to the information about the listener, each listener has one or more preferred external locations for the localization of binaural sound (e.g., where a listener wants sound to originate). Example embodiments store these locations as preferred SLPs and store other information associated with the preferred SLPs (such as a GPS location of the listener, time and date, length of time binaural sound localized to the SLP, head and/body movements, etc.).

For example, Alice localizes a voice of Bob during a telephone call with Bob to a preferred location that is slightly to the right side of her face, such as a SLP at (1.2 m, 15°, 10°). During the telephone call, Bob prefers to localize the voice of Alice across from his face, such as a SLP at (1.0 m, 0°, −15°). During subsequent telephone calls, Alice and Bob will likely localize the voice of the other person at matching or similar locations.

The example of Alice and Bob in a telephone call illustrates that listeners prefer a consistent or a predictable listening experience in some types of software applications. The locations of prior SLPs thus provide an indication where the listener will localize sound at a time in the future. Example embodiments store and analyze the information to improve performance of a computer that convolves or provides binaural sound to a listener (e.g., prefetching, caching, and/or preprocessing sound based on historic locations where the listener previously localized sound).

For example, when Alice receives a call from Bob, her smartphone (or electronic device providing the binaural sound) prefetches, preprocesses, and caches SLI so the convolution data is available to convolve the voice of Bob to the preferred or predicted SLP at (1.2 m, 15°, 10°). If the voice of Bob does localize to the SLP, then the smartphone processors expeditiously convolve the voice of Bob to the SLP without delay or expenditure of unnecessary processing resources relating to position selection and repositioning. As such, as soon as Bob is identified as the caller (e.g., from a caller ID while the smartphone continues to ring), the smartphone of Alice retrieves a preferred SLP for the voice of Bob.

Further, an example embodiment prefetches HRTFs in order to localize the voice of Bob at the SLP in the event that Alice chooses to accept the incoming telephone call. If Alice answers the telephone call, the voice of Bob localizes to the SLP quickly and automatically without input from Alice. The process provides Alice with an electronic telecommunication experience that emulates a face-to-face conversation with Bob.

Example embodiments obtain and examine information about the execution of localizations with respect to which software applications provide the localizations. The example embodiments examine the information in order to determine consistent, repeatable, known, or predictable localization information. Example embodiments analyze the information and predictions in order to execute methods and/or apparatus discussed herein for improving performance of a computer providing binaural sound to a listener.

For example, a VR gaming software application is programmed to execute localization of binaural sound exclusively for SLPs that are in a current field-of-view (FOV) of the listener (e.g., ±50° azimuth of the medial plane of the listener) in order to reduce excess demand for convolution. The reduction in demand for convolution improves delivery of external localizations of binaural sound in the FOV of the listener.

An example embodiment learns or determines patterns of localizations that a VR gaming software application executes or requests. For example, the SLS detects patterns with respect to the retrieval of HRTFs having an azimuth angle within 50° of 0°, patterns of HRTF paths that start or end where 9=±50°, or other patterns that facilitate the VR game in prediction of localization. Further, consider an example in which the SLS predicts that the user will turn his or her head in a specific direction at a future time. The SLS is predicting the future FOV of the listener and thus predicting a different subset of which SLPs will require convolution since the VR game limits localization to SLPs in the FOV.

The example of the VR gaming software illustrates that software applications themselves can be programmed to restrict or limit where binaural sound localizes to listeners. Software applications can also localize sound to consistent or predictable SLPs or paths. The locations of prior SLPs, paths, or locations coded in the software thus provide an indication where binaural sound will localize to the listener at a time in the future. Example embodiments store and analyze the location information to improve performance of a computer that convolves or provides binaural sound to a listener (e.g., prefetching, caching, and/or preprocessing sound based on measuring, observing, and/or predicting where the software application is programmed to localize sound).

Consider an example in which the user plays a VR game that requires the user to bend down to avoid obstacles. When the user bends down, virtual sound sources in the VR world continue to localize at their SLPs fixed in the VR world. When the user bends down and his head changes position relative to the virtual sound sources, the SLS specifies different HRTF pairs. The different HRTF pairs convolve the sounds of the virtual sound sources into binaural sounds so that the user continues to hear the virtual sound sources localized to their fixed positions in the VR world. In anticipation of the user bending down, the software application prefetches and/or caches the different HRTF pairs having the different coordinates for each fixed virtual sound source. When the user bends down to avoid the obstacle, the processor finds the HRTF data in L1/L2 cache. If the SLS also knows the sound that will play from a virtual sound source at the predicted time that the user bends down, then the SLS also convolves the known or predicted sounds in advance of the motion of the user. The SLS stores these convolved sounds in order to play them at the time of the predicted bending motion. When the user bends down, the convolved sound is already available, and the SLS has more computational resources available for other tasks that were not predicted.

Example embodiments obtain and examine information about the execution of localizations with respect to which electronic device(s) provide the localizations. The example embodiments examine the information in order to determine consistent, repeatable, known, or predictable localization information. Example embodiments analyze the information and predictions in order to execute methods and/or apparatus discussed herein for improving performance of a computer providing binaural sound to a listener.

Different electronic devices have different capabilities or limitations with respect to localizing binaural sound to a user. For instance, a head mounted display (HMD) executes a space colony exploration game that provides binaural sound as an immersive VR world that stretches 360° around the user. By contrast, electronic glasses or a mobile electronic device with a flat or curved display executes the same game but displays the space colony in the limited FOV of the display. The HMD localizes sounds behind the player but the exploration program executing on the mobile electronic device does not localize sound behind the player in the interest of safely. Furthermore, the HMD has different hardware specifications, such as different L1/L2 cache sizes, processor speeds, etc. These differences affect how much or which data is prefetched, preprocessed, and/or cached.

The example of the space colony exploration game illustrates that electronic devices have different capabilities or limitations in providing where binaural sounds localize to users. Information about where particular electronic devices do and do not localize binaural sound provides an indication where binaural sound will localize to the listener at a time in the future. Example embodiments store and analyze the information to improve performance of a computer that convolves or provides binaural sound to a listener (e.g., prefetching, caching, and/or preprocessing sound based on the electronic device providing the binaural sound to the listener).

Consider an example of an electronic device that provides sound localization to a listener but does not include or couple with a head tracking system so that changes in the head position of the listener are not measured. Based on the information about the electronic device, the SLS determines or observes that computationally expensive mass convolution is not required for the multiplicity of virtual sound sources due to head rotation (unless the listener issues occasional discrete changes of head orientation coordinates in another way such as a mouse gesture to look left or right). Instead, processes that execute changes in localization will occur primarily due to changes of locations of virtual sound sources. An example embodiment therefore considers the information about the electronic device to pre-allocate an estimated surplus of processing power to increase the accuracy of convolution of binaural sound for moving virtual sound sources. For example, the SLS preprocesses interpolation of HRTFs at a finer resolution than computationally affordable were the limited convolution resources allocated to accommodate the rotation of world space axes and multiple SLPs at the time of each head orientation.

Consider another example in which an electronic device provides head orientation data to the SLS from an inertial head tracking system, such as a face-mounted HPED, but does not provide positional data of the head. In this case, the SLS does not receive or observe changes in the distance coordinates of virtual sound sources unless the virtual sound sources move, or unless the listener designates a change of head position in another way (e.g., issues a keyboard command to move away from a virtual sound source, issues a voice command to move closer a virtual sound source, etc.). The example embodiment therefore evaluates the information about the electronic device to direct the SLS to operate in a mode that predicts angular changes to virtual sound sources as more likely than distance changes to virtual sound sources. The SLS prefetches a smaller variety of potential HRTFs that vary in distance and prefetches a larger number of potential HRTFs that vary in azimuth. These actions result in an increase in the cache hit rate that improves the performance of a computer executing the localizations.

Thus, information regarding one or more of the listener, the software application, and the electronic device provides useful information in improving the performance of a computer that provides binaural sound to a listener.

Block 310 states store additional information affecting where and/or how the binaural sound externally localizes with respect to the listener while the software application and/or electronic device provides the binaural sound to the listener.

In addition to the listener, the software application, and the electronic device, example embodiments analyze other information to improve execution of external localization. The analysis assists in determining where and/or how the binaural sound externally localizes to the listener. The information or factors include, but are not limited to, one or more of sound that is convolved or processed (e.g., the sounds or signals of the virtual sound sources that the listener localizes or hears), analysis of the processes executing on the electronic devices of the listener, a geographical location of the listener (e.g., a GPS location of the listener), a VR location (e.g., a VR universe where the listener interacts), an indoor location (e.g., whether the listener is in a bedroom versus a bathroom), a time of day or date (e.g., morning time versus evening time), other people participating in the software application (e.g., other people in a telephone call with the listener or other players in a VR software game), and a listening or activity context of the listener (e.g., in a car, in a meeting, on public transportation, in a public, crowded, or noisy place, in motion, preoccupied, currently speaking/singing/vocalizing).

An example embodiment examines information about localization instances in order to predict what sound or which sound, sound file, or sound stream will be played by, attributed to, or originate from a virtual sound source or SLP. The predicted sound can be a file and/or stream or part of a file and/or stream of known sound, such as a music file or video soundtrack. The predicted sound can be short (such as a fraction of a second) or long (such as several seconds, several minutes, or longer). For example, a certain chime or greeting plays or is externally localized at various times and/or coordinates over time. An example embodiment evaluates the information about the localization events to predict a future localization time (e.g., a time relative to Greenwich Mean Time, a time relative to the current moment, a time relative to a prior localization, a time relative to a future system event) and/or future location coordinate (e.g., a SLP, HRTF, a coordinate relative to a virtual sound source position or head position, a coordinate relative to a position in the physical or virtual environment of the listener or relative to a virtual sound source location). For predicted location coordinates that are compatible with predicting the SLP as well (e.g., a certain predicted HRTF, a certain predicted nonmoving virtual sound source localizing to a nonmoving listener, a virtual sound source with a known trajectory relative to a listener with a known trajectory), an example embodiment pre-convolves the predicted sound to one or more predicted SLPs. Pre-convolution greatly increases the real-time performance of binaural localization by relieving the processor of predicable convolution tasks at localization time and by allocating more convolution time to localizations that are less predictable or unpredictable. Further, when the time of the predicted sound is known in addition to the predicted SLP, the pre-convolved predicted sound is prefetched and preprocessed or prepared for output to the listener (e.g., scheduling the pre-convolved sound to load to an audio output buffer or cache).

Consider an example of an augmented reality (AR) treasure hunt game that invites a player to select or indicate various physical and virtual objects in his or her environment. If the object includes a treasure then the game application localizes a certain "hurrah!" voice so the player hears the voice from the object. If the object does not include a treasure the game application convolves a certain buzz sound to a SLP coincident with the object. 10% of the objects have treasure included. After a player enjoys a few rounds of the game, an example embodiment predicts that the player will remain seated and unmoving, predicts future SLPs of localizations, and predicts with 90% likelihood that the sound to be localized will match a buzz sound (i.e., the buzz sound observed in the record of prior localization events instantiated by the AR treasure game). When the player selects an object, the SLS has already prefetched the predicted HRTFs and prefetched and/or preprocessed the buzz sound for convolution. Or, when the player selects an object, the SLS has already preprocessed and preloaded the pre-convolved buzz sound to the audio output buffer for immediate playing.

A real location and/or a virtual location of a listener are factors that determine where and how binaural sound will localize to the listener. For example, when Alice is in her office, she localizes voices during telephone calls to one of three SLPs (e.g., SLP1, SLP2, or SLP3). When Alice is in her bedroom, she localizes voices during telephone calls to one of three different SLPs (e.g., SLP 5, SLP 14, or SLP 62). Thus, the location of Alice provides information that affects the prediction about where she will localize a voice of a telephone call. An example embodiment makes the prediction before the telephone call commences (or when the telephone call commences) and retrieves SLP and/or SLI to improve performance of an electronic device convolving or providing the binaural sound to Alice.

A time of day or a time of an event are factors that determine where and how binaural sound will localize to the listener. For example, Bob places a cake in an oven in his kitchen and sets a timer for 30 minutes to notify him when the cake is finished baking. Several seconds before expiration of the time, the SLS begins tracking the location of Bob in the house in order to correlate the head position of Bob with respect to the location of the oven in the kitchen. The SLS determines the forward-looking direction of Bob with respect to the coordinate location of the oven, retrieves the corresponding HRTF pair, preprocesses and caches the convolution data. When the time expires, a voice announces, "The cake is ready." From Bob's point-of-view, the voice emanates from the location of the oven in the kitchen. Since the correct convolution data was retrieved before convolution, the SLS provides the binaural voice to Bob with minimal processing resources and in real-time upon expiration of the timer.

Consider an example in which the context of Alice is "do not disturb" and the information about her context affects the prediction of the execution of binaural sound to Alice. Bob calls Alice. By considering historical localization data of Alice's use of the combination of the electronic device (e.g., smartphone) and software application (e.g., telephone program), the SLS would predict that Alice would localize the voice of Bob to a certain SLP. However, the SLS also considers the context of Alice (that she does not want to be disturbed) and predicts that she will not accept the call, and instead capture a voice message from Bob. By examining the additional information about Alice (her context), the SLS does not prefetch HRTFs for the certain SLP and thereby affords cache storage for other processes (such as other localizations), and this improves the performance of the electronic device.

Consider an alternative to the example above. The SLS does predict the retrieval of the certain SLP when Bob calls and prefetches the corresponding HRTF. After 14 seconds of ringing, Alice has not accepted the call. So, the SLS drops and clears the prediction in order to reallocate memory to other processes. Alice does not accept the invitation to talk to Bob and the telephone program of Alice stores a voice message from Bob. Alice removes her headphones and the SLS considers the context ("headphones off") to predict execution of localization. The SLS also examines currently executing software application processes for additional information to predict localization. A voice message system is executing and indicates a voice message waiting from Bob. The SLS predicts that the voice message system will retrieve, convolve, and re-store the voice message during the down-time while Alice remains in the "headphones off" context or state. The SLS prefetches and caches the HRTFs corresponding to the default SLP where Alice localizes Bob. The SLS bases the prediction not primarily on Alice, the binaural telephone software application, or the electronic device. Instead, the SLS bases the prediction on the additional information, the context of Alice, and the inspection of the other running software applications. Later when Alice listens to the voice message, she hears the voice of Bob localized at the familiar location.

Block 320 makes a determination as to whether other available information can improve the execution of a localization.

If the answer to this determination is "no" flow proceeds to block 330 that states continue to execute binaural sound and/or take no action.

If the answer to this determination is "yes" flow proceeds to block 340 that states improve the performance of the computer that convolves and/or provides the binaural sound to the listener by retrieving the information that affects where and/or how the binaural sound localizes to the listener.

As noted, an example embodiment considers information about the listener, information about the software application, information about the electronic device, and/or information about one or more other factors in the prediction of binaural sound localization to a listener (e.g., where and/or how the binaural sound localizes to the listener). Retrieval and/or processing of the information expedites convolution of binaural sound to listeners.

An example embodiment prefetches and/or preprocesses sound localization information, sound files, and other data based on a determination of one or more of the software application providing the binaural sound to the listener, the external location where the sound will localize (e.g., what SLP), the electronic device providing the binaural sound to the listener, user preferences, historical or previous locations where sound externally localized, whether convolution data is known for the SLP(s) or will be calculated or interpolated, and other factors discussed herein.

In an example embodiment, a processor or preprocessor executes, processes, and/or preprocesses the data relating to sound localization of binaural sound (e.g., SLPs, and/or SLI).

A preprocessor is a program that processes the retrieved data to produce output that is used as input to another program. The output can be generated in anticipation of the use of the output data. For example, an example embodiment predicts a likelihood of requiring the output data for binaural sound localization and preprocesses the data in anticipation of a request for the data. For instance, the program retrieves one or more files including HRTF pairs and extracts data from the files that specify a convolution of sound to localize as binaural sound at a location specified with the HRTF pair data. The extracted or preprocessed data is quickly or more efficiently provided to a DSP in the event the sound is convolved with the HRTF pair.

Preprocessing also includes multiple different SLPs that a software application is anticipated or predicted to convolve to. For example, a user dons a HMD and activates a VR conferencing program that enables the user to execute telephone calls in a VR environment. An example embodiment reviews SLPs that the VR program previously localized sound to and retrieves SLI for anticipated convolution and localization. The retrieval of the SLI occurs before a request is made for binaural sound to localize to a SLP.

As another example, the processor requests a data block (or an instruction block) from main memory before the data block is needed. The data block is placed or stored in cache memory or local memory so the data is quickly accessed and processed to externally localize binaural sound to the user. Prefetching of the data reduces latency associated with memory access. The data block includes SLPs, and/or SLI. For example, the data block includes coordinate locations of one or more SLPs and HRTFs, ITDs, and/or ILDs for the SLPs at the coordinate locations.

Consider an example in which the location of the user with respect to an object is considered in order to prefetch data. For example, a user is 1.5 meters away from an object or other external localization point that might serve as a SLP for a telephone call, game, or voice of an IPA. The object is at eye-level with the user. The distance of 1.5 meters remains relatively fixed, though the head orientation of the user changes or moves. In response to the information, an example embodiment prefetches SLPs and corresponding HRTF pairs that have a distance of 1.5 meters with an elevation of zero degrees. For example, the example embodiment prefetches SLPs and/or HRTFs corresponding to (1.5 m, X°, 0°), where X is an integer. Here, the X represents different compensations for azimuth angles to which the user might move his or her head when sound convolving commences. For instance, the example embodiment retrieves HRTF data corresponding to (1.5 m, 0°, 0°), (1.5 m, 5°, 0°), (1.5 m, 10°, 0°), (1.5 m, 15°, 0°), . . . (1.5 m, 355°, 0°). Alternatively, the example embodiment retrieves other azimuth angle intervals, such as retrieving HRTF data for each 3°, 6°, 10°, 15°, 20°, or each 25° of azimuth angle. When convolution commences, the data for the particular azimuth angle has already been retrieved and is available in cache or local memory for the processor to expedite convolution of the sound.

Consider an example in which a user has a smart speaker that includes a VPA or an intelligent personal assistant (named Hal) that answers questions and performs other tasks via a natural language user interface and speaker located inside the smart speaker. When the user is proximate to the smart speaker, the user asks Hal questions (e.g., What time is it?) or asks Hal to play music (e.g., Play Beethoven). Sound emanates from one or more speakers in the smart speaker so the user hears the answer, listens to music, etc. When the user wears wireless earphones, however, the sound does not emanate from speakers located inside the smart speaker. Instead, the sound is provided to the user through the earphones, and the sound convolves such that it externally localizes at the location of the smart speaker. When the user wears the wireless earphones, speakers in the smart speaker do not play sound. Instead, the sound is convolved to a SLP located at the physical object which is the smart speaker. Alternatively, the sound convolves to externally localize at other SLPs, such as SLPs in 3D space around the user or other SLPs discussed herein.

Consider further this example of the smart speaker with an IPA named Hal. When the user wears wireless earphones or headphones and walks into the room near the smart speaker, the computer system recognizes that sound will be provided through the earphones and not through the speaker of the smart speaker. Even though the user has not yet made a verbal request or command to Hal, the computer system (or an electronic device on the user, such as a smartphone, smart earphone, smart headphones, hearable) tracks a location of the user with respect to the smart speaker and retrieves sound data based on the location information. For example, the sound data includes a volume of sound to provide to the user based on the distance, an azimuth and/or elevation angle of the user with respect to the fixed location of the smart speaker, HRTF pairs that are specific to or individualized to the user, and/or information about coordinates and/or SLPs where sound from the IPA such as the voice of Hal can or might localize to the user. The sound data is stored in a cache with or near the DSP. If the user makes a verbal request to Hal (e.g., What time is it?), the distance/SLP and HRTF data are already retrieved and cached. In this instance, a cache hit occurs since the requested data to convolve the sound has already been retrieved. The DSP quickly convolves the data based on the location of the user with respect to the smart speaker so the voice of Hal localizes to the physical speaker of the smart speaker. By way of example, the DSP includes a Harvard architecture or modified Harvard architecture with shared L2, split L1 I-cache and/or D-cache to store the cached data.

Consider further the example of the smart speaker with an IPA, Hal. As the user walks around a room where the smart speaker is located, a head position or path of the user is continually or continuously tracked with respect to the physical location of the smart speaker. The head path includes an azimuth angle to the smart speaker, an elevation angle to the smart speaker, a distance from the head of the user to the smart speaker, and the orientation of the head of the user. Sound localization information (e.g., including a HRTF pair) is continuously or continually retrieved for each new head position/orientation. For instance, the azimuth angle, elevation angle, and distance coordinates of the HRTF pair are adjusted as the position/orientation of the head of the user change relative to the smart speaker. If the user asks Hal a question, the corresponding SLI is already retrieved so that the voice of Hal is convolved according to the current head position of the listener. For instance, electronic earphones on the user provide the voice of Hal such that the voice originates from the location of the smart speaker even though the speakers inside the smart speaker are not providing the voice response. Instead, the earphones provide the voice response to the user who hears the voice of Hal as originating from the location of the smart speaker.

Consider the example above in which the smart speaker includes a motion tracker that tracks the location and head path of the head of the listener. For example, the smart speaker includes an infrared (IR) or radio frequency (RF) beacon that the smart earphones evaluate to determine their own position. Alternatively, the smart speaker determines the position of one of the smart earphones (e.g., the left or right earphone) with a tracking system included with the smart speaker. For example, an optical tracking system reads a 2D optical code on the left earphone as it is worn by a listener, and determines the orientation of the 2D optical code. The smart speaker deduces from the orientation of the 2D optical code known to be affixed to and flush with the left ear an axis of orientation of the head as a line normal to the surface of the 2D optical code of the left earphone. The smart speaker further determines that the center point of the head is four inches along the normal line. The smart speaker having determined the location and/or orientation of the head, and being in communication with the earphones, sends to the earphones the position and orientation coordinates of the head relative to the smart speaker and/or to the room. The smart earphones knowing the location and orientation of the head further provide the location and orientation of the head to the SLS, to other devices, to software applications, to a SLS/convolver on a server over a network (e.g., a cloud server), or to a convolver in the smart earphones.

In order to improve performance of an example embodiment convolving binaural sound to a listener, the SLS may pause the execution of a localization (if the localization is not required to be timely) and determine the start and end or duration of the pause. For example, the predictor determines that the head is in rotation and triggers the SLS to pause convolution of one or more SLPs not requiring convolution in real-time for a certain duration or until the head is not in rotation or predicted to complete the rotation. The SLS avoids expenditure of considerable processing resources required to convolve multiple virtual sound sources to multiple changing SLPs. When convolution resumes the SLS convolves the virtual sound sources to the SLPs corresponding or correlating to the current locations of the virtual sound sources relative to the current head position. The SLS convolves the sound of each virtual sound source from the time-code or point in the playing of the sound when the sound was paused, or as appropriate, skipping forward in the time-code of the sound by the duration of the pause. In other words, the SLS determines for each SLP, whether to continue playing the sound stream from the pause point or from the point that would be playing if the sound had not been paused. Consider a similar example in which for the duration of the pause the SLS does not pause but instead continues to play the sounds of the virtual sound sources but without convolution (e.g., playing in mono sound), or with partial convolution (such as convolving with a RTF but not a HRTF).

Example embodiments execute an action to increase or improve performance of a computer providing binaural sound to externally localize to a user in accordance with an example embodiment. The computer includes electronic devices such as a computer system or electronic system, wearable electronic devices (WEDs), servers, portable electronic devices (PEDs), handheld portable electronic devices (HPEDs), and hardware (e.g., a processor, processing unit, digital signal processor, controller, memory, etc.).

Example actions include, but are not limited to, one or more of the following: storing HRTFs and/or other SLI in cache memory, local memory, or other memory or registers near or close to the processor (e.g., a DSP) executing an example embodiment, mapping and storing virtual sound source paths or coordinates, head paths or coordinates, and/or HRTF paths or locations of SLPs for users so the coordinate information is known in advance (e.g., before sound for a requesting software application convolves to a SLP or HRTF path), storing in cache memory, local memory, or other memory near or close to the processor (e.g., a DSP) executing an example embodiment coordinate points of one or more of SLPs, HRTF paths, virtual sound source paths, head paths, other coordinate paths, prefetching HRTFs and/or SLI, prefetching coordinates of one or more of virtual sound source paths, head paths, HRTF paths, SLPs of users, storing in a lookup table one or more of virtual sound source paths, head paths, HRTF paths, HRTFs, SLI, storing with or as part of an audio file one or more of virtual sound source paths, head paths, HRTF paths, HRTFs, SLI, wirelessly transmitting with or as part of the audio file or audio stream one or more of virtual sound source paths, head paths, HRTF paths, HRTFs, SLI, SLPs, predicting where a user will externally localize sound and prefetching or preprocessing in response to the prediction one or more of virtual sound source paths, head paths, HRTF paths, HRTFs, SLP coordinates, other coordinate paths, and/or SLI, predicting what sound will be localized to a user and prefetching the sound, pre-convolving the sound, preprocessing the sound for convolution and/or output, configuring specialized or customized hardware to execute one or more of these actions (e.g., configuring logic gates or logic blocks in a FPGA to execute blocks in figures, as opposed to executing software instructions in a processor to execute the blocks in the figures), and taking other actions discussed herein (e.g., with respect to hardware such as the DSP, cache memory, performance enhancer, and prefetcher).

Example embodiments execute the action to increase or improve performance of the computer providing the binaural sound that externally localizes to the user. The action can be executed with software and/or one or more hardware elements, such as a processor, controller, processing unit, digital signal processor, and other hardware (e.g., FPGAs, ASICs, etc.).

As one example, the external location designating where to localize the sound and/or the SLI are included with the audio file (e.g., in the header, in one or more packets being transmitted or received, with metadata, or with other data or information). The inclusion reduces processing execution time or processing cycles (e.g., DSP execution times and/or cycles) since the localization information and/or SLI is included with the sound.

Consider an example in which a software telephony application provides users with video chat and voice call services, such as telephone calls or electronic calls. When an electronic device (e.g., a smartphone) of a user receives an incoming call, the call includes coordinate locations for localizing the voice of the caller to the user receiving the call. Furthermore, the incoming call also includes SLI or information to convolve the sound (e.g., HRTFs and/or HRTF coordinates or paths, virtual sound source coordinates or paths, ILDs, ITDs). The smartphone simultaneously receives the incoming call and localization information. The smartphone is not required to execute processing steps in determining access to SLI resources, establishing connections to the resources, and retrieving the SLI data to determine how to convolve the sound. The smartphone is also not required to execute processing to determine where to externally localize the call in binaural sound to the user since the coordinates for the location and/or the SLI are provided together with or included in the sound and/or video data (such as in the case of including HRTF coordinates or HRTF paths). Further, instead of providing the information as coordinates, the incoming call includes the indication of the location of a SLP, or zone or path around the user expressed as a label or name by prearrangement, or a description. For example, a user assigns the label "Unknown Caller" to a zone of localization near the medial plane and near to a −15° elevation angle, and assigns the label "URGENT" to SLP (0.5 m, 0°, 80°). When an unknown caller rings the device, the example embodiment prefetches HRTFs corresponding to the "Unknown Caller" label configured in the smartphone of the user.

Consider an example of a telephone call in which the electronic device or software application executing the call transmits a call along with one or more of the following: HRTFs, SLPs, HRTF paths or virtual sound source paths or coordinates where the caller will localize the voice of the other party or parties to the call, the SLPs or head paths where the other party or parties to the call will localize the voice of the caller, SLI (e.g., HRTFs, ITDs, and/or ILDs) in order to externally localize the voice of the caller as binaural sound to the party or parties, and SLI (e.g., HRTFs, ITDs, and/or ILDs) in order to externally localize the voice of the party or parties as binaural sound to the caller. Transmission of the information expedites execution of the telephone call. The information exchange also provides that the electronic devices and/or software programs of the call have shared information regarding coordinate locations of voices and virtual sound sources, and convolving instructions in the form of SLI. The information, for example, assists in expediting execution of telephone calls in which participants see each other in virtual rooms or VR environments.

Consider an example embodiment that stores in a lookup table one or more of SLI, SLPs, coordinate points and other information from one or more of head paths, virtual source paths, HRTF paths, or other paths discussed herein. When a user or software application requests to externally localize sound, the SLS retrieves and/or derives the information necessary for determining or predicting the sound location or executing the convolution or localization from the lookup table. A lookup table is an array that replaces runtime computation with an array indexing operation in order to expedite processing time. For example, the lookup table stores the HRTFs, ILD, ITD, head paths, virtual source paths, and/or HRTF paths and thus saves execution of a computation or input/output (I/O) operation.

For example, the lookup table is stored as a file or component of a file or data stream. Alternatively, the file also includes the sound, such as the sound data and/or a pointer to a location of the sound or sound data and/or other sounds. The SLS executing prediction operations accesses the sound data in order to preprocess the sound for convolution and/or output. For example, the file includes the sound data and a URL to the sound data stored in a separate location. The SLS accesses the lookup table to preprocess the parsing of the table into the executable data elements and to store the data in low latency memory locations. As another example, a lookup table included in the data or sound stream includes a pointer to or identification of the sound (e.g. a filename such as a local file name). In this example, an application or a process executing the sound localization operating on the computer system or electronic device receives the lookup table with the SLI at the start of the transmission of the stream. In the event of network congestion or fault, the application refers to the pointer in order to find an alternate source of the sound or sound data. The application continues to preprocess and/or localize the sound retrieved from the alternate source without relying on timely delivery of the sound from the stream. In addition, the application fetches and preprocesses the sound data from the alternate source in advance of the playing of the sound in order to pre-convolve and/or analyze the sound to improve the performance of the delivery of localized sound to the user. The prefetched data is also cached, such as caching in L1 or L2 memory.

As yet another example, a 3D area away from a user includes tens, hundreds, or thousands of SLPs. Retrieving and processing the large number of SLPs and associated SLI are process-intensive, are process-expensive, and consume local memory space. The prediction processes of the SLS disregard fetching or preprocessing of SLPs and SLI in a restricted zone or area in order to significantly reduce process execution steps and time. For instance, the SLS prefetches and/or preprocesses SLPs in and/or SLI of an active or predicted zone for an executing software application (or software application about to execute). Further, the SLS does not prefetch SLPs and/or SLI when the SLS determines that the SLI applies to an inactive zone, a restricted zone, or a zone to which the software application is not localizing sound, is not predicted or permitted to localize sound, or will not localize sound.

Consider an example in which a user previously provided instructions or commands to externally localize a voice in a telephone call or VR software game to SLP 1 and SLP 7. When the user executes the telephone application or VR software game, the application prefetches SLI for SLP 1 and SLP 7 before the user makes a command or a request that requires the SLI. If the user thereafter instructs or commands to externally localize the voice to SLP 1 or SLP 7, then the information is already retrieved and preprocessed to expedite convolution of the voice. For example, the SLP selector queries a localization log to find prior instances of localization to SLP 1 and SLP 7. The SLP selector retrieves the SLI associated with those instances such as the HRTFs or HRTF path or HRTF path ID, or pairs and/or the sound or resource reference or link to the sound. The SLP selector retrieves the sound for preprocessing. The SLP selector also preprocesses the HRTF path ID of the HRTF path localized in the instance, the process being: retrieve the HRTF path pointed to by the HRTF path ID, parse the HRTF coordinates from the HRTF path, retrieve or prefetch each or initial HRTF pairs corresponding to the parsed coordinates.

In some instances, listeners move their head within a predictable range of motion or along a predictable path while binaural sound externally localizes to the listener. For example, when two people speak to each other in person (e.g., standing face-to-face), they typically do not talk and listen with perfectly still heads. Instead, they make minor, yet predictable, head movements. For instance, these movements include shaking the head up and down as a gesture of agreement, moving the head left and right as a gesture of disapproval, rotating the head to the left or right to signify confusion or lack of understanding, tilting the head and moving it back to signify disbelief or surprise, etc. Example embodiments prefetch, preprocess, and/or cache SLI associated with these types of head movements in order to improve performance of a computer that provides binaural sound to a listener.

Figure 4:
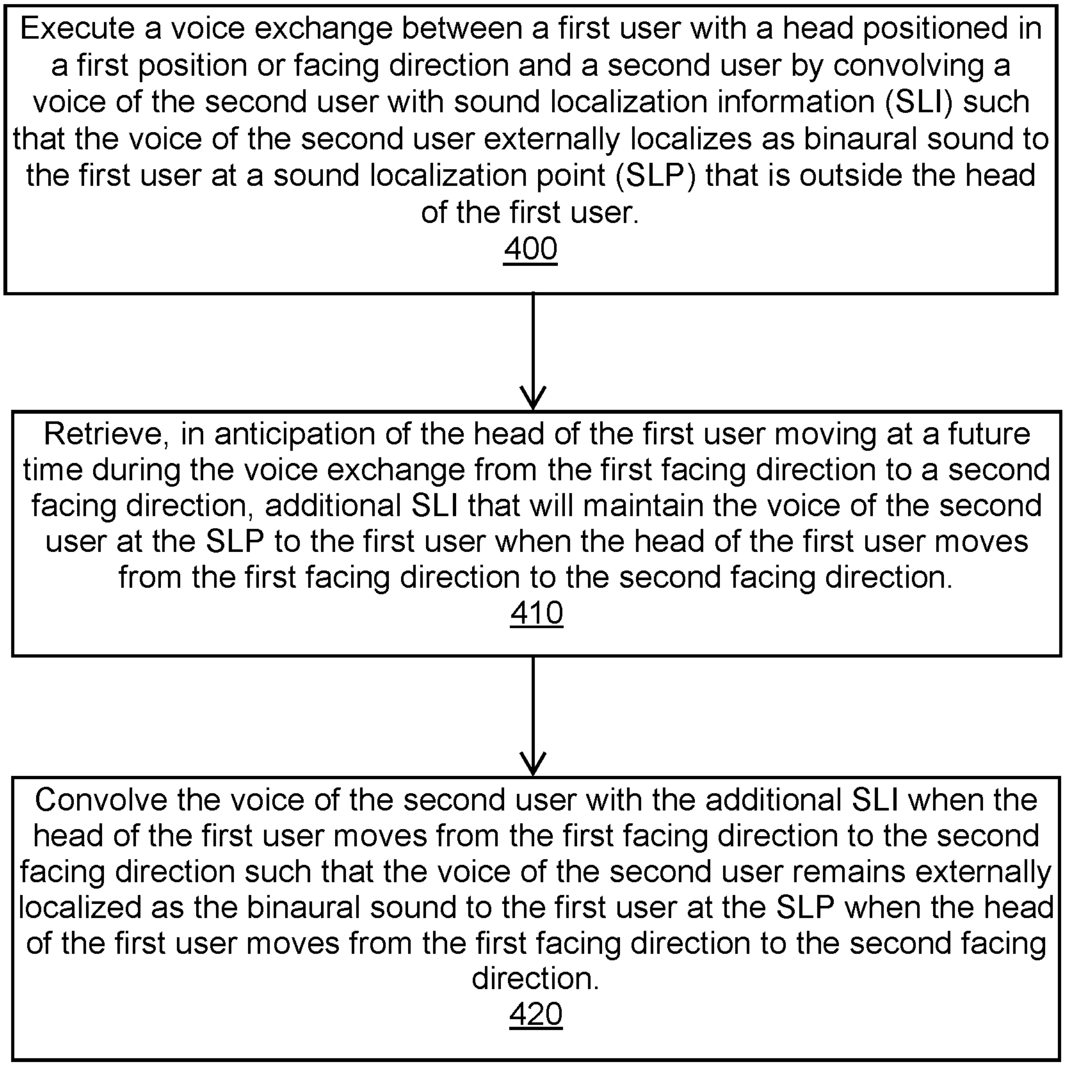
FIG. 4 is a method that improves performance of a computer that convolves binaural sound to a listener in accordance with an example embodiment.

FIG. 4 is a method that improves performance of a computer that convolves binaural sound to a listener in accordance with an example embodiment.

Block 400 states execute a voice exchange between a first user with a head positioned in a first position or facing direction and a second user by convolving a voice of the second user with sound localization information (SLI) such that the voice of the second user externally localizes as binaural sound to the first user at a sound localization point (SLP) that is outside the head of the first user.

An example embodiment processes and/or convolves the voice of the second user with one or more of an ILD, ITD, and left and right HRTFs in order to localize the voice as binaural sound to the first user at a SLP that is outside the head of the first user. For instance, the voice of the second user or virtual sound source localizes to a far field location one or more meters away from the first position of the head of the first user. The first position of the head includes a spatial location and an orientation. For instance, the center of the head at a first head position in the environment is (X1, Y1, Z1), and the second user is located at (X2, Y2, Z2) in a shared Cartesian reference frame in which the z axis points up. The first head orientation has a vertical head axis parallel to the z axis and pointing up so that the head pitch angle (β) and head roll angle (γ) are zero. The head yaw angle (α) is also zero at the first orientation. Changes in angles (α, β, γ) relative to the first head orientation specify subsequent head orientations. The first user in the first head position localizes the voice from (X2, Y2, Z2) at a SLP expressed in spherical coordinates (r, θ, ϕ). The elevation angle ϕ is +90° in the zenith direction, the azimuth angle θ is 0° in the forward-facing direction, and r is a distance or vector from the first head position to (X2, Y2, Z2) with r≥1.0 meter. Theta (θ) and phi (ϕ) are an azimuth and an elevation angle respectively between r and the normal to the face at the first position.

Examples of the voice exchange include, but are not limited to, one or more of a voice exchange between a person and another person (such as a voice exchange between two or more people during a telephone call or during execution of an online game in which remote participants talk to each other over the Internet), a person and a computer program (such an intelligent user agent (IUA), intelligent personal assistant (IPA), a knowledge navigator, or other voice responsive computer program), and a person and a software application (such as a VR game or a VR software application).

The facing direction (FD) can be a forward-facing direction (FFD) or a reference orientation of the head of the listener relative to the environment. For example, the reference orientation includes a reference position about a fixed x-y-z coordinate system or a reference position that has Euler angles (α, β, γ) of (0, 0, 0). For example, the head of a first user is located at an origin and has a body and a face directed to the azimuth angle of 0° and the elevation angle of 0°. The SLP is located away from the origin at spherical coordinates (r, θ, ϕ) with r>0.0 m, 0°≤θ≤360°, and −90°≤ϕ≤90°. Further, the FFD can be defined with a compass direction, such as a user having a FFD that faces north. Further, the origin of the user can be defined with a GPS location or Internet of Things (IoT) location.

The facing direction (FD) can also be a non-FFD. For example, the head of the user rotates to have one or more of a non-zero yaw, a non-zero pitch, and a non-zero roll.

For instance, a user stands and has a FFD of north. The user then rotates his or her head in a head path ninety-degrees (90°) right so the head of the user has a FD of east while the body of the user maintains a FD of north.

Block 410 states retrieve, in anticipation of the head of the first user moving at a future time during the voice exchange from the first facing direction to a second facing direction, additional SLI that will maintain the voice of the second user at the SLP to the first user when the head of the first user moves from the first facing direction to the second facing direction.

The additional SLI enables convolution of the voice of the second person such that the voice remains fixed at the SLP while the head of the first user moves from the first facing direction to the second facing direction and remains at the second facing direction. An example embodiment retrieves the additional SLI based on one or more of a location of the SLP with respect to the location of the first user, a location of the SLP with respect to an origin location, an amount or degree of head rotation of the first user, the FFD of the first user, the facing direction of the first user, a difference in amount or degree between the first facing direction and the second facing direction, a GPS location of the first user, existence of other people or objects around or near the first user, historical or previous head movements of the first user, preferences of the first user for binaural sound or virtual image localization, a distance (r) of the SLP from the first user, an azimuth angle (θ) of the SLP with respect to a FFD of the first user or an origin, an elevation angle (ϕ) of the SLP with respect to a FFD of the first user or an origin, an activity of the first user, and a number or location of other binaural sounds or images with SLPs that the first user hears or sees.

Block 420 states convolve the voice of the second user with the additional SLI when the head of the first user moves from the first facing direction to the second facing direction such that the voice of the second user remains externally localized as the binaural sound to the first user at the SLP when the head of the first user moves from the first facing direction to the second facing direction.

At a future point in time when the head of the first user moves from the first facing direction to the second facing direction, the convolution instructions and/or data for the voice of the second person are already fetched, preprocessed, and/or cached. Processing and/or convolution of these instructions/data enable the SLP of the voice of the second user to be rendered as remaining fixed at the SLP even while the head of the first user moves in a head path with respect to the SLP.

Consider an example in which the first and second users talk to each other on a telephone call. The first user is located at an origin, and the SLP of the voice of the second user is located with respect to the FFD of the head of the first user at spherical coordinates (1.1 m, 20°, 0°). Since the voice of the second user emanates from the SLP 20° to the right of the first user, the SLS predicts or anticipates that the first user will rotate his or her head twenty-degrees (20°) azimuth toward the SLP (e.g., so the head of the first user faces or looks toward or orients to the SLP). The predicted head movement is a natural or likely occurrence since people tend to look toward the location of a source of sound, especially when the source of the sound is a voice with whom the person is communicating. As such, the SLS retrieves or prefetches convolution data (e.g., ITDs, ILDs, HRTF paths and/or HRTFs) that correspond or correlate to a path of head movement from zero degrees azimuth (the first FFD) to twenty-degrees (20°) azimuth in anticipation of the head of the first user moving to have a FD toward the SLP. The SLS preprocesses the convolution data and caches it. When the head of the first user does rotate toward the SLP as predicted, then the convolution data is already fetched from memory, preprocessed, and available in the cache memory for expedited convolution of the voice of the second user.

Retrieval, processing, and/or caching of the convolution data greatly improves performance of the electronic device providing the binaural sound of the voice of the second user to the first user. Further, the voice of the second user remains fixed at the SLP as the head of the first user moves with respect to the SLP and emulates a natural voice exchange as if the second user where located at the SLP. If the processor does not convolve the convolution data quickly enough to synchronize with the head movement of the first user, then the first user may experience an unnatural voice exchange (e.g., a voice of the second user that skips, stutters, moves around, or exhibits other rendering artifacts).

Figure 5A:
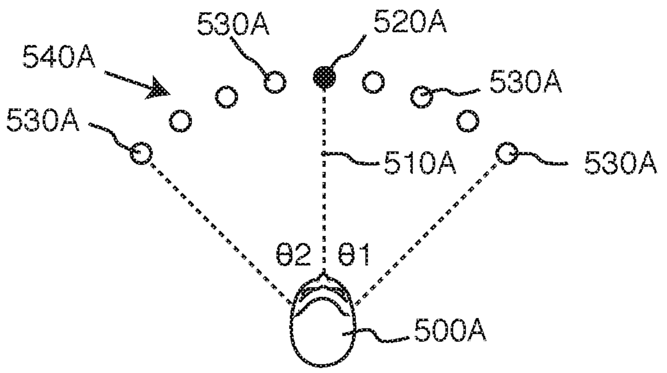
FIG. 5A shows a user with a forward-facing direction (FFD) that faces a SLP that is external to and away from the head of the user where binaural sound is localizing to the user in accordance with an example embodiment.
Figure 5B:
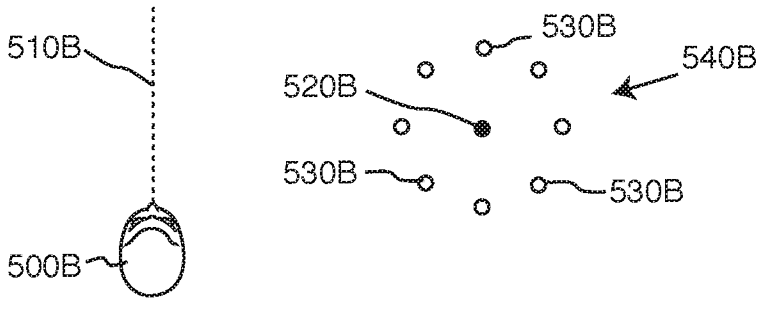
FIG. 5B shows a user with a forward-facing direction (FFD) that faces away from a SLP that is external to and away from the head of the user where binaural sound is localizing to the user in accordance with an example embodiment.
Figure 5C:
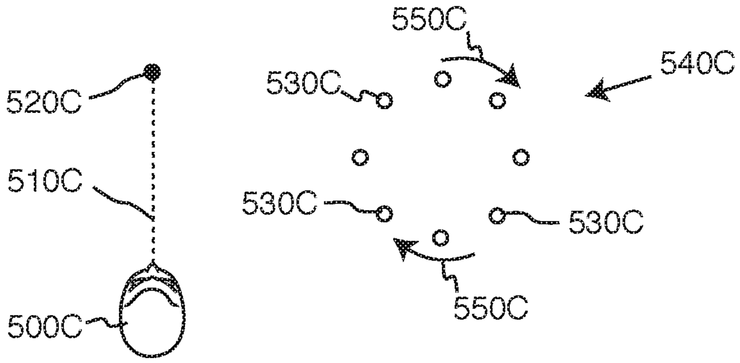
FIG. 5C shows a user with a forward-facing direction (FFD) that faces a SLP that is external to and away from the head of the user where binaural sound is localizing to the user in accordance with an example embodiment.

FIGS. 5A-5C show examples of paths, SLPs, and HRTFs that example embodiments prefetch, preprocess, cache, and/or execute other actions discussed herein. In the figures, a SLP with a darkened circle indicates that binaural sound currently localizes to the SLP for the user. A SLP with an empty or white circle indicates that binaural sound is not currently localized to the location.

FIG. 5A shows a user 500A with a forward-facing direction (FFD) 510A that faces a SLP 520A that is external to and away from the head of the user where binaural sound is localizing to the user in accordance with an example embodiment. A plurality of SLPs 530A form a path 540A that has a semicircular or arc-shape.

In one example embodiment, the path 540A shows predictions of changes in orientation of the head of the user at a time in the future. For instance, the user will move his or her head to have FDs that coincide with the SLPs 530A of the path. In another example embodiment, the path 540A represents a prediction of where binaural sound will localize while the head of the user remains directed at FFD 510A. For instance, while the head of the user 500A remains fixed in the FFD 510A, the SLP of the binaural sound will move along the path 540A of the SLPs 530A. In another example embodiment, the path 540A shows a virtual sound source path or predicted virtual sound source path of a virtual sound source moving in the environment with respect to the head of the user. In another example embodiment, the path 540A shows a HRTF path or predicted HRTF path that is a sequence of localizations triggered by the head of the user moving in a head path and/or by a virtual sound source moving along the path 540.

In FIG. 5A, theta one (θ1) represents the positive azimuth angle from the FFD (θ=0) to the last SLP 530A in the path as the user 500A looks toward his or her right. For illustration, the angle is shown to be about forty-five degrees (θ1=45°). Theta two (θ2) represents the negative azimuth angle from the FFD (θ=0) to the last SLP 530A in the path as the user 500A looks toward his or her left. For illustration, the angle is shown to be about negative forty-five degrees (θ2=)−45°. The path represents a series of SLPs and/or HRTFs having azimuth angles in the range $-45° \leq \theta \leq 45°$. For illustration, predictions of distance (r) and the elevation angle (ϕ), are not shown, but the distance (r) and the elevation angle are also predicted.

FIG. 5B shows a user 500B with a forward-facing direction (FFD) 510B that faces away from a SLP 520B that is external to and away from the head of the user where binaural sound is localizing to the user in accordance with an example embodiment. A plurality of SLPs 530B form a path 540B that has a circular or spherical shape with the SLP 520B being at a center of the circle or sphere.

In one example embodiment, the path 540B represents predictions of where the head of the user will orient at a time in the future. For instance, the user will move his or her head to have FDs that intersect with the SLPs 530B of the path.

In another example embodiment, the path 540B represents a prediction of where binaural sound will localize while the head of the user remains directed at FFD 510B. For instance, while the head of the user 500B remains fixed along the FFD 510B, the SLP of the binaural sound will move along the path 540B of the SLPs 530B.

FIG. 5C shows a user 500C with a forward-facing direction (FFD) 510C that faces a SLP 520C that is external to and away from the head of the user where binaural sound is localizing to the user. A plurality of SLPs 530C form a path 540C that has a circular or oval shape. Arrows 550C indicate a direction of the path 540C. The path starts at SLP 520C, sequentially proceeds along SLPs 530C in a clockwise direction as shown with arrows 550C, and returns to SLP 520C.

In one example embodiment, the path 540C represents a prediction of where the head of the user will turn at a time in the future. For instance, the user will move his or her head along the path 540C and in the direction of arrows 550C to have FDs toward the SLPs 530C of the path. In another example embodiment, the path 540C represents a prediction of where binaural sound will localize while the head of the user remains directed at FFD 510C. For instance, while the head of the user 500C remains fixed along the FFD 510C, the SLP of the binaural sound will move along the path 540C of the SLPs 530C.

FIGS. 5A-5C show example paths (540A, 540B, 540C) that include a plurality of SLPs (530A, 530B, 530C). Each of these SLPs has a unique set of coordinates that represent where sound will localize with respect to the user or how the head of the user will move with respect to a fixed or known location. These SLPs correlate to or are associated with SLI or convolution data, such as one or more of ITDs, ILDs, and HRTFs. For example, each pair of left and right HRTFs has a set of coordinates that are matched with a corresponding SLP or defined by the SLP. In this manner, the path is defined according to a number of SLPs along the path or equivalently (if the SLPs use a coordinate system coincident with the HRTF coordinate system) a number of HRTFs along the path.

Consider an electronic device (such as a WED, HMD, or smartphone) that includes hardware and/or software that improves performance of execution of binaural sound to a listener. A digital signal processor (DSP) convolves sound that localizes as binaural sound to the listener at a fixed point in the environment. The three spherical coordinates of the sound localization point (SLP) of the binaural sound change as the head of the user moves. The distance coordinate (r) is between one meter and two meters away from a head of the listener. In response to the DSP convolving the sound to localize at the SLP, a processor (or the DSP itself) prefetches and preprocesses HRTFs of the listener that include HRTFs located within a range of the current coordinates of the SLP (r, θ, ϕ) of the binaural sound. A memory caches the HRTFs located in the range. When the listener moves his or her head with respect to the SLP, the DSP convolves the sound with a different pair of HRTFs in order to maintain localization of the sound at the fixed point in the environment to the listener. A cache hit occurs when the listener moves his or her head to an orientation for which corresponding or correlating HRTFs have been prefetched and cached in the memory.

Consider further the example of the electronic device that includes hardware and/or software that improves performance of execution of binaural sound to a listener. The processor prefetches, preprocesses, and/or caches HRTFs within the range of a current SLP, and the range includes one or more HRTFs with spherical coordinates having azimuth angle (θ) as follows:

$-5° \leq \theta \leq 5°$,
$-10° \leq \theta \leq 10°$,
$-15° \leq \theta \leq 15°$,
$-20° \leq \theta \leq 20°$,
$-25° \leq \theta \leq 25°$,
$-30° \leq \theta \leq 30°$,
$-35° \leq \theta \leq 35°$,
$-40° \leq \theta \leq 40°$, and
$-45° \leq \theta \leq 45°$.

The processor also prefetches, preprocesses, and/or caches HRTFs within the range of a current SLP, and the range includes one or more HRTFs with spherical coordinates having elevation angle (ϕ) as follows:

$-5° \leq \phi \leq 5°$,
$-10° \leq \phi \leq 10°$,
$-15° \leq \phi \leq 15°$,
$-20° \leq \phi \leq 20°$,
$-25° \leq \phi \leq 25°$,
$-30° \leq \phi \leq 30°$,
$-35° \leq \phi \leq 35°$,
$-40° \leq \phi \leq 40°$, and
$-45° \leq \phi \leq 45°$.

Consider an example of a computer system that expedites and improves convolution of voices of participants during a telephone call (e.g., between a first person and a second person). The computer system includes a main memory or database that stores convolution data (such as ITD, ILDs, HRTFs, HRTF paths, virtual sound source paths, head paths, preferred SLP locations for voices, sound files, filenames, and other SLI) for thousands or millions or users. The telephone call occurs over the Internet (such as a Voice over Internet Protocol call or VoIP call). During the telephone call, voices of the first and second person route through a server that includes one or more processors, including a DSP. The server retrieves the convolution data stored for the first and second persons, convolves the voices with the data, and provides the voices as binaural sound to electronic devices of the first and second persons. These voices localize as binaural sound to SLPs outside of the head of the first and second persons (e.g., from 1.0 m-1.5 m away from the head).

Performance of the telephone call improves since the server convolves the voices (as opposed to the electronic devices of the first and second persons). The server processes and convolves the data at a faster rate than the electronic devices of the first and second persons. Further, processing resources of these electronic devices are saved and devoted to other tasks. Further, the computer system enables a wider array of electronic devices to provide binaural sound to users. For instance, the first and second persons receive and transmit the calls over wireless earphones that include a microphone. A larger, more expensive smartphone is not required since the server executes processing and convolution of the voices as they transmit across the Internet from a computer program, agent, user, or electronic device of one person to the electronic device of another person.

Consider another example in which a head mounted display (HMD) or other portable or wearable electronic device provides sounds (including voices) to a listener at one or more SLPs that are external to and away from the listener. For example, the SLPs have spherical coordinates (r, θ, ϕ) with θ being an azimuth angle, ϕ being an elevation angle, and r being a distance from a head of the listener with $r \geq 1.0$ meter. A processor in the HMD or in wireless communication with the HMD prefetches, from main memory, HRTFs for a plurality of SLPs that are located along a horizontal line with spherical coordinates within a range of $(r, -45° \leq \theta \leq 45°, \phi)$. The processor stores these HRTFs in cache memory and expedites convolution of the sounds when a cache hit occurs for one of the HRTFs stored in the cache memory.

HRTFs are saved in pairs that include a left HRTF and a right HRTF. These pairs are called and executed in parallel processes or serially. In either case, the left and right HRTF are saved in memory at contiguous locations to expedite retrieval. In this manner, the pointer will read and fetch the first HRTF of the pair and then automatically be incremented to read the second HRTF of the pair. Further, both HRTF pairs are loaded into a same cache level (e.g., loading HRTF-left and HRTF-right in L2, as opposed to loading HRTF-left in L1 and HRTF-right in L2).

FIGS. 6 and 7A-7F show additional examples of paths, SLPs, and HRTFs in accordance with example embodiments.

FIG. 6 shows a table 600 that stores multiple paths that are illustrated in FIGS. 7A-7F. The table 600 includes a column showing time (labeled "time"), a column showing head paths (labeled "Head path"), a column showing virtual sound source paths (labeled "Source path"), and a column showing HRTF paths (labeled "HRTF path"). By way of illustration, the head paths include head locations provided in coordinates of (x, y, z) and head orientations provided in coordinates of (α, β, γ), where α is an angle of rotation about the vertical/longitudinal head axis; β is an angle of rotation about the frontal axis of the head; and γ is an angle of rotation about the axis extending outward from the face. The head orientation (0, 0, 0) is an upright and forward-facing orientation at (x, y, z). The virtual sound source paths include virtual sound source locations provided in coordinates of (x, y, z), and the HRTF paths include coordinates of HRTFs provided in spherical coordinates of (r, θ, φ). Further, in keeping with animation and visual effects, Y or y is designated as "up" or direction of elevation, and X or x and Z or z are designated as the "ground" axes.

Table 600 includes example data for head paths, virtual sound source paths, and HRTF paths corresponding or correlating to relative positions between the head of the listener and a virtual sound source. By way of example, the table provides data for times t0, t1, t2, and t3.

Figure 7A:
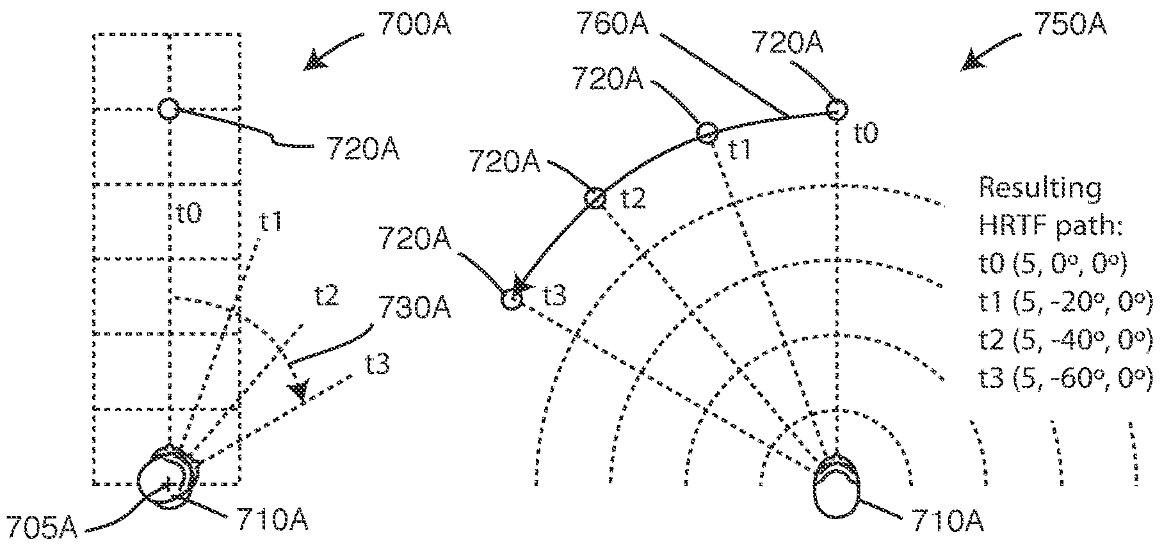
FIG. 7A shows a HRTF path resulting from head orientation movement of a listener in accordance with an example embodiment.

FIG. 7A shows a HRTF path resulting from head orientation movement of a listener in accordance with an example embodiment. FIG. 7A shows a Cartesian plane of an environment ("world space") 700A with a listener 710A (at the "world origin" 705A) who frequently rotates his or her head 60° to the right while listening to stationary virtual sound source 720A that is five meters away from his or her forward direction (FD) at time=t0. The change in position of the head (in this case a change by rotation only) is a head path that includes a change of orientation of the head from 0° azimuth to 60° azimuth indicated by a dashed arrow 730A. The HRTF path 760A indicated by an arrow is formed from successive localizations of stationary virtual sound source 720A to listener 710A from time t0 to time t3 on the horizontal plane of 0° elevation 750A. The virtual sound source 720A is stationary with respect to the environment 700A of the listener 710A, so the SLS adjusts the HRTF coordinates to compensate for the change in the orientation of the head.

At time t1 the FD of the head of the listener is 20° azimuth, and the SLS makes a corresponding −20° adjustment to the azimuth coordinate of the HRTF.

At time t2 the FD of the head of the listener is 40° azimuth, and the SLS makes a corresponding −40° adjustment to the azimuth coordinate of the HRTF.

At time t3 the FD of the head of the listener is 60° azimuth, and the SLS makes a corresponding −60° adjustment to the azimuth coordinate of the HRTF.

The virtual sound source 720A does not move, but 750A shows the change in HRTF coordinates 760A due to the compensation for the head movement.

When the listener 710A hears the sound of virtual sound source 720A localized five meters in front of him or her, the listener commonly performs the +60° rotation of his or her head. Accordingly, an example embodiment prefetches the HRTF path 760A when the sound of virtual sound source 720A localizes to the listener 710A from a location five meters from the FFD of the listener 710A.

Consider an alternative to the example in which the angle of the head movement is a few degrees in azimuth, elevation, and/or roll, and the path of the movement of the head returns the head to the initial orientation of the head. Such a head motion can result from a common gesture or a repetitive involuntary movement.

A common type of HRTF path results from a change in the head location of a listener during the localization of a stationary sound.

Figure 7B:
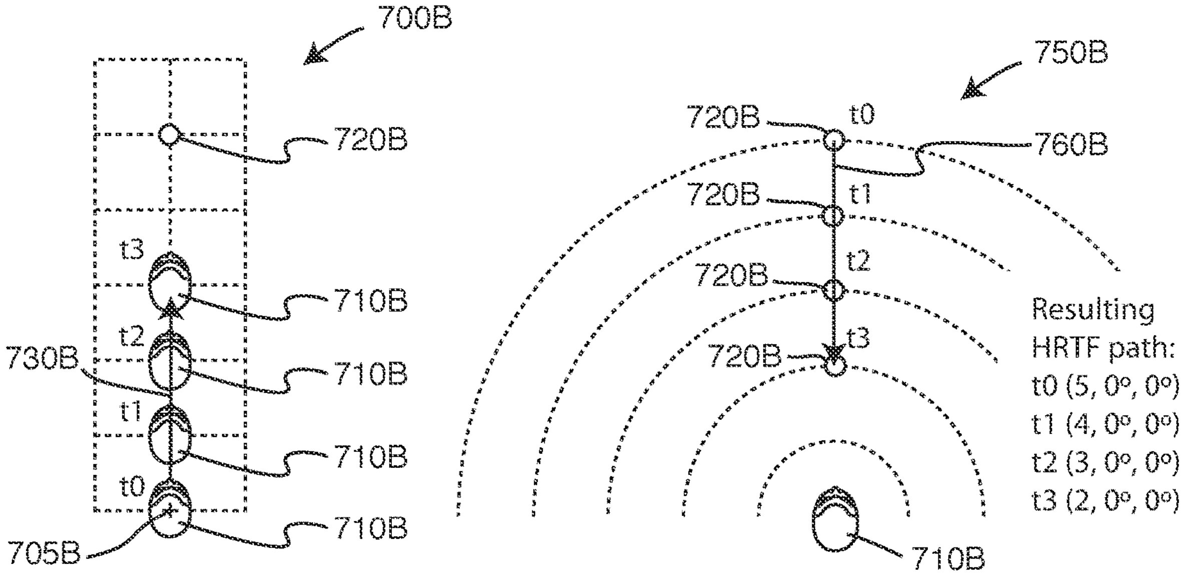
FIG. 7B shows a HRTF path resulting from head location movement in accordance with an example embodiment.

FIG. 7B shows a HRTF path resulting from head location movement in accordance with an example embodiment. FIG. 7B shows a Cartesian plane of an environment 700B with a listener 710B at an origin 705B who frequently moves or thrusts his or her head three meters forward while listening to a stationary virtual sound source 720B that is five meters away from his or her FD at time=t0. The HRTF path 760B indicated by an arrow is formed from successive localizations of stationary virtual sound source 720B to listener 710B from time t0 to time t3 on the horizontal plane of 0° elevation 750B. The virtual sound source 720B is stationary with respect to the environment 700B of the listener 710B, so the SLS adjusts the HRTF coordinates to compensate for the change in the location of the head.

The virtual sound source 720B does not move, but 750B shows the change in HRTF coordinates 760B due to the compensation for the head movement.

When the listener 710B hears the sound of virtual sound source 720B localized five meters in front of him or her, the listener commonly performs the forward head movement along a head path 730B. Accordingly, an example embodiment prefetches the HRTF path 760B when the sound of virtual sound source 720B localizes to the listener 710B from a location five meters from the FFD of the listener 710B.

Consider an alternative to the example in which the distance of the head movement is one inch instead of three meters. The path of the movement of the head proceeds forward one inch and then backward one inch, returning to the initial position of the head. Such a change in head location can result from a common gesture or a repetitive involuntary movement such as a tic.

Figure 7C:
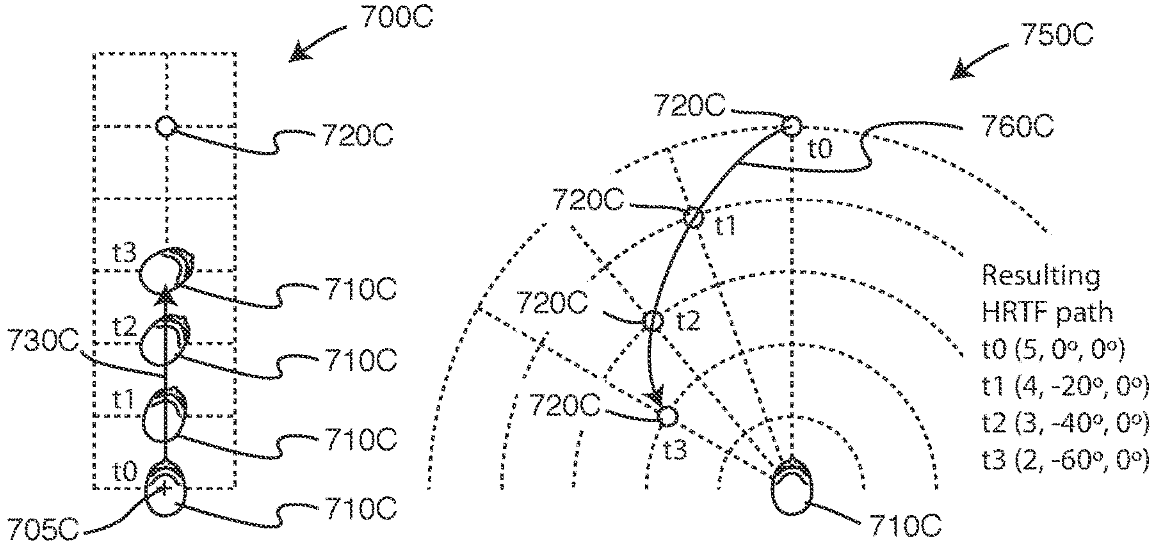
FIG. 7C shows a HRTF path resulting from both head orientation and location movement in accordance with an example embodiment.

FIG. 7C shows a HRTF path resulting from both head orientation and location movement in accordance with an example embodiment. FIG. 7C shows a Cartesian plane of an environment 700C with a listener 710C at origin 705C who frequently moves his or her head while listening to a stationary virtual sound source 720C that is five meters away from his or her FD at time=t0. The movement of the head or head path 730C indicated by an arrow is the combination of both the orientation movement discussed in FIG. 7A and the location movement discussed in FIG. 7B. The virtual sound source 720C is stationary with respect to the environment 700C of the listener 710C, so the SLS adjusts the HRTF coordinates to compensate for the changes in the position of the head. The HRTF path 760C indicated by an arrow on the horizontal plane of 0° elevation 750C in the reference frame of the listener 710C is formed from successive localizations of stationary virtual sound source 720C from time t0 to time t3.

The virtual sound source 720C does not move in the arc 760C, but 750C shows the change in HRTF coordinates 760C that result in an arc shape due to the compensation for the head orientation and location change along the head path 730C.

Consider a common similar head path that includes both a small displacement of the head and a small change in orientation such as a forward nod or a sneeze. An example embodiment prefetches a plurality of pairs of HRTFs for each SLP being localized, the HRTFs corresponding to corrections for 0°-3° orientation changes of the head.

A common type of HRTF path results from the localization of a moving sound to a listener that does not move.

Figure 7D:
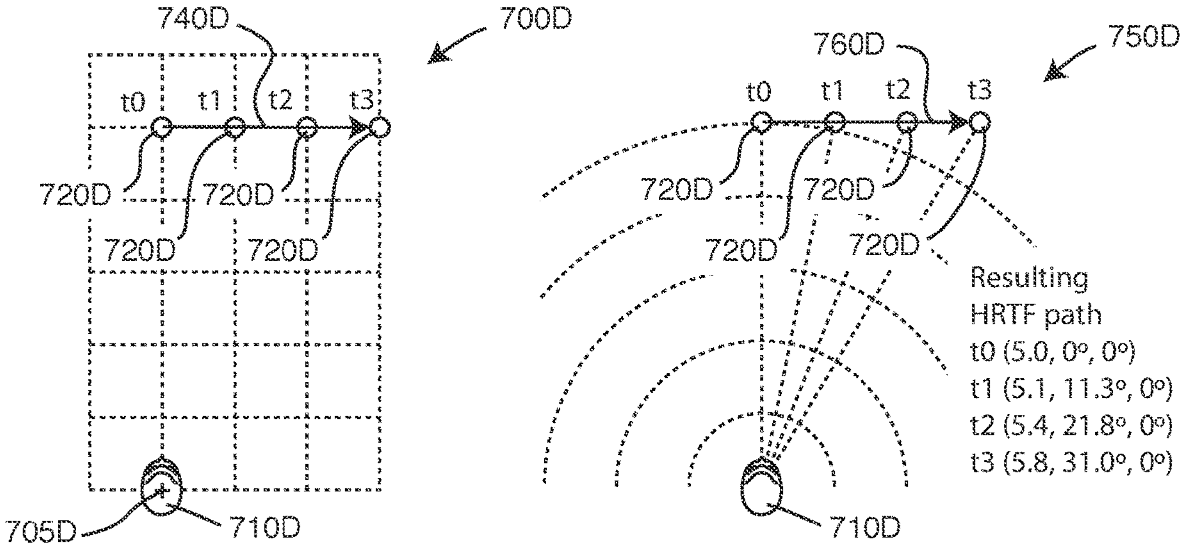
FIG. 7D shows a HRTF path resulting from virtual sound source movement in accordance with an example embodiment.

FIG. 7D shows a HRTF path resulting from a virtual sound source movement in accordance with an example embodiment. FIG. 7D shows a Cartesian plane of an environment 700D with a moving virtual sound source 720D localized to a stationary listener 710D at origin 705D. The HRTF path 760D indicated by an arrow is formed from successive SLPs to listener 710D of the virtual sound source 720D as it moves from time t0 to time t3 on the horizontal plane of 0° elevation 750D. The head of the listener 710D is stationary with respect to the environment 700D of the listener 710D. The SLS adjusts the HRTF coordinates according to the present location of the virtual sound source 720D.

The virtual sound source 720D commonly localizes five meters in front of the listener 710D, and commonly moves three meters to the right as shown in a virtual sound source path 740D indicated by an arrow. Accordingly, when the sound of virtual sound source 720D localizes five meters from the FFD of the listener 710D, an example embodiment predicts the virtual sound source path 740D and prefetches the HRTF path 760D.

Localizations of a moving virtual sound source that begin with or include a certain HRTF coordinate at t0, and include compensation in HRTF coordinates for a certain virtual sound source path or movement, may recur or be common and/or predicable. An example embodiment stores the HRTF paths for these localizations, predicts the localizations and virtual sound source paths, and prefetches the stored HRTF paths. Prefetching the HRTF paths expedites localization of the predicted virtual sound source according to the predicted virtual sound source path.

Figure 7E:
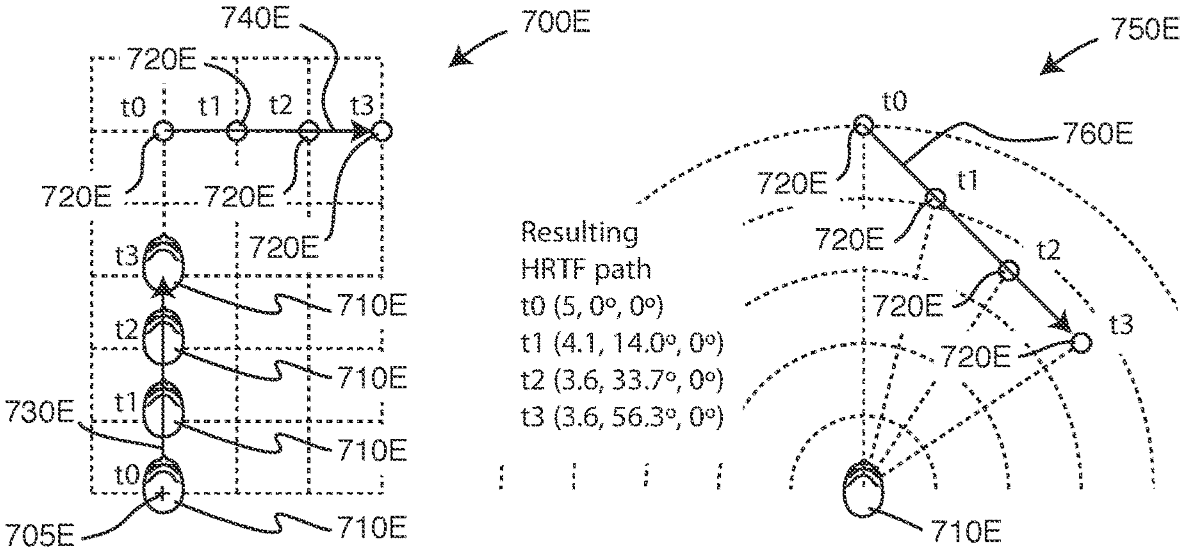
FIG. 7E shows a HRTF path resulting from both virtual sound source and head location movement in accordance with an example embodiment.

FIG. 7E shows a HRTF path resulting from both virtual sound source and head location movement in accordance with an example embodiment.

FIG. 7E shows a Cartesian plane of an environment 700E with a moving virtual sound source 720E localized to a listener 710E who frequently moves his or her head from an origin 705E at time=t0 in a head path 730E. The virtual sound source 720E moves from five meters in front of the listener 710E at time=t0 along a virtual sound source path 740E. The SLS adjusts the SLP according to the present location of the moving virtual sound source 720E with respect to the present location of the moving head 710E. The HRTF path 760E indicated by an arrow is formed from the HRTF coordinates of the successive adjusted SLPs as time progresses from t0 to time t3. The HRTF path 760E is illustrated on the horizontal plane of 0° elevation 750E in the frame of reference of the head of the listener 710E.

The virtual sound source 720E commonly localizes five meters in front of the listener 710E and commonly moves three meters to the right on virtual sound source path 740E. The listener 710E commonly moves along head path 730E. Accordingly, when the sound of virtual sound source 720E localizes five meters from the FFD of the listener 710E, an example embodiment predicts the virtual sound source path 740E and/or head path 730E and prefetches the HRTF path 760B or 760D. Alternatively, an example embodiment predicts and fetches both virtual sound source path 740E and head path 730E, calculates HRTF path 760E from virtual sound source path 740E and head path 730E, and caches HRTF path 760E. Alternatively, an example embodiment monitoring coordinates of HRTFs executing a localization predicts that a virtual sound source localizing to a SLP/point on HRTF path 760E will continue to be localized along HRTF path 760E. In response to the prediction, the example embodiment prefetches HRTF pairs having coordinates of the coordinates along HRTF path 760E.

Localizations of a moving virtual sound source that begin with or include a certain HRTF coordinate at time=t0, and include HRTF coordinates that compensate for a certain head path and/or virtual sound source path may recur or be common and/or predicable. An example embodiment stores the HRTF paths for the predicted localizations, and predicts and/or detects future instances of the localizations according to observed virtual sound source paths and/or simultaneous head paths, and/or SLPs being executed. The example embodiment then prefetches the stored HRTF paths in order to localize the predicted virtual sound source according to the predicted head path and virtual sound source paths or according to the predicted HRTF path.

Consider an example of a listener continually moving forward who hears virtual sound sources move laterally across his or her path. An example embodiment predicts and prefetches HRTF paths for the localizations based on one or more of the velocity of the virtual sound sources, the velocity of the listener, and the calculated distance between the listener and virtual sound source when the virtual sound source crosses the path of the listener.

Figure 7F:
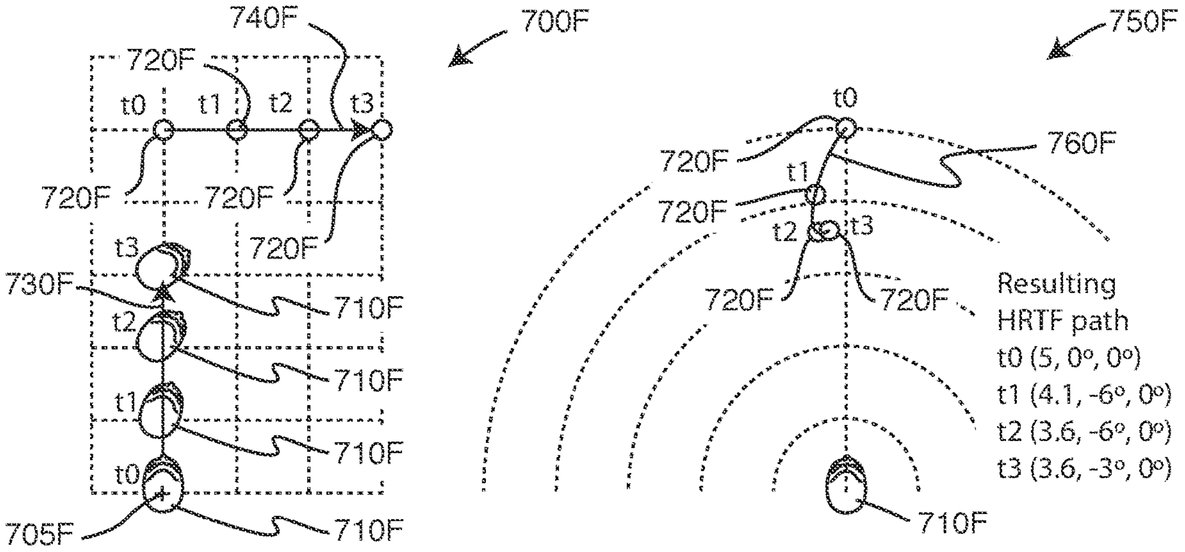
FIG. 7F shows a HRTF path resulting from virtual sound source and head location movement and head orientation movement in accordance with an example embodiment.

FIG. 7F shows a HRTF path resulting from virtual sound source and head location movement and head orientation movement in accordance with an example embodiment.

FIG. 7F shows a Cartesian plane of an environment 700F with a moving virtual sound source 720F localized to a listener 710F who frequently moves his or her head from an origin 705F at time=t0 in a head path 730F. The virtual sound source 720F moves as discussed in FIG. 7E along a virtual sound source path 740F. The SLS adjusts the SLP according to the present location of the moving virtual sound source 720F with respect to the present location and orientation of the moving head 710F. The HRTF path 760F indicated by a curving line is formed from the HRTF coordinates of the successive adjusted SLPs as time progresses from t0 to time t3. The HRTF path 760F is illustrated on the horizontal plane of 0° elevation 750F in the frame of reference of the head of the listener 710F. For ease of illustration plane 750F does not display dashed lines to indicate azimuth angles shown in the inset table.

The virtual sound source 720F commonly localizes five meters in front of the listener 710F and commonly moves three meters to the right on virtual sound source path 740F. The listener 710F commonly moves along head path 730F. Accordingly, when the sound of virtual sound source 720F localizes five meters from the FFD of the listener 710F, an example embodiment predicts the virtual sound source path 740F and/or head path 730F and prefetches the HRTF path 760C or 760D. Alternatively, an example embodiment predicts and fetches both virtual sound source path 740F and head path 730F, calculates HRTF path 760F from virtual sound source path 740F and head path 730F, and caches HRTF path 760F. Alternatively, an example embodiment monitoring coordinates of HRTFs as they are retrieved for a localization predicts that a virtual sound source localizing to a SLP/point on HRTF path 760F will continue to be localized along HRTF path 760F. In response to the prediction, the example embodiment prefetches HRTF pairs having coordinates of the coordinates along HRTF path 760F.

Localizations of a moving virtual sound source may recur or be common and/or predicable. For example, a localization begins with or includes a certain HRTF coordinate at time=t0, and includes HRTF coordinates that compensate for a certain head path and virtual sound source path or movement. An example embodiment stores and indexes the HRTF paths for each localization executed by the example embodiment over extended periods of seconds, minutes, hours, days, or longer periods. The example embodiment predicts the localizations according to virtual sound source paths and/or accompanying head paths, and/or SLPs being executed. Further, the example embodiment queries the stored indexed HRTF paths for a HRTF path closely matching the currently observed sequence of coordinates of HRTFs that are executing. The example embodiment then prefetches HRTF pairs having coordinates of the coordinates along the stored HRTF paths in order to localize the predicted virtual sound source according to the predicted head and virtual sound source paths or according to the predicted HRTF path.

Consider an example in which a person dons a HMD and plays a VR software game that provides binaural sounds with virtual sound sources that move throughout the virtual auditory space in the game. When the person reaches a certain level or successfully completes a task, the game is programed to play a certain sequence of sounds from virtual sound sources that move around the head of the person in the virtual auditory space. The game, however, does not know in advance whether the person will reach the level or complete the task (e.g., the person is playing the game for the first time). So, the game consults statistical data on other users who previously played the game. This data includes occurrences of whether and when these other users playing the same game reached the level or completed the task. Based on an analysis of this information, the game determines probabilities, predictions, or likelihoods of the person reaching the level or completing the task. This information enables the game to decide whether and/or when to prefetch, preprocess, and cache SLI needed to convolve the sequence of sounds of virtual sounds sources that move around the head of the person when the person reaches the level or completes the task. The game also tracks and stores statistics of the person reaching levels and completing tasks to improve predictive capabilities of knowing when to prefetch, preprocess, and cache SLI needed for convolution of binaural sound. The more time the person spends playing the game, the more accurate the game becomes in successfully predicting when to prefetch, preprocess, and cache the SLI for convolution of virtual sound sources.

Consider an example of a listener continually moving forward who hears virtual sound sources move laterally across his or her path and rotates his or her head to observe the passing virtual sound sources. An example embodiment predicts and prefetches HRTF paths for the localizations based on one or more of the velocity of the virtual sound sources and the listener, the calculated distance between the listener and virtual sound source when the virtual sound source crosses the path of the listener, and the observed rotation of the head of the moving listener as the listener faces and attempts to track the moving virtual sound source.

In an example embodiment, the SLS observes that the coordinates of HRTF pairs specifying convolution of a certain SLP over time vary slightly from (0°, 0°) indicating that the listener is maintaining his or her head orientation to face the SLP. For example, the listener is rotating his or her head around and tracking the virtual sound source localized at the SLP. In order to improve performance of the computer executing the convolution, the SLS stops changing the convolution with small variations in HRTF/BRTF pairs and instead selects transfer functions of a single pair (e.g., (0°, 0°) to convolve the sound while the SLP is varying slightly. Convolving with the single pair improves performance of the computer and also improves the experience of the listener as the listener hears the sound from the SLP in a smooth trajectory. Processing resources are more available for preprocessing, prefetching, and caching for the convolution of other SLPs or for other processes.

During head rotations, an example embodiment executes convolution of virtual sound sources that are far from the listener differently than virtual sound sources close to the listener. For example, for a listener who rotates his or her head by a few degrees, a near field SLP is adjusted by a small arc length while a farther virtual sound source requires adjustment by a large arc length. To smoothly convolve the farther virtual sound source across the longer arc length requires a larger number of HRTFs between the start and end of the head rotation. For example, the head rotation is from 2°-4° azimuth. Convolution of a certain near field sound is accomplished by transitioning between four HRTFs along an arc length of one foot during the rotation. However, a farther SLP moves in a thirty-foot arc length during the 2° head rotation. To render the sound from the farther SLP smoothly or in equal quality or resolution to the near field SLP requires a greater number than four HRTFs. An example embodiment prioritizes prefetching of HRTFs for the near field SLP in pursuing the strategy of rendering binaural sound for close SLPs with less error and/or delay and/or in higher resolution than farther SLPs. The prioritization strategy provides the listener with a greater sense of realism for proximate virtual sound sources and therefore a greater sense of realism overall, than by providing equal but lower resolution convolution to each virtual sound source. Alternatively, the example embodiment operates in a mode that prioritizes prefetching of HRTFs for farther SLPs. The mode pursues the objective of convolving each SLP in equal resolution or quality or using a certain minimum number of HRTF pairs per unit of arc length such as depending on the distance coordinate or the HRTF (e.g., the distance to the virtual sound source). The objective requires farther SLPs to be convolved by a greater number of HRTF pairs along the greater arc length than a closer SLP requiring less HRTFs pairs for the shorter distance trajectory along the shorter arc length.

For the sake of illustration, head and virtual sound source movements are confined to a horizontal plane. However, head and virtual sound source movements can include changes in elevation. For the sake of illustration, changes in head orientation are confined to rotation about the vertical/longitudinal head axis and in the horizontal plane, effecting a change in the azimuth of the FD of the head. A change in head orientation, however, can result from one or more of a change in yaw, pitch or roll.

Consider an example of a sound being localized to a listener in which the sound is the voice of a caller in a binaural telephone call or a conversation between two parties in VR. The listener at his or her desk localizes the voice of the caller to a certain favorite SLP fixed to or coincident with a chair. An example embodiment localizes the voice by convolving the voice with a certain initial HRTF pair corresponding or correlating to the chair from the position of the listener. As the conversation ensues, the performance enhancer executes software that evaluates the probability of a movement of the voice of the caller and the probability of a movement of the head of the listener. The performance enhancer searches for stored HRTF paths that begin with or include probable initial HRTF pairs. The performance enhancer discovers such a HRTF path and prefetches the HRTF path to improve the performance of the localization when the localization proceeds according to the predicted movements of the voice of the caller and/or the head of the listener. The predicted movements can include the orientations of the voice or head of the caller or angle of source emission of the voice.

An example embodiment facilitates capturing, analyzing, storing, and retrieving HRTF paths in addition to head paths and virtual sound source paths. An example embodiment executes coordinate transformation on a head path and/or virtual sound source path in order to render HRTF coordinates for prefetching the HRTFs to provide to the sound convolver to improve the performance of the convolver. HRTF paths (captured during localizations) provide the advantage that the coordinates of the path do not require transformation. HRTF path coordinates are already expressed in the coordinate space of HRTFs so the coordinates are more readily prefetched.

An example embodiment retrieves from memory a predicted HRTF path and convolves sound to localize along the HRTF path when the position of the virtual sound source being localized relative to the listener at the start of the motion matches a HRTF coordinate at the start of the predicted HRTF path. For example, to apply a predicted HRTF path to a beep sound that is localizing at (2 m, 0°, 5°) to a listener, the predicted HRTF path starts with or includes the coordinate (2 m, 0°, 5°).

An example embodiment improves the performance of binaural sound localization by storing indexed archives of HRTF paths. The HRTF paths result from capturing or recording/sampling SLP/HRTF coordinates before, during, or following localization. HRTF paths are also obtained by pre-calculation from predicted, potential, repeated, expected, or known head paths and virtual sound source paths, received from other users, and by other means. A HRTF path can include and be included by other HRTF paths.

Consider an example embodiment that captures and stores localization. For example, a HRTF path for each SLP localized to a listener each day is captured, processed, and stored by the SLS. HRTF paths or segments of paths that rarely repeat are expunged in deference to HRTF paths often localized that are promoted to quicker memory access.

Consider an example of a 3D car driving game in which the sudden sound of a cow obstacle three meters to the right moving at 70° azimuth causes the listener to react by turning a steering wheel and moving his or her head and shoulders to the left. At 10 ms intervals, the performance enhancer reads the HRTF coordinates of the HRTF pairs that convolve the virtual sound source (the sound of the cow) and appends the coordinates to a HRTF path. As the game progresses, the listener repeats the turning motion at the occurrence of each cow emerging three meters to the right at 70° azimuth. The virtual sound source path of the cow in the 3D world moves from right to left at the constant velocity of a cow. The HRTF path of the cow sound is more complex than the virtual sound source path. The sound of the cow is convolved first to 70° azimuth, but then the azimuth angle increases as the car moves forward. The distance coordinate of the HRTF pair convolving the sound of the cow changes also, being decremented as the cow moves toward the car, but incremented as the car drives away from the cow. The HRTF path is further affected by the rotation and motion of the head of the listener, and by the motion of the car with respect to the 3D world. The resulting HRTF path or segment during the appearances of the cow is complex, but the complexity serves to help the performance enhancer to recognize the uniqueness of the repeating HRTF path/segment. The unique sections of the HRTF path are stored as a predictable HRTF path. The next time the cow appears at a distance of three meters and 70° azimuth the performance enhancer recognizes the coordinates of the first HRTF pair used by the SLS to convolve the sound of the cow. The performance enhancer retrieves a stored HRTF path of the sound of the cow that begins 70° to the right three meters away and prefetches the HRTFs corresponding to each point in the HRTF path. The precise head path and virtual sound source path are not consulted or calculated, but the motions of the head and car, and of the virtual sound source of the cow are accounted for in the localization resulting from the stored HRTF path without extensive computation of relative motion paths in different coordinate systems.

Listeners perceive virtual sound sources that are localized as binaural sound with more realism when the localization closely resembles or even mimics real or natural sound. Functionality or usefulness of binaural sound improves as realism of the sound improves. For example, the fields of virtual reality and augmented reality aim to provide experiences having a level of realism that approach or match physical reality. Virtual sound sources localized to the user preferably match or exceed the realism of the physical world that the user sees. Technical problems, however, exist as to how to effectively and efficiently convolve sound to resemble or mimic real or natural sound without hindering the user experience or overly burdening computers and/or electronic devices providing the sound to the listeners.

Example embodiments solve many of these technical problems and provide listeners with virtual sound sources localized with binaural sound that resembles or mimics real or natural sound without hindering the user experience or overly burdening computers and/or electronic devices providing the sound to the listeners. For example, accurate positional localization is a factor in providing realism to virtual sound sources as addressed and improved by example embodiments herein. Another factor of improving the realism of virtual sound sources is to mimic the effect that the environment would have on the sound, such as the environment seen by the listener. For example, the impulse response of an environment to a sound if it were played from a certain position in the environment is applied or convolved to a virtual sound source localizing from the certain position. Improving the realism in this way is based on convolving the sound with room impulse responses (RIRs) or binaural room impulse responses (BRIRs) that match the real or virtual listening environment of the listener. Example embodiments provide methods and apparatus that effectively and efficiently determine, store, retrieve, process, and/or execute RIRs and/or BRIRs that convolve binaural sound to listeners.

Figure 8:
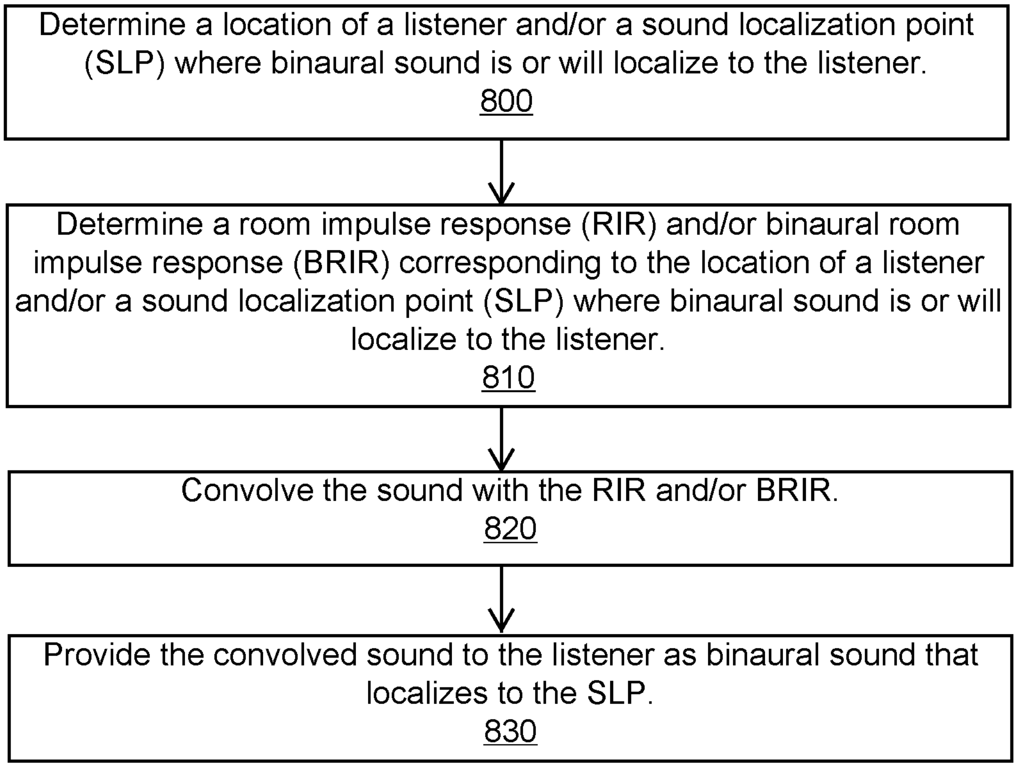
FIG. 8 is a method to determine a room impulse response (RIR) to convolve binaural sound and provide the convolved binaural sound to a listener in accordance with an example embodiment.

FIG. 8 is a method to determine a room impulse response (RIR) to convolve binaural sound and provide the convolved binaural sound to a listener in accordance with an example embodiment.

Block 800 states determine a location of a listener and/or a sound localization point (SLP) where binaural sound is or will localize to the listener.

One or more electronic devices determine a location of the listener and/or SLP where binaural sound is or will localize to the listener.

Example methods and apparatus to locate a person include, but are not limited to, tracking a person and/or HPED with GPS, tracking a smartphone with its mobile phone number, tracking a HPED via a wireless router or wireless network connection to which the HPED communicates for Internet access, tracking a person and/or HPED with a tag or barcode, tracking a person and/or HPED with a radio frequency identification (RFID) tag and reader, tracking a location of a person with a camera (such as a camera in conjunction with facial recognition), tracking a person and/or electronic device with electronic devices in a network (such as an Internet of Things (IoT) network in a home or office), and tracking a location of a person with one or more sensors. Alternatively, a person provides his or her location (such as speaking a location to an intelligent personal assistant that executes on a HPED). As another example, if the location is in a virtual environment, then an electronic device or program queries the software application providing the virtual environment (e.g., querying a VR game or VR application for a location of the user and/or SLP).

Consider an example in which a HPED (such as a smartphone) or a WED (such as electronic earphones, smartwatch, electronic glasses, or HMD) executes an application that tracks and shares its current location in real-time with other applications, electronic devices, and/or example embodiments discussed herein.

An example embodiment stores and/or associates SLPs with locations, including zones, areas, places, rooms, etc. When a person and/or electronic device goes to or near a location, then the SLPs associated with the location are retrieved. For example, a HPED of a person compares a current location with the locations of SLPs stored for the person to determine whether one or more SLPs exist for the location.

The determination as to whether a SLP exists for a particular location is based on one or more factors. These factors determine how or which SLPs are selected.

For example, one factor is proximity of the person and/or electronic device to the SLP or location where the impulse responses associated with the SLP were generated. A SLP is selected based on proximity to the person and/or electronic device. For instance, select a SLP closest to the person and/or electronic device. The proximity also exists in a VR setting or environment (e.g., select a SLP, RIR, and/or BRIR based on a location of a person in a VR world).

Another factor is the RIR associated with the SLP. For example, a closest SLP may not be appropriate if the SLP has a RIR that is not associated with the current location of the person. Consider an example in which Alice has many SLPs throughout her house. Each SLP includes RIRs for the particular room or for the position of the SLP in or with respect to the room in which the SLP is located. SLPs in the bathroom are convolved with bathroom RIRs; SLPs in the bedroom are convolved with bedroom RIRs; SLPs in a spherical array around the pillow have associated BRTFs, etc. When Alice receives a call, the voice of the caller is convolved with a RIR corresponding or correlating to the location of the SLP for the voice of the caller to Alice. While standing in the hallway, Alice receives a call from Bob on her smartphone. The closest SLP is a bathroom BRIR that is located a few feet from Alice. Since Alice is not in the bathroom, her smartphone selects a bedroom BRIR since the HPED senses her walking direction and predicts she will enter the bedroom shortly and not the bathroom.

Another factor is historic usage or personal preferences. When the person was previously at the location, he or she localized sound with a particular SLP and BRIR, and the SLP and BRIR are recommended for the location based on the past selection. For example, a user has a favorite SLP for voice calls, or has a specific SLP for calls with a particular friend regardless of their location at the time of a call.

An example embodiment executes an action when a particular impulse response is not available for the SLP selected for an incoming audio signal or virtual sound source in the current physical and/or virtual environment of the listener. For example, the listener enters a room or location for the first time, and no RIRs or BRIRs exist for the location, or, some RIRs or BRIRs are known or measured in the environment, but the RIR or BRIR/BRTF pair corresponding to the SLP is not known or available.

Example actions include, but are not limited to, choosing a generic or similar impulse response in order to convolve the sound (e.g., choosing a BRIR taken from or associated with another physical or virtual location); choosing an impulse response with different coordinates than the SLP (e.g., choosing a BRIR less than 12 inches from the SLP, or choosing a RIR from a far side of a room); choosing a RIR or BRIR not particular to the location but associated with the location (e.g., when the person is in a car for which no RIR exists, then choosing a RIR from another car); instructing the user to capture a BRIR for the SLP in the current environment; playing a particular ringtone that signifies to the user that a SLP or impulse response is not available for the current location; selecting to localize the sound at the SLP or another predetermined location but without RIR information (e.g., localize the sound with individualized HRTFs of the user that do not include RIRs); providing the user or other person with a sound warning, providing the user or other person with a visual warning, denying a device of the user from localizing sound (e.g., providing the sound in stereo or mono to the person instead of providing binaural sound that localizes to an external location); instructing the user or other person to move to another location corresponding or correlating to an available impulse response; or taking another action (such as an action discussed herein).

Block 810 states determine a room impulse response (RIR) and/or binaural room impulse response (BRIR) corresponding to the location of a listener and/or a sound localization point (SLP) where binaural sound is or will localize to the listener.

An example embodiment determines the RIR and/or BRIR in one or more of a variety of ways including, but not limited to, receiving or retrieving the RIR/BRIR from memory or electronic storage (e.g., a database), calculating the RIR/BRIR (e.g., calculating, interpolating, or predicting the RIR/BRIR from previous or historical data for neighboring locations), and receiving the RIR/BRIR from a transmission (e.g., obtaining the RIR/BRIR from a server or other electronic device via a wireless transmission over the Internet).

RIRs/BRIRs are stored and associated with locations. When a person goes to or near a location, then the RIRs associated with the location or location type are retrieved. For example, a HPED of a person compares a current location with the locations of stored RIRs available locally and online and determines whether one or more RIRs are retrievable for the position of the SLP with respect to the environment or are suitable for the location.

In one example embodiment, the HPED or other electronic device of the person captures the RIRs for the location. For example, while the person is at the location, a HPED of the person generates a sound, and electronic microphones capture impulse responses for the sound. In another example embodiment, the HPED or other electronic device retrieves RIRs for the location. For instance, RIRs are stored in a database or memory for various locations around the world, and these RIRs are available for retrieval. These RIRs can be impulse responses captured at the location or computer generated or estimated RIRs for a multiplicity of positions at the location. As yet another example, the HPED or electronic device retrieves RIRs for a similar location. For instance, if the location is a church but no RIRs exist for the particular church or with respect to the position of the listener in the church, then RIRs for another church are retrieved. Physical attributes of the location (such as size, shape, and other physical qualities) are compared to more closely match RIRs from other locations.

In example embodiments, reverberation is physically measured or digitally simulated (such as a pre-rendered array of synthesized impulse responses for convolution, or a ray tracing simulator using a 3D model of the physical or virtual environment or a similar environment). For example, to apply a reverberation effect, an incoming audio signal is convolved with an impulse response. Convolution multiplies the incoming audio signal with samples in the impulse response file. Various impulse responses for specific locations (ranging from small rooms to large areas) are retrieved from memory and then convolved in reverb applications to provide an audio signal with acoustic characteristics that are particular to the specific location.

In some instances, an action occurs when a SLP or impulse response does not exist for the current environment of the listener. For example, the listener enters a room or location for the first time, and no RIRs or BRIRs exist for the location.

Example actions include, but are not limited to, choosing a generic or similar impulse response in order to convolve the sound (e.g., choosing a BRIR taken from or associated with another physical or virtual location); choosing an impulse response with different coordinates than the SLP (e.g., choosing a BRIR less than 12 inches from the SLP, or choosing a RIR from a far side of the room); choosing a RIR or BRIR not particular to the location but associated with the location (e.g., when the person is in a car for which no RIR exists, then choosing a RIR from another car); instructing the user to capture a BRIR for the SLP in the current environment; playing a particular ringtone that signifies to the user that a SLP or impulse response is not available for the current location; selecting to localize the sound at the SLP or another predetermined location but without RIR information (e.g., localize the sound with individualized HRTFs of the user that do not include RIRs); providing the user or other person with a sound warning, providing the user or other person with a visual warning, denying a device of the user from localizing sound (e.g., providing the sound in stereo or mono to the person instead of providing binaural sound that localizes to an external location); instructing the user or other person to move to another location corresponding or correlating to an available impulse response; or taking another action (such as an action discussed herein).

Consider an example in which a database or other storage stores multiple sets of RIRs for common or typical locations or positions at locations, such as outside or outdoor locations (e.g., at a beach, in the woods, in a field, in a rural neighborhood, etc.), inside or indoor office locations (e.g., in an office room, in a cubicle, etc.), inside or indoor residential locations (e.g., in a bedroom, in a bathroom, in a living room, in a kitchen, etc.), inside or indoor retail locations (e.g., in a store, in a mall, etc.), inside other locations (e.g., inside an elevator, inside a warehouse, etc.). These RIRs are stored, transmitted, and shared as stock or common RIRs.

By way of example, electronic devices of users capture the RIRs and/or BRIRs and upload them to the database or other storage. For example, electronic devices (e.g., microphones worn in ears of users or in HPEDs or WEDs) capture RIRs and upload the RIRs to a collaborative database. The RIRs include information about the location of the captured RIRs (e.g., a description, identification, or layout of the location, type of objects or furniture in the location, size of the room or location, etc.). When an example embodiment predicts that an electronic device will select or requests a RIR for a location, the example embodiment retrieves the RIR for preprocessing from the collaborative database. For instance, the electronic device monitors and holds in memory registers a description or identification of the current location of the device, and an example embodiment monitors the identity of the location stored in the memory. The information is used to preprocess or prefetch RIRs for the location. For instance, if the electronic device enters a beach location, then an example embodiment triggers a search and retrieval for RIRs of a beach location from a local or remote database, and then preprocesses the retrieved RIRs for potential convolution.

In some instances, a BRIR pair is not known for a particular location (e.g., not known for the coordinate location of a SLP). A BRIR pair, or a RIR for another location can be substituted. For example, a left BRIR for a position $(r, \theta, \varphi)$ matches a RIR for a position $(r, \theta+5°, \varphi)$.

Block 820 states convolve the sound with the RIR and/or BRIR.

A processor, digital signal processor (DSP), microprocessor, processing unit, or other electronic device processes and/or convolves the sound with the RIR and/or BRIR.

Block 830 states provide the convolved sound to the listener as binaural sound that localizes to the SLP.

For example, one or more electronic devices provide the convolved sound to the listener. Examples of such electronic devices include, but are not limited to, headphones, earphones, earpieces, HMDs, OHMDs, speakers with crosstalk cancellation, HPEDs or PEDs communicating with speakers (such as wired or wireless headphones and/or earphones), computers (including televisions, servers, laptops, tablets, etc.) communicating with speakers (such as wired or wireless headphones and/or earphones), and other electronic devices that provide binaural sound to listeners.

Figure 9:
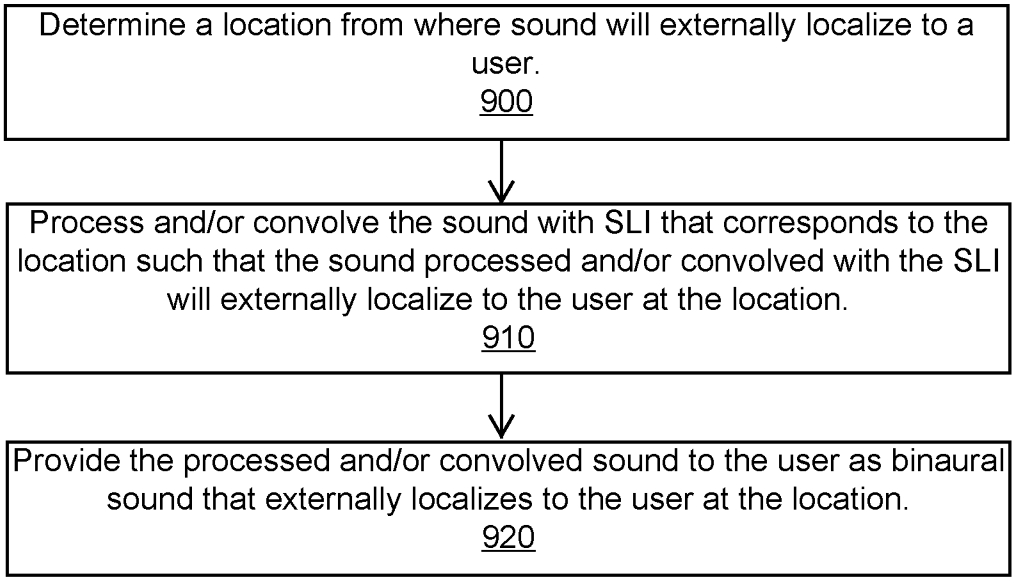
FIG. 9 is a method to process and/or convolve sound so the sound externally localizes as binaural sound to a user in accordance with an example embodiment.

FIG. 9 is a method to process and/or convolve sound so the sound externally localizes as binaural sound to a user in accordance with an example embodiment.

Block 900 states determine a location from where sound will externally localize to a user.

Binaural sound localizes to a location in 3D space to a user. The location is external to and away from the body of the user (e.g., located a distance away from the head of the user).

An electronic device, software application, and/or a user determines the location for a user who will hear the sound produced in his physical environment or in an augmented reality (AR) environment or a virtual reality (VR) environment. The location is expressed in a frame of reference of the user (e.g., the head, torso, or waist), the physical or virtual environment of the user, or other reference frames. Further, the location is stored or designated in memory or a file, transmitted over one or more networks, determined during and/or from an executing software application, or determined in accordance with other examples discussed herein. For example, the location is not previously known or stored but is calculated or determined in real-time. As another example, the location of the sound is determined at a point in time when a software application makes a request to externally localize the sound to the user or executes instructions to externally localize the sound to the user. Further, the location is in empty or unoccupied 3D space or in 3D space occupied with a physical object or a virtual object.

The location where to localize the sound can be stored at and/or originates from a physical object or electronic device that is separate from the electronic device providing the binaural sound to the user (e.g., separate from the electronic earphones, HMD, WED, smartphone, or other PED with or on the user). For instance, the physical object is an electronic device that wirelessly transmits a current location or the location where to localize sound to the electronic device processing and/or providing the binaural sound to the user. Alternatively, the physical object is a non-electronic device (e.g., a teddy bear, a chair, a table, a person, a picture in a picture frame, etc.).

Consider an example in which the location is at a physical object (as opposed to the location being in empty space). In order to determine a location of the physical object and hence the location where to localize the sound, the electronic system executes or uses one or more of object recognition (such as software or human visual recognition), an electronic tag located at the physical object (e.g., RFID tag), global positioning satellite (GPS), indoor positioning system (IPS), Internet of things (IoT), sensors, network connectivity and/or network communication, or other software and/or hardware that recognize or locate a physical object.

Zones, areas, directions, or points where sound localizes is defined in terms of one or more of the locations of the objects, such as a zone defined by points within a certain distance from the object or objects, a linear zone defined by the points between two objects, a surface or 2D zone defined by points within a perimeter having vertices at three or more objects, a 3D zone defined by points within a volume having vertices at four or more objects, etc. The data that describes nearby locations defines where sound localizes to the user. For example, a SLP is determined based on the location of an RFID tag or other electronic device that wirelessly emits its location.

Additionally, the location may be in empty space but based on a location of a physical object. For example, the location in empty space is next to or near a physical object (e.g., within an inch, a few inches, a foot, a few feet, a meter, a few meters, etc. of the physical object). The physical object thus provides a relative location or known location for the location in empty space since the location in empty space is based on a relative position with respect to the physical object.

Consider an example in which the physical object transmits a GPS location to a smartphone or WED of a user. The smartphone or WED includes hardware and/or software to determine its own GPS location and a point of direction or orientation of the user (e.g., a compass direction where the smartphone or WED is pointed or where the user is looking or directed, such as including head tracking). Based on the GPS and directional information, the smartphone or WED calculates a location proximate to the physical object (e.g., away from but within one meter of the physical object). The location becomes the SLP. The smartphone or WED retrieves SLI corresponding or correlating to, matching or approximating the SLP, convolves the sound with the SLI, and provides the convolved sound as binaural sound to the user so the binaural sound localizes to the SLP that is proximate to the physical object.

Location can include a general direction, such as to the right of the listener, to the left of the listener, above the listener, behind the listener, in front of the listener, etc. Location can be more specific, such as including a compass direction, an azimuth angle, an elevation angle, a coordinate location (e.g., an X-Y-Z coordinate), or an orientation. Location can also include distance information that is specific or general. For example, specific distance information is a number, such as 1.0 meters, 1.1 meters, 1.2 meters, etc. General distance information is less specific or includes a range, such as the distance being near field, the distance being far field, the distance being greater than one meter, the distance being less than one meter, the distance being between one to two meters, etc.

As one example, a PED (such as a HPED, or a WED) communicates with the physical object using radio frequency identification (RFID) or near field communication (NFC). For instance, the PED includes a RFID reader or NFC reader, and the physical object includes a passive or active RFID tag or a NFC tag. Based on the communication, the PED determines a location and other information of the physical object with respect to the PED.

As another example, a PED reads or communicates with an optical tag or quick response (QR) code that is located on or near the physical object. For example, the physical object includes a matrix barcode or two-dimensional bar code, and the PED includes a QR code scanner or other hardware and/or software that enables the PED to read the 2D barcode or other type of code to determine information about the object including the orientation of the object.

As another example, the PED includes Bluetooth low energy (BLE) hardware or other hardware to make the PED a Bluetooth enabled or Bluetooth Smart device. The physical object includes a Bluetooth device and a battery (such as a button cell) so that the two enabled Bluetooth devices (e.g., the PED and the physical object) wirelessly communicate with each other and exchange information.

As another example, the physical object includes an integrated circuit (IC) or system on chip (SoC) that stores information and wirelessly exchanges the information with the PED (e.g., information pertaining to the location, identity, angles and/or distance to a known location, etc.).

As another example, the physical object includes a low energy transmitter, such as an iBeacon transmitter. The transmitter transmits information to nearby PEDs, such as smartphones, tablets, WEDs, and other electronic devices that are within a proximity of the transmitter. Upon receiving the transmission, the PED determines a relative location to the transmitter and determines other information as well.

As yet another example, an indoor positioning system (IPS) locates objects, people, or animals inside a building or structure using one or more of radio waves, magnetic fields, acoustic signals, or other transmission or sensory information that a PED receives or collects. In addition to or besides radio technologies, non-radio technologies can be used in an IPS to determine position information with a wireless infrastructure. Examples of such non-radio technology include, but are not limited to, magnetic positioning, inertial measurements, and others. Further, wireless technologies can generate an indoor position and be based on, for example, a Wi-Fi positioning system (WPS), Bluetooth, RFID systems, identity tags, angle of arrival (AoA, e.g., measuring different arrival times of a signal between multiple antennas in a sensor array to determine a signal origination location), time of arrival (ToA, e.g., receiving multiple signals and executing trilateration and/or multi-lateration to determine a location of the signal), received signal strength indication (RSSI, e.g., measuring a power level received by one or more sensors and determining a distance to a transmission source based on a difference between transmitted and received signal strengths), and ultra-wideband (UWB) transmitters and receivers.

Object detection and location can also be achieved with radar-based technology (e.g., an object-detection system that transmits radio waves to determine one or more of an angle, distance, velocity, and identification of a physical object).

One or more electronic devices in the IPS, network, or electronic system collect and analyze wireless data to determine a location of the physical object using one or more mathematical or statistical algorithms. Examples of such algorithms include an empirical method (e.g., k-nearest neighbor technique) or a mathematical modeling technique that determines or approximates signal propagation, finds angles and/or distance to the source of signal origination, and determines location with inverse trigonometry (e.g., trilateration to determine distances to objects, triangulation to determine angles to objects, Bayesian statistical analysis, and other techniques).

The PED determines information from the information exchange or communication exchange with the physical object. By way of example, the PED determines information about the physical object, such as a location and/or orientation of the physical object (e.g., a GPS coordinate, an azimuth angle, an elevation angle, a relative position with respect to the PED, etc.), a distance from the PED to the physical object, object tracking (e.g., continuous, continual, or periodic tracking of movements or motions of the PED and/or the physical object with respect to each other), object identification (e.g., a specific or unique identification number or identifying feature of the physical object), time tracking (e.g., a duration of communication, a start time of the communication, a stop time of the communication, a date of the communication, etc.), and other information.

As yet another example, the PED captures an image of the physical object and includes or communicates with object recognition software that determines an identity, location, and orientation of the object. Object recognition finds and identifies objects in an image or video sequence using one or more of a variety of approaches, such as edge detection or other CAD object model approach, a method based on appearance (e.g., edge matching), a method based on features (e.g., matching object features with image features), and other algorithms.

In an example embodiment, the location or presence of the physical object is determined by an electronic device (such as a HPED, or PED) communicating with or retrieving information from the physical object or an electronic device (e.g., a tag) attached to or near the physical object.

In another example embodiment, the electronic device does not communicate with or retrieve information from the physical object or an electronic device attached to or near the physical object (e.g., retrieving data stored in memory).

Instead, the electronic device gathers location information without communicating with the physical object or without retrieving data stored in memory at the physical object.

As one example, the electronic device captures a picture or image of the physical object, and the location and orientation of the object is determined from the picture or image. For instance, when a size of a physical object is known, distance to the object can be determined by comparing a relative size of the object in the image with the known actual size.

As another example, a light source in the electronic device bounces light off the object and back to a sensor to determine the location of the object.

As yet another example, the location of the physical object is not determined by communicating with the physical object. Instead, the electronic device or a user of the electronic device selects a direction and/or distance, and the physical object at the selected direction and/or distance becomes the selected physical object. For example, a user holds a smartphone and points it at a compass heading of 270° (East). An empty chair is located along the compass heading and becomes the designated physical object since it is positioned along the selected compass heading.

Consider another example in which the physical object is not determined by communicating with the physical object. An electronic device (such as a smartphone) includes one or more inertial sensors (e.g., an accelerometer, gyroscope, and magnetometer) and a compass. These devices enable the smartphone to track a position and/or orientation of the smartphone. A user or the smartphone designates and stores a certain orientation as being the location where sound will localize. Thereafter, when the orientation and/or position changes, the smartphone tracks a difference between the stored designated location and the changed position (e.g., a current position).

Consider another example in which an electronic device captures video with a camera and displays the video in real time on the display of the electronic device. The user taps or otherwise selects a physical object shown on the display, and the physical object becomes the designated object. The electronic device records a picture of the selected object and orientation information of the electronic device when the object is selected (e.g., records an X-Y-Z position, and a pitch, yaw and roll of the electronic device).

As another example, a three-dimensional (3D) scanner captures images of a physical object or a location (such as one or more rooms), and three-dimensional models are built from these images. The 3D scanner creates point clouds of various samples on the surfaces of the object or location, and a shape is extrapolated from the points through reconstruction. A point cloud can define the zone. The extrapolated 3D shape can define a zone. The 3D generated shape or image includes distances between points and enables extrapolation of 3D positional information for each object or zone. Examples of non-contact 3D scanners include, but are not limited to, time-of-flight 3D scanners, triangulation 3D scanners, and others.

Block 910 states process and/or convolve the sound with SLI that corresponds to the location such that the sound processed and/or convolved with the SLI will externally localize to the user at the location.

By way of example, the sound localization information (SLI) are retrieved, obtained, or received from memory, a database, a file, an electronic device (such as a server, cloud-based storage, or another electronic device in the computer system or in communication with a PED providing the sound to the user through one or more networks), etc. For instance, the information includes one or more of HRTFs, ILDs, ITDs, and/or other information discussed herein. As noted, the information can also be calculated in real-time.

An example embodiment processes and/or convolves sound with the SLI so the sound localizes to a particular area or point with respect to a user. The SLI required to process and/or convolve the sound is retrieved or determined based on a location of the SLP. For example, if the SLP is located one meter in front of a face of the listener and slightly off to a right side of the listener, then an example embodiment retrieves the corresponding HRTFs, ITDs, and ILDs and convolves the sound to the location. The location can be more specific, such as a precise spherical coordinate location of (1.2 m, 25°, 15°), and the HRTFs, ITDs, and ILDs are retrieved that correspond to the location. For instance, the retrieved HRTFs have a coordinate location that matches or approximates the coordinate location of the location where sound is desired to originate to the user. Alternatively, the location is not provided but the SLI is provided (e.g., a software application provides the DSP with the HRTFs and other information to convolve the sound).

A central processing unit (CPU), processor (such as a digital signal processor or DSP), or microprocessor processes and/or convolves the sound with the SLI, such as a pair of head related transfer functions (HRTFs), ITDs, and/or ILDs so the sound localizes to a zone or SLP. For example, the sound localizes to a specific point (e.g., localizing to point $(r, \theta, \varphi)$) or a general location or area (e.g., localizing to far field location $(\theta, \varphi)$ or near field location $(\theta, \varphi)$). As an example, a lookup table that stores a HRTF includes a field/column for HRTF pairs and includes a column that specifies the coordinates associated with each pair, and the coordinates indicate the location for the origination of the sound. These coordinates include a distance (r) or near field or far field designation, an azimuth angle ($\theta$), and/or an elevation angle ($\varphi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more.

Example embodiments are implemented with near field and far field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The model assumes a rigid, spherical head and a source of sound at an azimuth angle. The time delay varies according to the azimuth angle since sound takes longer to travel to the far ear. The ITD for a source of sound located on a right side of a head of a person is given according to two formulas:

$$ITD=(a/c)[\theta+\sin(\theta)] \text{ for situations in which } 0\leq\theta\leq\pi/2;$$

and $$ITD=(a/c)[\pi-\theta+\sin(\theta)] \text{ for situations in which } \pi/2\leq\theta\leq\pi,$$

where $\theta$ is the azimuth in radians ($0\leq\theta\leq\pi$), a is the radius of the head, and c is the speed of sound. The first formula provides the approximation when the origin of the sound is in front of the head, and the second formula provides the approximation when the origin of the sound is behind the head (i.e., the azimuth angle measured in degrees is greater than ±90°).

By way of example, the coordinates (r, θ, ϕ) for external sound localization can also be calculated from a measurement of an orientation of and a distance to the face of the person when the HRIRs are captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, ϕ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person.

A location of the SLP corresponds to the coordinates of one or more pairs of HRTFs. For example, the coordinates of or within a SLP or a zone match or approximate the coordinates of a HRTF. Consider an example in which the coordinates for a pair of HRTFs are (r, θ, ϕ) and are provided as (1.2 meters, 35°, 10°). A corresponding SLP or zone for a person thus includes (r, θ, ϕ), provided as (1.2 meters, 35°, 10°). In other words, the person will localize the sound as occurring 1.2 meters from his or her face at an azimuth angle of 35° and at an elevation angle of 10° taken with respect to a forward-looking direction of the person. In the example, the coordinates of the SLP and HRTF match.

The coordinates for a SLP can also be approximated or interpolated based on known data or known coordinate locations. For example, a SLP is desired for coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound at the SLP desired for the coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves them into binaural audio output or binaural stereo tracks, such as convolving the input signal into binaural audio output that is specific or individualized for the listener based on one or more of the impulse responses to the listener.

The FIR filters are derived binaural impulse responses that are obtained from example embodiments discussed herein (e.g., derived from signals received through microphones placed in, at, or near the left and right ear channel entrance of the person). Alternatively or additionally, the FIR filters are obtained from another source, such as generated from a computer simulation or estimation, generated from a dummy head, retrieved from storage, etc. Further, convolution of an input signal into binaural output include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, ϕ) with the time-domain DTFs calculated for the left and right ears per the equations above. The ITD is located at the point for which the function attains its maximum value, known as the argument of the maximum or arg max as follows:

$$ITD = \text{argmax}(\tau)\sum_n d_{l,\theta,\phi}(n)\cdot d_{r,\theta,\phi}(n+\tau).$$

Subsequent sounds are filtered with the left HRTF, right HRTF, and ITD so that the sound localizes at (r, θ, ϕ). Such sounds include filtering stereo and monaural sound to localize at (r, θ, ϕ). For example, given an input signal as a monaural sound signal s(n), this sound is convolved to appear at (θ, ϕ) when the left ear is presented with:

$$S_l(n)=s(n-\text{ITD})\cdot d_{l,\theta,\phi}(n);$$

and the right ear is presented with:

$$S_r(n)=s(n)\cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau)\cdot h(\tau) = \int_0^\infty x(\tau - t)\cdot h(t)\cdot dt.$$

This reduces to a summation when the impulse response has a given length N and the input signal and the impulse response are sampled at t=iDt as follows:

$$y(i) = \sum_{j=0}^{N-1} x(i-j)\cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more virtual sound sources or sound localization points (known as SLPs). These streams are convolved with a binaural impulse response for the left ear and the right ear to generate the left and right binaural output sound signal. The output sound signal is further processed depending on a final destination, such as applying a cross-talk cancellation algorithm to the output sound signal when it will be provided through loudspeakers or applying artificial binaural reverberation to provide 3D spatial context to the sound.

The SLP represents a location where the person will perceive an origin of the sound.

Example embodiments designate or include an object at the SLP. For an external localization, the SLP is away from the person (e.g., the SLP is away from but proximate to the person or away from but not proximate to the person). The SLP can also be located inside the head of the person (e.g., when sound is provided to the listener in stereo or mono sound).

Listeners may not localize sound to an exact or precise location or a location that corresponds with an intended location. In some instances, the location where the computer system or electronic device convolves the sound may not align with or coincide with the location where the listener perceives the source of the sound. For example, the computer-generated SLP may not align with the SLP where the listener localizes the origin of the sound. For example, a listener commands a software application or a process to localize a sound to a SLP having coordinates (2 m, 45°, 0°), but the listener perceives the sound farther to his right at 55° azimuth. The difference in location or error may be slight (e.g., one or two degrees in azimuth and/or elevation) or may be greater.

Consider an example in which the relative coordinates between the physical object and a head orientation of the listener are as follows: the distance from the listener to the physical object is two meters (R=2.0 m); the azimuth angle between the forward-facing direction of the head of the listener and the physical object is twenty-five degrees (θ=25°); and the elevation angle between the forward-facing direction of the head of the listener and the physical object is zero degrees (φ=0°). The computer system or an electronic device in the computer system retrieves or receives a HRTF pair that has an associated sound localization point or SLP of (R, θ, φ)=(2.0 m, 25°, 0°). When sound is convolved with the HRTF pair, the sound will localize to the listener from the SLP at (2.0 m, 25°, 0°).

Block 920 states provide the processed and/or convolved sound to the user as binaural sound that externally localizes to the user at the location.

Binaural sound can be provided to the listener through bone conduction headphones, speakers of a wearable electronic device (e.g., headphones, earphones, electronic glasses, head mounted display, smartphone, etc.), or the binaural sound can be processed for crosstalk cancellation and provided through other types of speakers (e.g., dipole stereo speakers).

From the point-of-view of the listener, the sound originates or emanates from the object, point, area, or location that corresponds with the SLP. For example, an example embodiment selects a SLP location at, on, or near a physical object, a VR object, or an AR object. When the sound is convolved with the HRTFs corresponding with the SLP, then the sound appears to originate to the listener at the object.

When binaural sound is provided to the listener, the listener will hear the sound as if it originates from the object (assuming an object is selected for the SLP). The sound, however, does not originate from the object since the object may be an inanimate object with no electronics or an animate object with no electronics. Alternatively, the object has electronics but does not have the capability to generate sound (e.g., the object has no speakers or sound system). As yet another example, the object has speakers and the ability to provide sound but is not providing sound to the listener. In each of these examples, the listener perceives the sound to originate from the object, but the object does not produce the sound. Instead, the sound is altered or convolved and provided to the listener so the sound appears to originate from the object.

Sound localization information (SLI) is stored and categorized in various formats. For example, tables or lookup tables store SLI for quick access and provide convolution instructions for sound. Information stored in tables expedites retrieval of stored information, reduces CPU time required for sound convolution, and reduces a number of instruction cycles. Storing SLI in tables also expedites and/or assists in prefetching, preprocessing, caching, and executing other example embodiments discussed herein.

FIG. 10A is a table 1000A for telephone calls in accordance with an example embodiment. A user hears binaural sound through earphones or headphones during telephone calls. The table includes a first column (labeled "Description") and a second column (labeled "Sound Localization Information"). The descriptive column identifies descriptions for where binaural sound will be localized for telephone calls, and the SLI column identifies SLI for convolving the sound for the given description. By way of example, when the user is located in the office, then the SLI information includes SLP22-SLP24 and Path 43. SLP22-SLP24 provide coordinate locations where sound will externally localize to the user and correlate with or associate with convolution information (such as HRTF pairs, volume, RIRs, BRIRs, ITDs, ILDs, etc.). For instance, these SLPs are typically, frequently, or historically selected when the user has a telephone call in the office.

The SLI column also includes sound volumes for telephone calls and RIRs. For instance, when the user has a telephone call in the bedroom, then the voice of the caller is preferred to localize at SLP3; the volume is set to level 7, and RIR6 is convolved with the voice of the caller.

The description column also includes keywords (e.g., "No" and "Yes") and their associated SLI (e.g., paths for convolving sound or other convolution data). For example, when a natural language user interface detects the user saying the word "no" during a telephone call, then the software application retrieves convolution data associated with Path22. Binaural sound convolved from the data enables the user to perceive a SLP of a voice or other sound as fixed in space when moving his or her head along Path22 associated with the word "no."

FIG. 10B is a table 1000B for a fictitious VR game called "Battle X" in accordance with an example embodiment. Users play the game after donning head mounted displays (HMDs) and while hearing binaural sound through earphones or headphones. The table includes a first column (labeled "Description") and a second column (labeled "Sound Localization Information"). The description column identifies descriptions for where binaural sound will be localized to users while the users play the game, and the SLI column identifies SLI for convolving the sound for the given description. By way of example, when the game starts, binaural sound plays to the user along a sequence defined with HRTFs (shown as HRTF7, HRTF8, HRTF9, and HRTF22). When level 1 of the game starts, the software application knows that sound will be localizing to SLP2-SLP10, along Path4, and with RIR7 and RIR24. The software application also knows in advance SLI for level 2 and the ending sequence (e.g., sound that plays as the game ends). Further, when the game is 7 minutes and seconds into level 1, then the software application knows the sound of a bomb will externally localize at SLP90 with HRTF77.

The software application knows in advance which binaural sounds will play, where the sounds will externally localize to the user, and how to convolve the sounds (e.g., volume, RIR, and other SLI information). The SLI are prefetched, preprocessed, and cached to expedite convolution and improve computer performance of providing binaural sound to listeners.

Figure 11:
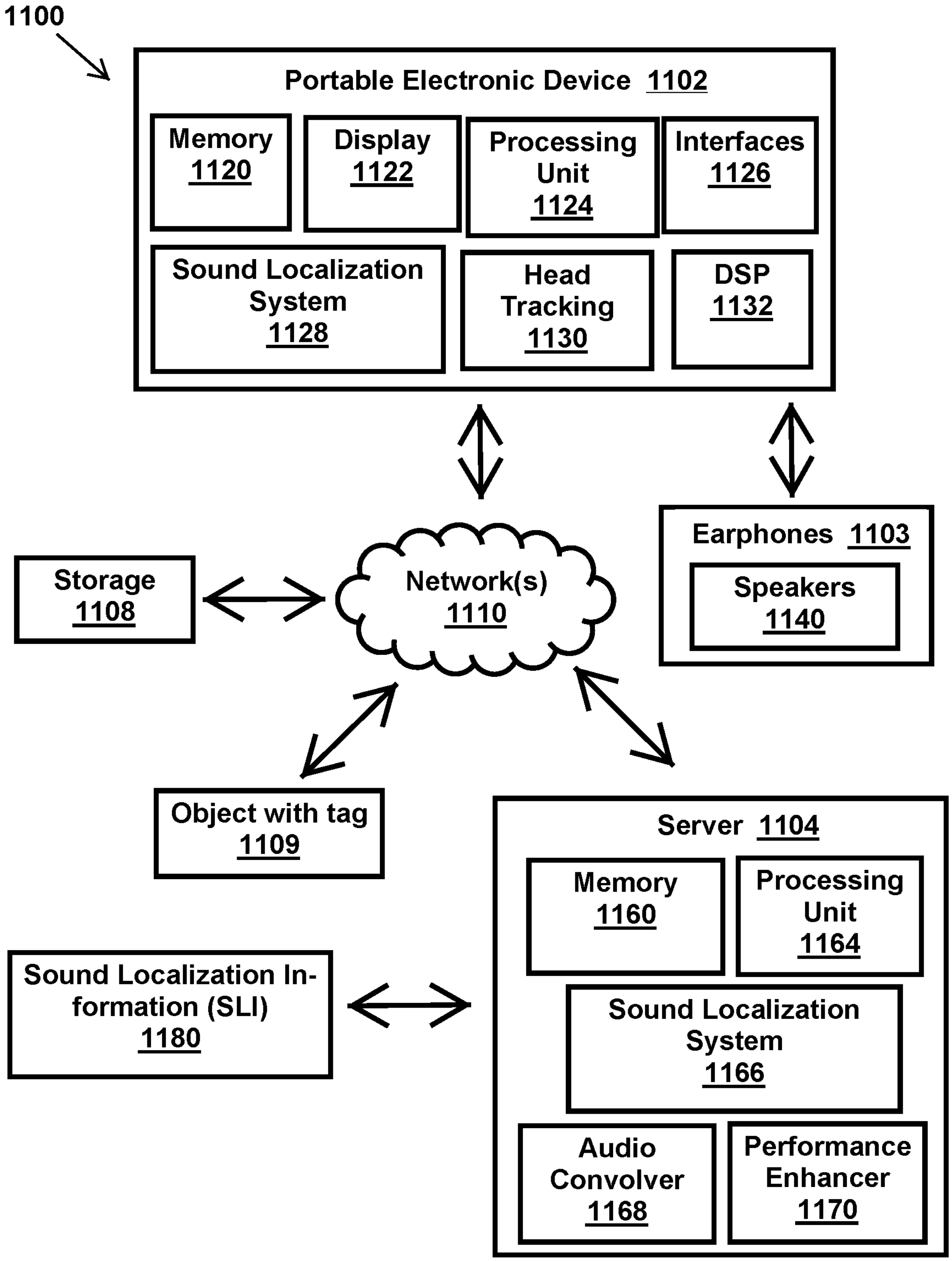
FIG. 11 is a computer system or electronic system in accordance with an example embodiment.

FIG. 11 is a computer system or electronic system 1100 in accordance with an example embodiment. The computer system includes a portable electronic device or PED 1102, one or more computers or electronic devices (such as one or more servers) 1104, storage or memory 1108, and a physical object with a tag or identifier 1109 in communication over one or more networks 1110.

The portable electronic device 1102 includes one or more components of computer readable medium (CRM) or memory 1120 (such as cache memory and memory storing instructions to execute one or more example embodiments), a display 1122, a processing unit 1124 (such as one or more processors, microprocessors, and/or microcontrollers), one or more interfaces 1126 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a sound localization system 1128, head tracking 1130, and a digital signal processor (DSP) 1132.

The PED 1102 communicates with wired or wireless headphones or earphones 1103 that include speakers 1140 or other electronics (such as microphones).

The storage 1108 includes one or more of memory or databases that store one or more of audio files, sound information, sound localization information, audio input, SLPs and/or zones, software applications, user profiles and/or user preferences (such as user preferences for SLP/Zone locations and sound localization preferences), impulse responses and transfer functions (such as HRTFs, HRIRs, BRIRs, and RIRs), and other information discussed herein.

Physical objects with a tag or identifier 1109 include, but are not limited to, a physical object with memory, wireless transmitter, wireless receiver, integrated circuit (IC), system on chip (SoC), tag or device (such as a RFID tag, Bluetooth low energy, near field communication or NFC), bar code or QR code, GPS, sensor, camera, processor, sound to play at a receiving electronic device, sound identification, and other sound information or location information discussed herein.

The network 1110 includes one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

Electronic device 1104 (shown by way of example as a server) includes one or more components of computer readable medium (CRM) or memory 1160 (including cache memory), a processing unit 1164 (such as one or more processors, microprocessors, and/or microcontrollers), a sound localization system 1166, an audio or sound convolver 1168, and a performance enhancer 1170.

The electronic device 1104 communicates with the PED 1102 and with storage or memory 1180 that stores sound localization information (SLI) 1180, such as transfer functions and/or impulse responses (e.g., HRTFs, HRIRs, BRIRs, etc. for multiple users) and other information discussed herein. Alternatively or additionally, the transfer functions and/or impulse responses and other SLI are stored in memory 1120.

Figure 12:
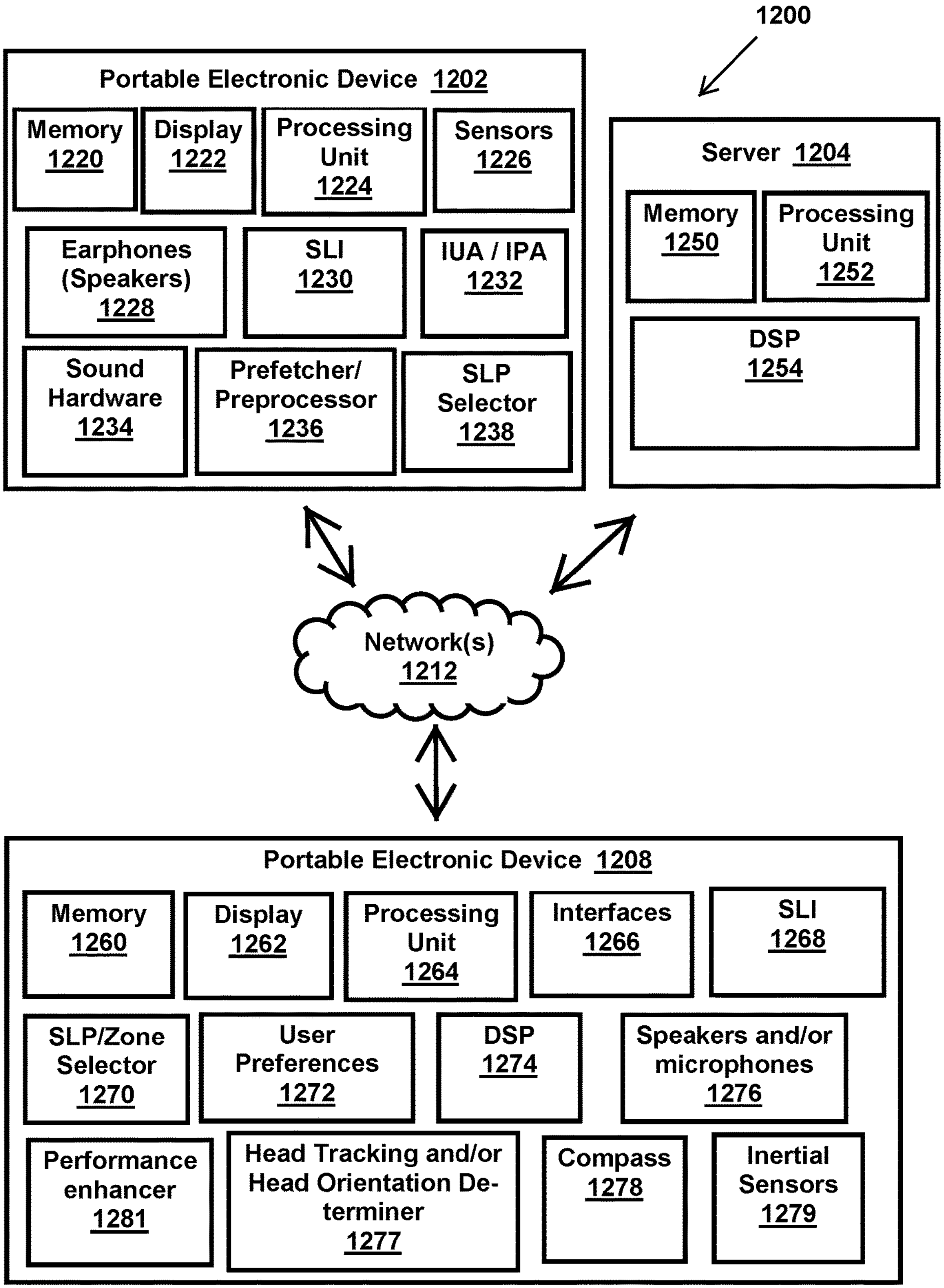
FIG. 12 is a computer system or electronic system in accordance with an example embodiment.

FIG. 12 is a computer system or electronic system in accordance with an example embodiment. The computer system 1200 includes an electronic device 1202, a server 1204, and a portable electronic device 1208 (including wearable electronic devices and handheld portable electronic devices) in communication with each other over one or more networks 1212.

Portable electronic device 1202 includes one or more components of computer readable medium (CRM) or memory 1220 (including cache memory), one or more displays 1222, a processor or processing unit 1224 (such as one or more microprocessors and/or microcontrollers), one or more sensors 1226 (such as micro-electro-mechanical systems sensor, an activity tracker, a pedometer, a piezoelectric sensor, a biometric sensor, an optical sensor, a radio-frequency identification sensor, a global positioning satellite (GPS) sensor, a solid state compass, gyroscope, magnetometer, and/or an accelerometer), earphones with speakers 1228, sound localization information (SLI) 1230, an intelligent user agent (IUA) and/or intelligent personal assistant (IPA) 1232, sound hardware 1234, a prefetcher and/or preprocessor 1236, and a SLP selector 1238.

Server 1204 includes computer readable medium (CRM) or memory 1250, a processor or processing unit 1252, and a DSP 1254 and/or other hardware to convolve audio in accordance with an example embodiment.

Portable electronic device 1208 includes computer readable medium (CRM) or memory 1260 (including cache memory), one or more displays 1262, a processor or processing unit 1264, one or more interfaces 1266 (such as interfaces discussed herein), sound localization information 1268 (e.g., stored in memory), a sound localization point (SLP) selector and/or zone selector 1270, user preferences 1272, one or more digital signal processors (DSP) 1274, one or more of speakers and/or microphones 1276, a performance enhancer 1281, head tracking and/or head orientation determiner 1277, a compass 1278, and inertial sensors 1279 (such as an accelerometer, a gyroscope, and/or a magnetometer).

A sound localization point (SLP) selector includes specialized hardware and/or software to execute example embodiments that select a SLP for where binaural sound localizes to a user.

A performance enhancer, prefetcher, and preprocessor are examples of specialized hardware and/or software that assist in improving performance of a computer and/or execution of a method discussed herein and/or one or more blocks discussed herein. Example functions of a performance enhancer are discussed in connection with FIGS. 1-4 and other figures and example embodiments.

A sound localization system (SLS), performance enhancer, and SLP selector include one or more of a processor, core, chip, microprocessor, controller, memory, specialized hardware, and specialized software to execute one or more example embodiments (including one or more methods discussed herein and/or blocks discussed in a method). By way of example, the hardware includes a customized integrated circuit (IC) or customized system-on-chip (SoC) to select, assign, and/or designate a SLP and/or zone for sound or convolve sound with SLI to generate binaural sound. For instance, an application-specific integrated circuit (ASIC) or a structured ASIC are examples of a customized IC that is designed for a particular use, as opposed to a general-purpose use. Such specialized hardware also includes field-programmable gate arrays (FPGAs) designed to execute a method discussed herein and/or one or more blocks discussed herein. For example, FPGAs are programmed to execute selecting, assigning, and/or designating SLPs and/or zones for sound or convolving, processing, or preprocessing sound so the sound externally localizes to the listener.

The sound localization system performs various tasks with regard to managing, generating, interpolating, extrapolating, retrieving, storing, and selecting SLPs and can function in coordination with and/or be part of the processing unit and/or DSPs or can incorporate DSPs. These tasks include, determining coordinates of SLP and their corresponding HRTFs, mapping SLP locations and information for subsequent retrieval and display, selecting SLPs and/or zones for a user, selecting sets of SLPs according to circumstantial criteria, selecting objects to which sound will localize to a user, designating a type of sound, segment of audio, or virtual sound source, providing binaural sound to users at a SLP, prefetching and/or preprocessing SLI, and executing one or more other blocks discussed herein (such as blocks that improve performance of the computer and/or electronic device providing binaural sound to the listener). The sound localization system can also include a sound convolving application that convolves and de-convolves sound according to one or more audio impulse responses and/or transfer functions based on or in communication with head tracking.

By way of example, an intelligent personal assistant or intelligent user agent is a software agent that performs tasks or services for a person, such as organizing and maintaining information (such as emails, messaging (e.g., instant messaging, mobile messaging, voice messaging, store and forward messaging), calendar events, files, to-do items, etc.), initiating telephony requests (e.g., scheduling, initiating, and/or triggering phone calls, video calls, and telepresence requests between the user, IPA, other users, and other IPAs), responding to queries, responding to search requests, information retrieval, performing specific one-time tasks (such as responding to a voice instruction), file request and retrieval (such as retrieving and triggering a sound to play), timely or passive data collection or information gathering from persons or users (such as querying a user for information), data and voice storage, management and recall (such as taking dictation, storing memos, managing lists), memory aid, reminding of users, performing ongoing tasks (such as schedule management and personal health management), and providing recommendations. By way of example, these tasks or services are based on one or more of user input, prediction, activity awareness, location awareness, an ability to access information (including user profile information and online information), user profile information, and other data or information.

By way of example, the sound hardware includes a sound card and/or a sound chip. A sound card includes one or more of a digital-to-analog (DAC) converter, an analog-to-digital (ATD) converter, a line-in connector for an input signal from a source of sound, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier. The sound hardware can be or include customized or specialized hardware that processes and convolves mono and stereo sound into binaural sound.

By way of example, a computer and a portable electronic device include, but are not limited to, handheld portable electronic devices (HPEDs), wearable electronic glasses, smartglasses, watches, wearable electronic devices (WEDs) or wearables, smart earphones or hearables, voice control devices (VCD), voice personal assistants (VPAs), network attached storage (NAS), printers and peripheral devices, virtual devices or emulated devices (e.g., device simulators, soft devices), cloud resident devices, computing devices, electronic devices with cellular or mobile phone capabilities, digital cameras, desktop computers, servers, portable computers (such as tablet and notebook computers), smartphones, electronic and computer game consoles, home entertainment systems, digital audio players (DAPs) and handheld audio playing devices (example, handheld devices for downloading and playing music and videos), appliances (including home appliances), head mounted displays (HMDs), optical head mounted displays (OHMDs), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP and/or sound hardware as discussed herein).

The SLP selector and/or SLS can also execute retrieving SLI, preprocessing, predicting, and caching including, but not limited to, predicting an action of a user, predicting a location of a user, predicting motion of a user such as a gesture, a change in a head displacement and/or orientation or head path, predicting a trajectory of a sound localization to a user or a HRTF path, predicting an event, predicting a desire or want of a user, predicting a query of a user (such as a query to or response from an intelligent personal assistant), predicting and/or recommending a SLP, zone, or RIR/RTF to a user, etc. Such predictions can also include predicting user actions or requests in the future (such as a likelihood that the user or electronic device localizes a type of sound to a particular SLP or zone). For instance, determinations by a software application, an electronic device, and/or user agent are modeled as a prediction that the user will take an action and/or desire or benefit from moving or muting a SLP, changing a zone, from delaying the playing of a sound, from a switch between binaural, mono, and stereo sounds or a change to binaural sound (such as pausing binaural sound, muting binaural sound, selecting an object at which to localize sound, reducing or eliminating one or more cues or spatializations or localizations of binaural sound). For example, an analysis of historical events, personal information, geographic location, and/or the user profile provides a probability and/or likelihood that the user will take an action (such as whether the user prefers a particular SLP or zone as the location for where sound will localize, prefers binaural sound or stereo, or mono sound for a particular location, prefers a particular listening experience, or a particular communication with another person or an intelligent personal assistant). By way of example, one or more predictive models execute to predict the probability that a user would take, determine, or desire the action. The predictor also predicts future events unrelated to the actions of the user including, but not limited to, a prediction of times, locations, or identities of incoming callers or virtual sound source requests for sound localizations to the user, a type or quality of inbound sound, predicting a virtual sound source path including a change in orientation of the virtual sound source or SLP such as a change in a direction of source emission of the SLP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS, performance enhancer, or portions thereof include an integrated circuit FPGA that is specifically customized, designed, configured, or wired to execute one or more blocks discussed herein. For example, the FPGA includes one or more programmable logic blocks that are wired together or configured to execute combinational functions for the SLS and/or performance enhancer, such as prefetching instructions and/or SLI, preprocessing SLI, determining which data to cache, assigning types of sound to SLPs and/or zones, assigning software applications to SLPs and/or zones, selecting a SLP and/or zone for sound to externally localize as binaural sound to the user, etc.

Consider an example in which the SLS and/or the performance enhancer or portions thereof include an integrated circuit or ASIC that is specifically customized, designed, or configured to execute one or more blocks discussed herein. For example, the ASIC has customized gate arrangements for the SLS and/or performance enhancer. The ASIC can also include microprocessors and memory blocks (such as being a SoC (system-on-chip) designed with special functionality to execute functions of the SLS and/or performance enhancer).

Consider an example in which the SLS and/or performance enhancer or portions thereof include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein (including processing and/or convolving sound into binaural sound). Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or prefetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector and/or an audio diarization system. For example, the SLP selector, audio diarization system, and/or the DSP are integrated onto a single integrated circuit die or integrated onto multiple dies in a single chip package to expedite binaural sound processing.

Consider an example in which the DSP additionally includes a voice recognition system and/or acoustic fingerprint system. For example, an audio diarization system, acoustic fingerprint system, and a MFCC/GMM analyzer and/or the DSP are integrated onto a single integrated circuit die or integrated onto multiple dies in a single chip package to expedite binaural sound processing.

Consider another example in which HRTFs (or other transfer functions or impulse responses) are stored or cached in the DSP memory or local memory relatively close to the DSP to expedite binaural sound processing.

Consider an example in which a smartphone or other PED includes one or more dedicated sound DSPs (or dedicated DSPs for sound processing, image processing, and/or video processing). The DSPs execute instructions to convolve sound and display locations of zones/SLPs for the sound on a user interface of a HPED. Further, the DSPs simultaneously convolve multiple SLPs to a user. These SLPs can be moving with respect to the face of the user so the DSPs convolve multiple different sound signals and virtual sound sources with HRTFs that are continually, continuously, or rapidly changing.

Figure 13:
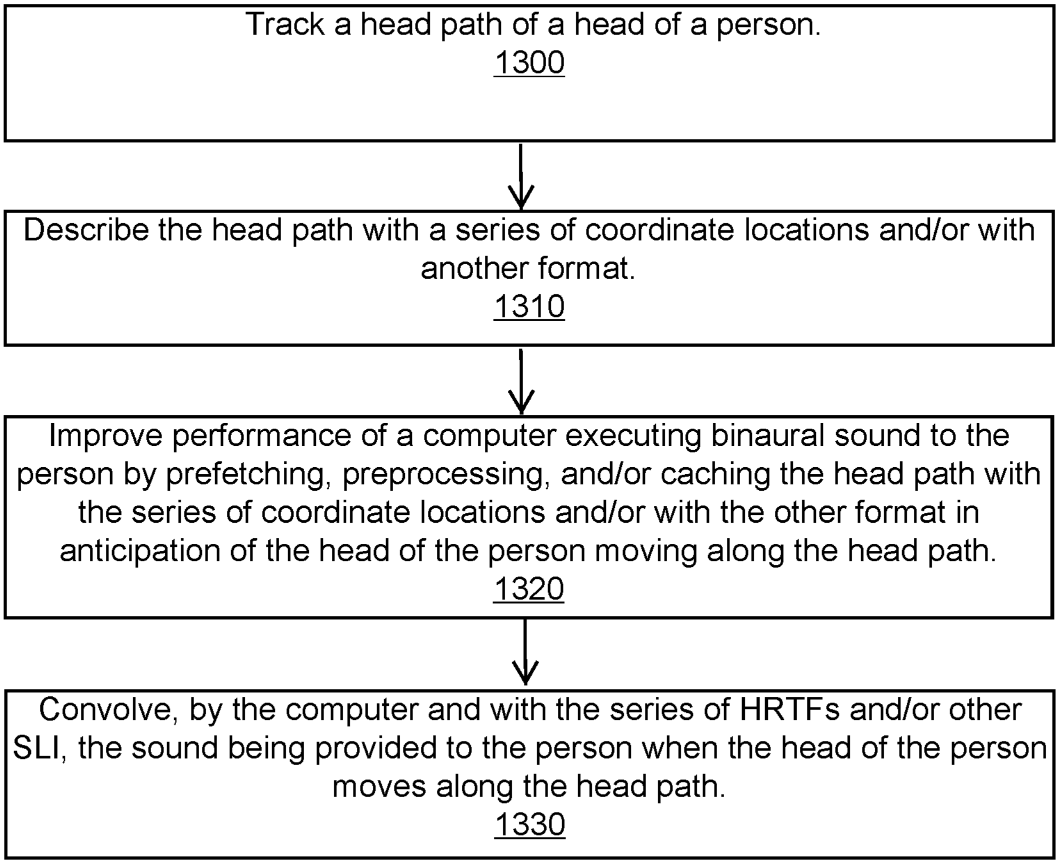
FIG. 13 is a method that improves performance of a computer that executes binaural sound to a listener in accordance with an example embodiment.

FIG. 13 is a method that improves performance of a computer that executes binaural sound to a listener in accordance with an example embodiment.

By way of example, the method executes during an event such as during a telephone call, during a software game that provides a VR environment or AR image, while a user wears a head mounted display (e.g., a OHMD, smartglasses, or a smartphone in a wearable head mounted device), while a user wears a wearable electronic device that provides binaural sound in a virtual auditory space or 3D space, or during execution of other example embodiments discussed herein.

Block 1300 states track a head path of a head of the person.

One or more electronic devices and/or sensors track the head path of the head of the person. By way of example, such electronic devices and/or sensors include, but are not limited to, one or more of an accelerometer, a gyroscope, a magnetometer, a compass, a camera, GPS locator, IoT sensors, a HMD, a wearable electronic device (including smartglasses, smart earphones, smartphones and other HPEDs), RFID tags, and other sensors and electronic devices discussed herein.

Block 1310 states describe the head path with a series of coordinate locations and/or with another format.

Example embodiments provide different ways or formats to define and/or store head paths. For example, these ways or formats include, but are not limited to, one or more of defining and/or storing the head path as: a series or sequence of coordinate locations that correspond or correlate to coordinate locations in a series of HRTFs, a series or sequence of HRTFs, a series or sequence of coordinate locations that correspond or correlate to coordinate locations of SLPs, a series or sequence of SLPs, an equation (such as a parametric equation of a line or a curve), a plurality of azimuth ($\theta$) and/or elevation ($\phi$) angles (or locations in another coordinate system), a plurality of coordinates with respect to a location or position (e.g., a forward-looking direction, origin, SLP, virtual sound source, or other object or position), a range of degrees (e.g., a range from 0°-45°), a series or sequence of compass directions, and other examples discussed herein.

Further, the head path can be stored with respect to one or more points of reference or no point of reference. For example, the head path is stored with respect to a forward-looking direction, a GPS location, a SLP, an IoT location, a fixed or moving object or image in real or virtual space, an origin of a coordinate system, an orientation of a head of a person, a virtual sound source, or another method and/or object discussed herein.

Block 1320 states improve performance of a computer executing binaural sound to the person by prefetching, preprocessing, and/or caching the head path with the series of coordinate locations and/or with the other format in anticipation of the head of the person moving along the head path.

For example, the computer or electronic device prefetches, preprocesses, and/or caches SLI associated with or corresponding to the head path. For instance, this information includes the HRTFs, ITDs, and/or ILDs that correspond to or that are associated or correlated with the head path.

Block 1330 states convolve, by the computer and with the series of HRTFs and/or other SLI, the sound being provided to the person when the head of the person moves along the head path.

Consider an example of a person talking to another person during a telephone call. The person hears the voice of the other person as binaural sound that localizes to a SLP that is proximate to the person and in empty space. The person wears a HMD that provides a VR image or an AR image at the SLP in empty space. The HMD or another electronic device (e.g., a server in a network) prefetches, preprocesses, and/or caches one or more head paths and/or SLI that define how the head of the person will move at a future time during the telephone call. When the head of the person subsequently moves along the head path during the telephone call, then the head paths and/or SLI are already prefetched, preprocessed, and cached.

An example embodiment stores, retrieves, and analyzes the head paths to predict how the head of the person will move during the event (e.g., during the telephone call, during the VR software game, etc.). Prefetching, preprocessing, and/or caching occurs before the person moves the head along the path during the event in order to expedite convolution of the sound when the person does move the head along the path during the event. When a determination is made that the person will or will likely move his or her head along the head path, the example embodiment commences the preprocessing and/or convolution of sound before the person actually moves his or her head along the path.

Consider an example embodiment that caches a series of HRTFs in cache memory in a sequence that corresponds to an order in which a processor (such as a DSP) executes the head path during a telephone call or VR software game. For instance, this order starts at a beginning of the head path and ends at an end of the head path. When the head of the person moves along the head path, sound is convolved with the HRTFs in order to maintain a sound (such as voice or sound of a virtual sound source) at a sound localization point that is fixed with respect to the environment of the person (e.g., a SLP with constant or static or unchanging world space coordinates, a SLP of an unmoving virtual sound source, a SLP that remains at a stationary physical and/or virtual object, a SLP that remains at a fixed distance from two walls and the floor of a physical or virtual room of the listener) while the head of the person moves along the head path.

Consider an example embodiment that improves performance of the computer by storing sequences of HRTFs that were executed during a previous event (e.g., while a person was on a prior telephone call, while the person played a VR game, or while the person wore a HMD). The example embodiment prefetches the sequences of HRTFs during subsequent events or later during the same event. For instance, sequences of HRTFs are stored during telephone calls to which the person is a party. Later, these HRTFs are retrieved and analyzed when the person is a party to another telephone call or later during the same telephone call. These prior head paths assist an example embodiment in determining or predicting how the head of the person will move during the subsequent telephone call or a later time during the same telephone call. As noted herein, people tend to move their heads in repetitive and/or predictable manners that can be determined from analysis of prior or historical movements of the head and/or body.

As used herein, the word "about" when indicated with a number, amount, time, etc. is close or near something. By way of example, for spherical or polar coordinates of a SLP (r, δ, φ), the word "about" means plus or minus (±) three degrees for δ and φ and plus or minus 5% for distance (r).

As used herein, "empty space" is a location that is not occupied by a tangible object.

As used herein, "field-of-view" is the observable world that is seen at a given moment. Field-of-view includes what a user sees in a virtual or augmented world (e.g., what the user sees while wearing a HMD).

As used herein, an "HRTF path" is a path that can be correlated to or associated with a plurality of HRTF pairs or other SLI that can convolve sound to localize in virtual auditory space (aka virtual acoustic space). For example, a path in 3D space is matched with a plurality of HRTF pairs that convolve sound to localize along a path of SLPs to a listener. As another example, a plurality of HRTF pairs convolve sound to localize at a fixed SLP in empty space while a head orientation and/or head position of a listener moves.

As used herein, "proximate" means near. For example, a sound that localizes proximate to a listener occurs within two meters of the person.

As used herein, "sound localization information" is information that is used to process or convolve sound so the sound externally localizes as binaural sound to a listener.

As used herein, a "sound localization point" or "SLP" is a location where a listener localizes sound. A SLP can be internal (such as monaural sound that localizes inside a head of a listener wearing headphones or earbuds), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "spherical coordinates" or "spherical coordinate system" provides a coordinate system in 3D space in which a position is given with three numbers: a radial distance (r) from an origin, an azimuth angle (θ) of its orthogonal projection on a reference plane that is orthogonal to the zenith direction and that passes through the origin, and an elevation or polar angle (ϕ) that is measured from the zenith direction.

As used herein, a "telephone call," or a "phone call" or "telephony call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, video calls, conference calls, internet telephone calls, in-game calls, telepresence, etc.

As used herein, "three-dimensional space" or "3D space" is space in which three values or parameters are used to determine a position of an object or point. For example, binaural sound can localize to locations in 3D space around a head of a listener. 3D space can also exist in virtual reality (e.g., a user wearing a HMD can see a virtual 3D space).

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears).

As used herein, a "user agent" is software that acts on behalf of a user. User agents include, but are not limited to, one or more of intelligent user agents and/or intelligent electronic personal assistants (IPAs, VPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "virtual sound source" is a sound source in virtual auditory space (aka virtual acoustic space). For example, listeners hear a virtual sound source at one or more SLPs.

As used herein, a "virtual sound source path" is a path of a virtual sound source in virtual auditory space (aka virtual acoustic space). For example, a virtual sound source moves along a path in virtual auditory space.

As used herein, "world space" is a frame of reference that can be common to a listener and a virtual sound source so that position and orientation of a listener and a virtual sound source can be expressed independently (without a SLP), without respect to each other. For example, a listener Alice in a virtual room and standing at a world space origin (0, 0, 0) sees a virtual radio which is a virtual sound source having world space coordinates (0, 0, 1). Alice turns on the virtual radio and moves around the virtual room localizing the virtual sound source at (0, 0, 1) from the SLP at (0, 0, 1). Alice later exits the virtual room, and being out of the room no longer localizes the virtual radio at world space coordinates (0, 0, 1). This description illustrates that the virtual sound source has a location regardless of whether or not it is emitting sound and whether or not a listener is present, and that the location of the virtual sound source can be described without being in terms of a SLP, using world space coordinates instead. The location of a virtual sound source can be specified without respect to a listener by using world space coordinates. The common frame of reference or world space can coincide with a VR world or with a physical space. Another example of a world space is one in which the common frame of reference is a 3D coordinate system that is overlaid on a physical space or environment such as to augment the physical space with virtual sound sources. The overlay allows an example embodiment to reference, track, model, and calculate placement and movement of both physical and virtual objects (including virtual sound sources, SLPs, paths of motions, users) in a common coordinate system. An example embodiment assigns and maps a grid or other coordinate space to a physical room of a listener and the coordinate space is a world space that allows the example embodiment to refer to locations in the room. For example, the x-z plane of the world space is coincident with the physical wood floor of the room, and a center of a head of a listener Bob who stands five feet tall on the wood floor has a world space z coordinate of 4.5 ft. If Bob walks toward a virtual radio on the table at (5, 0, 3), the coordinates of the resulting head path can be expressed in world space coordinates or other coordinates.

As used herein, a "zone" is a portion of a 1D, 2D or 3D region that exists in 3D space with respect to a user. For example, 3D space proximate to a listener or around a listener can be divided into one or more 1D, 2D, 3D and/or point or single coordinate zones. As another example, 3D space in virtual reality can be divided into one or more 1D, 2D, 3D and/or point zones.

Impulse responses can be transformed into their respective transfer functions. For example, a RIR has an equivalent transfer function of a RTF; a BRIR has an equivalent transfer function of a BRIR; and a HRIR has an equivalent transfer function of a HRTF.

Example embodiments can be applied to methods and apparatus that utilize various degrees of predictions or confidence levels and depend on the application of use. For example, in some instances, a prediction that an event will occur or re-occur could mean a likelihood or confidence level of ninety percent (90%) or higher. In other instances, this prediction could be lower, such as more likely than not or greater than fifty percent (50%), greater than sixty percent (60%), greater than seventy percent (70%), greater than eighty percent (80%), or equal to a greater than another number, measurement, or event.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as NAND flash non-volatile memory, DRAM, or SRAM, Erasable and Programmable Read-Only Memories (EPROMs), Electrically Erasable and Programmable Read-Only Memories (EEPROMs), solid state drives (SSD), and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:

processing sound to generate binaural sound that localizes to a virtual image displayed to a listener with a wearable electronic device (WED) worn on a head of the listener;

tracking movements of the head of the listener; and improving performance of the processing by prefetching and caching head-related transfer functions (HRTFs) for the movements of the head of the listener.

2. The method of claim 1 further comprising:

predicting a sequence of HRTFs having coordinates based on a path of the movements of the head of the listener.

3. The method of claim 1 further comprising:

predicting a head orientation of the listener; and improving the performance of the processing by prefetching and caching the HRTFs that have coordinates derived from the head orientation.

4. The method of claim 1 further comprising:

predicting head movements of the listener, wherein the HRTFs being prefetched and cached correspond to the head movements of the listener being predicted.

5. The method of claim 1, wherein the HRTFs have coordinates that correspond to locations of the virtual image such that the binaural sound continues to localize to the virtual image as the head of the listener moves.

6. The method of claim 1 further comprising:

determining a path that represents a head orientation that the listener will have when the virtual image moves; and transforming coordinates of the path into coordinates for the HRTFs.

7. The method of claim 1 further comprising:
improving the performance of the processing by storing the HRTFs in a sequence that follows coordinates along a path based on at least one of the movements of the head of the listener and movements of the virtual image.

8. An electronic device, comprising:
a cache memory; and
one or more processors that processes sound into binaural sound that localizes to a virtual sound source for a listener with a head orientation, wherein performance of the processor improves by prefetching and caching head-related transfer functions (HRTFs) into the cache memory with the HRTFs having coordinates for where the virtual sound source will move.

9. The electronic device of claim 8, wherein the HRTFs include a sequence of coordinates defined by a path along which the virtual sound source will move.

10. The electronic device of claim 8, wherein the performance of the one or more processors improves by prefetching and caching the HRTFs that have azimuth and elevation coordinates for locations where the virtual sound source will be.

11. The electronic device of claim 8, wherein the performance of the one or more processors improves by prefetching and caching the HRTFs with coordinate locations corresponding to a path of movement that the virtual sound source will take, and the virtual sound source is an augmented reality (AR) image or a virtual reality (VR) image.

12. The electronic device of claim 8, wherein the electronic device includes a wearable electronic device (WED) worn on a head of the listener, and the WED displays a virtual image at the virtual sound source.

13. The electronic device of claim 8, wherein the cache memory stores the HRTFs in a sequence of coordinate locations corresponding to a path of movement of the virtual sound source.

14. A method comprising:
displaying a virtual image to a listener that localizes binaural sound to the virtual image; and
improving performance of processing the binaural sound by prefetching and caching head related transfer functions (HRTFs) corresponding to a path the virtual image will move.

15. The method of claim 14, wherein coordinates of the HRTFs correspond to azimuth and elevation coordinates of the path the virtual image will move.

16. The method of claim 14 further comprising:
storing the HRTFs in a sequence having coordinates derived from the path the virtual image will move.

17. The method of claim 14 further comprising:
predicting a change in azimuth and elevation coordinates of a head of the listener with respect to the path the virtual image will move.

18. The method of claim 14, wherein the HRTFs have coordinates located along the path the virtual image will move.

19. The method of claim 14 further comprising:
improving performance of processing the binaural sound by prefetching and caching HRTFs corresponding to a path a head of the listener will move.

20. The method of claim 14 further comprising:
storing the HRTFs in cache memory of a wearable electronic device (WED) worn on a head of the listener, wherein the WED is a head mounted display or electronic glasses.

* * * * *